United States Patent
Yuan et al.

(10) Patent No.: US 12,262,013 B2
(45) Date of Patent: Mar. 25, 2025

(54) POINT CLOUD ENCODING AND DECODING METHOD AND SYSTEM, AND POINT CLOUD ENCODER AND POINT CLOUD DECODER

(71) Applicant: GUANGDONG OPPO MOBILE TELECOMMUNICATIONS CORP., LTD., Dongguan (CN)

(72) Inventors: Hui Yuan, Dongguan (CN); Xiaohui Wang, Dongguan (CN); Ming Li, Dongguan (CN); Lu Wang, Dongguan (CN); Qi Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/125,276

(22) Filed: Mar. 23, 2023

(65) Prior Publication Data
US 2023/0232004 A1    Jul. 20, 2023

Related U.S. Application Data

(63) Continuation of application No. PCT/CN2021/087064, filed on Apr. 13, 2021.

(30) Foreign Application Priority Data

Sep. 25, 2020 (WO) ................ PCT/CN2020/117941
Dec. 22, 2020 (WO) ................ PCT/CN2020/138421
Dec. 22, 2020 (WO) ................ PCT/CN2020/138423

(51) Int. Cl.
*H04N 19/126* (2014.01)
*H04N 19/136* (2014.01)
(Continued)

(52) U.S. Cl.
CPC ......... *H04N 19/126* (2014.11); *H04N 19/136* (2014.11); *H04N 19/157* (2014.11); *H04N 19/189* (2014.11); *H04N 19/70* (2014.11)

(58) Field of Classification Search
CPC ....... G06T 9/001; G06T 9/004; H04N 19/124; H04N 19/126; H04N 19/136; H04N 19/157; H04N 19/189; H04N 19/70
See application file for complete search history.

(56) References Cited

U.S. PATENT DOCUMENTS

| 8,023,563 | B2 | 9/2011 | Vella |
| 10,762,667 | B2 | 9/2020 | Mekuria |

(Continued)

FOREIGN PATENT DOCUMENTS

| CA | 3126760 A1 | 8/2020 |
| CN | 108322742 A | 7/2018 |

(Continued)

OTHER PUBLICATIONS

Khaled Mammou et al:"G-PCC codec description v2", 125. MPEG Meeting; Jan. 14, 2019-Jan. 18, 2019; Marrakech; (Motion Picture Expert Group or ISO/IEC J₇C1/sc29/wG11), No. N18189, Feb. 22, 2019 (Feb. 22, 2019), XP030212734, pp. 26-34, sections 3.6-3.8, 39 pages.

(Continued)

*Primary Examiner* — Mohammed S Rahaman
(74) *Attorney, Agent, or Firm* — BAYES PLLC

(57) ABSTRACT

A point cloud encoding method, including: obtaining attribute information about the attributes of a current point in a point cloud; processing the attribute information of the current point to obtain a residual value of the attribute information of the current point; using a target quantization manner, quantizing the residual value of the attribute information of the current point to obtain a quantized residual (Continued)

value of the attribute information of the current point; the target quantization manner comprises at least two of the following quantization manners: a first quantization manner, a second quantization manner, and a third quantization manner.

13 Claims, 21 Drawing Sheets

(51) Int. Cl.
    *H04N 19/157*      (2014.01)
    *H04N 19/189*      (2014.01)
    *H04N 19/70*       (2014.01)

(56) References Cited

U.S. PATENT DOCUMENTS

| | | |
|---|---|---|
| 10,861,196 B2 | 12/2020 | Mammou |
| 10,904,564 B2 | 1/2021 | Yea |
| 10,911,787 B2 | 2/2021 | Tourapis |
| 11,202,054 B2 | 12/2021 | Yea |
| 2005/0141774 A1 | 6/2005 | Deever |
| 2007/0263720 A1* | 11/2007 | He .................... H04N 19/152 375/240.03 |
| 2018/0324426 A1 | 11/2018 | Huang et al. |
| 2019/0080483 A1 | 3/2019 | Mammou et al. |
| 2020/0021844 A1 | 1/2020 | Yea et al. |
| 2020/0021856 A1 | 1/2020 | Tourapis et al. |
| 2020/0090373 A1* | 3/2020 | Graziosi ................ H04N 19/18 |
| 2020/0175725 A1 | 6/2020 | Mekuria |
| 2020/0366932 A1 | 11/2020 | Li et al. |
| 2021/0082153 A1 | 3/2021 | Sugio |
| 2021/0084289 A1 | 3/2021 | Sugio |
| 2021/0092355 A1 | 3/2021 | Sugio |
| 2021/0105493 A1 | 4/2021 | Mammou et al. |
| 2021/0209811 A1 | 7/2021 | Ramasubramonian et al. |
| 2021/0209812 A1* | 7/2021 | Han .................... H04N 19/46 |
| 2021/0327097 A1 | 10/2021 | Ramasubramonian et al. |
| 2021/0329298 A1 | 10/2021 | Ramasubramonian et al. |
| 2021/0368186 A1 | 11/2021 | Sugio |
| 2021/0407142 A1 | 12/2021 | Hur et al. |
| 2021/0409714 A1 | 12/2021 | Ramasubramonian et al. |
| 2022/0028120 A1* | 1/2022 | Sugio .................... H04N 19/63 |
| 2022/0108489 A1* | 4/2022 | Sugio .................... G06T 9/00 |
| 2022/0207782 A1 | 6/2022 | Iguchi et al. |
| 2022/0224941 A1 | 7/2022 | Sugio et al. |
| 2022/0264085 A1* | 8/2022 | Galpin ................ H04N 19/176 |
| 2022/0343548 A1 | 10/2022 | Park et al. |
| 2023/0046917 A1 | 2/2023 | Flynn et al. |
| 2023/0100085 A1 | 3/2023 | Sugio et al. |
| 2023/0118907 A1 | 4/2023 | Iguchi et al. |
| 2023/0196625 A1 | 6/2023 | Li et al. |
| 2023/0232004 A1 | 7/2023 | Yuan et al. |
| 2023/0412837 A1 | 12/2023 | Oh et al. |
| 2024/0015325 A1 | 1/2024 | Zhu |
| 2024/0064332 A1 | 2/2024 | Hur et al. |
| 2024/0233195 A1 | 7/2024 | Wang et al. |

FOREIGN PATENT DOCUMENTS

| | | |
|---|---|---|
| CN | 109889840 A | 6/2019 |
| CN | 110708560 A | 1/2020 |
| CN | 111095929 A | 5/2020 |
| CN | 111247802 A | 6/2020 |
| CN | 111327897 A | 6/2020 |
| CN | 111327906 A | 6/2020 |
| CN | 111953998 A | 11/2020 |
| JP | 2018078503 A | 5/2018 |
| WO | 2019235366 A1 | 12/2019 |
| WO | 2019240215 A1 | 12/2019 |
| WO | 2019240284 A1 | 12/2019 |
| WO | 2020071414 A1 | 4/2020 |
| WO | 2020075781 A1 | 4/2020 |
| WO | 2020162495 A1 | 8/2020 |
| WO | 2020186060 A1 | 9/2020 |
| WO | 2020189709 A1 | 9/2020 |
| WO | 2020189976 A1 | 9/2020 |
| WO | 2020190093 A1 | 9/2020 |
| WO | 2020191260 A1 | 9/2020 |
| WO | 2020213735 A1 | 10/2020 |

OTHER PUBLICATIONS

Liu Hao et al: "A Comprehensive Study and Comparison of Core Technologies for MPEG 3-D Point Cloud Compression" IEEE Transactions on Broadcasting, IEEE Service Center, Piscatanay, NJ, US, vol. 66, No. 3, Sep. 1, 2020 (Sep. 1, 2020), pp. 701-717, XP011807048, ISSN: 0018-9316, DOI: 10.1109/ TBC.2019. 2957652, sections III.C, IV and V, 17 pages.

Supplementary European Search Report in the European application No. 21870758.6, mailed on Feb. 16, 2024, 13 pages.

Khaled Mammou et al: "Lifting Scheme for Lossy Attribute Encoding in TMCI", 122. MPEG Meeting; Apr. 16, 2018-Apr. 20, 2018; San Diego; (Motion Picture Expert Group or ISO/IEC JTC1/SC29/WG11), No. m42640, Apr. 11, 2018 (Apr. 11, 2018), XP030070979, the whole document, 9 pages.

Bappaditya Ray (Qualcomm) et al: "[G-PCC][ new] Attribute related high level syntax-fixes and improvements", 130. MPEG Meeting; Apr. 20, 2020-Apr. 24, 2020; Alpbach; (Motion Picture Expert Group or ISO/IEC JTC1/SC29/WG11), No. m53652, Apr. 15, 2020 (Apr. 15, 2020), XP030287312, the whole document, 18 pages.

Dean Han (Panasonic) et al: "[G-PCC] Delta QP for Layer of Lifting/Predicting Transform and RAHT ", 126. MPEG Meeting; Mar. 25, 2019-Mar. 29, 2019; Geneva; (Motion Picture Expert Group or ISO/IEC JTC1/SC29/WG11), No. m47834, Mar. 22, 2019 (Mar. 22, 2019), XP030212138, the whole document, 5 pages.

Supplementary European Search Report in the European application No. 20966332.7, mailed on Sep. 20, 2023, 13 pages.

Sehoon Yea et a:"Lossless Scalable Lifting for Attribute Coding", 127. MPEG Meeting; Jul. 8, 2019-Jul. 12, 2019; Gothenburg; ($_{MOT}$ion Picture Expert Groue or $I_S$O/IEC $J_{TC}$1/sc29/wG11), No. m49603, Jul. 9, 2019 (Jul. 9, 2019), XP030207983,the whole document, 6 pages.

"Common Test Conditions for PCC", 127. MPEG Meeting; Jul. 8, 2019-Jul. 12, 2019; Gothenburg; ($_{Mo}$tion Picture Expert Group or ISO/IEC $J_T$C1/sC29/wG11), No. n18665, Sep. 23, 2019 (Sep. 23, 2019), XPO30206829, paragraph [4.5.2] , 15 pages.

D. Graziosi et al: "An overview of ongoing point cloud compression standardization activities: video-based (v-PCC) and geometry-based (G-PCC)", APSIPA Transactions on Signal and Information Processing, vol. 9, Jan. 1, 2020 (Jan. 1, 2020), XP055737775. DOI:10.1017/ATSIP.2020.12, paragraphs [00IV], [000v)], 17 pages.

Anonymous:"G-PCC codec description",International Organization for Ftandardization Organisation Internationale De Normalisation ISO/IEC JTC 1/SC 29/WG 7 MPEG 3D Graphics Coding, Oct. 2020 (Oct. 1, 2020), pp. 1-148,XP055964154, the whole document, 149 pages.

Lasserre (Blackberry) S et al: "On adding a coding layer to RAHT to obtain lossless attribute coding"126. MPEG Meeting; Mar. 25, 2019-Mar. 29, 2019; Geneva; (Motion Picture Expert Group or $I_{SO}$/IEC $J_{TC}$1/sc29/wc11), No. m47795, Mar. 20, 2019 (Mar. 20, 2019), XP030212071, the whole document, 14 pages.

Supplementary European Search Report in the European application No. 20966333.5, mailed on Dec. 12, 2023, 13 pages.

International Search Report in the international application No. PCT/CN2020/117941, mailed on Jun. 23, 2021.

Written Opinion of the International Search Authority in the international application No. PCT/CN2020/117941, mailed on Jun. 23, 2021.

International Search Report in the international application No. PCT/CN2021/087064, mailed on Jul. 2, 2021.

Written Opinion of the International Search Authority in the international application No. PCT/CN2021/087064, mailed on Jul. 2, 2021.

(56) References Cited

OTHER PUBLICATIONS

International Search Report in the international application No. PCT/CN2020/138421, mailed on Sep. 7, 2021.
Written Opinion of the International Search Authority in the international application No. PCT/CN2020/138421, mailed on Sep. 7, 2021.
International Search Report in the international application No. PCT/CN2020/138423, mailed on Sep. 13, 2021.
Written Opinion of the International Search Authority in the international application No. PCT/CN2020/138423, mailed on Sep. 13, 2021.
First Office Action of the Japanese application No. 2023-519013, issued on May 21, 2024, 10 pages with English translation.
Restriction Requirement Office Action of the U.S. Appl. No. 18/126,082, issued on Jun. 17, 2024, 7 pages.
Notice of Allowance of the U.S. Appl. No. 18/126,082, issued on Oct. 23, 2024, 40 pages.
Notice of Allowance of the U.S. Appl. No. 18/208,771, issued on Oct. 11, 2024, 56 pages.
First Office Action of the Japanese application No. 2023-538020, issued on Nov. 26, 2024, 8 pages with English translation.
First Office Action of the Korean application No. 10-2023-7024952, issued on Nov. 28, 2024, 9 pages with English translation.
Notice of Rejection of the Japanese application No. 2023-519013, issued on Dec. 10, 2024, 2 pages with English translation.
First Office Action of the Japan application No. 2023-537708, issued on Dec. 13, 2024, 8 pages with English translation.
First Office Action of the Indian application No. 202317047921, issued on Jan. 30, 2025, 7 pages with English translation.

\* cited by examiner

POINT CLOUD ENCODING AND DECODING METHOD AND SYSTEM, AND POINT CLOUD ENCODER AND POINT CLOUD DECODER

CROSS-REFERENCE TO RELATED APPLICATIONS

This application is a continuation of International Application No. PCT/CN2021/087064 filed on Apr. 13, 2021, which claims the benefit of priorities to International Application No. PCT/CN2020/117941 filed on Sep. 25, 2020, International Application No. PCT/CN2020/138423 filed on Dec. 22, 2020, and International Application No. PCT/CN2020/138421 filed on Dec. 22, 2020. The disclosures of the above patent applications are hereby incorporated by reference in their entireties.

BACKGROUND

A surface of an object is collected through a collection device, so as to form point cloud data. The point cloud data includes hundreds of thousands or even more points. In a video production process, the point cloud data is transmitted between a point cloud encoding device and a point cloud decoding device in a form of a point cloud media file. However, such a large number of points bring challenges to transmission. Therefore, the point cloud encoding device needs to transmit the point cloud data after compression.

The compression of the point cloud data mainly includes the compression of geometry information and the compression of attribute information. During the compression of the attribute information, redundant information in the point cloud data is reduced or eliminated through quantization.

However, a quantization effect is poor when the points in the point cloud are quantized.

SUMMARY

The present disclosure relates to the technical field of point cloud encoding and decoding, and in particular, to a method and system for point cloud encoding and decoding, and a point cloud encoder and a point cloud decoder.

Embodiments of the present disclosure provide a method and system for point cloud encoding and decoding, and a point cloud encoder and a point cloud decoder, so as to improve the quantization effect of the points in a point cloud.

In a first aspect, the present disclosure provides a method for point cloud encoding, which includes the following operations.

Attribute information of a current point in a point cloud is acquired.

The attribute information of the current point is processed to obtain a residual value of the attribute information of the current point.

The residual value of the attribute information of the current point is quantized in a target quantization mode, to obtain a quantized residual value of the attribute information of the current point.

The target quantization mode includes at least two of the following quantization modes: a first quantization mode, a second quantization mode, and a third quantization mode. The first quantization mode is to set a quantization parameter increment for a quantization parameter of at least one point in the point cloud, the second quantization mode is to weight the residual values of the points in the point cloud, and the third quantization mode is to perform lossless encoding on the residual value of the attribute information of at least one point in the point cloud.

In a second aspect, an embodiment of the present disclosure provides a method for point cloud decoding, which includes the following operations.

A bitstream of a point cloud is parsed to obtain a quantized residual value of the attribute information of the current point of the point cloud.

Inverse quantization is performed on the quantized residual value of the attribute information of the current point in a target inverse quantization mode, to obtain a reconstructed residual value of the attribute information of the current point.

The target inverse quantization mode includes at least two of the following inverse quantization modes: a first inverse quantization mode, a second inverse quantization mode, and a third inverse quantization mode. The first inverse quantization mode is to set an inverse quantization parameter increment for an inverse quantization parameter of at least one point in the point cloud, the second inverse quantization mode is to perform deweighting processing on the residual values of the points in the point cloud, and the third inverse quantization mode is to perform lossless decoding on the residual value of the attribute information of at least one point in the point cloud.

In a third aspect, the present disclosure provides a point cloud encoder, which is configured to perform the method in the abovementioned first aspect or various implementation modes thereof. Specifically, the encoder includes functional units configured to perform the method in the abovementioned first aspect or various implementation modes thereof.

In a fourth aspect, the present disclosure provides a point cloud decoder, which is configured to perform the method in the abovementioned second aspect or various implementation modes thereof. Specifically, the decoder includes functional units configured to perform the method in the abovementioned second aspect or various implementation modes thereof.

In a fifth aspect, a point cloud encoder is provided, which includes a processor and a memory. The memory is configured to store a computer program. The processor is configured to call and run the computer program stored in the memory to perform the method in the abovementioned first aspect or various implementation modes thereof.

In a sixth aspect, a point cloud decoder is provided, which includes a processor and a memory. The memory is configured to store a computer program. The processor is configured to call and run the computer program stored in the memory to perform the method in the abovementioned second aspect or various implementation modes thereof.

In a seventh aspect, a point cloud encoding and decoding system is provided, which includes a point cloud encoder and a point cloud decoder. The point cloud encoder is configured to perform the method in the abovementioned first aspect or various implementation modes thereof. The point cloud decoder is configured to perform the method in the abovementioned second aspect or various implementation modes thereof.

In an eighth aspect, a chip is provided, which is configured to implement the method in either of the abovementioned first aspect and second aspect or various implementation modes thereof. Specifically, the chip includes a processor, configured to call and run a computer program in a memory to enable a device installed with the chip to perform the method in either of the abovementioned first aspect and second aspect or various implementation modes thereof.

In a ninth aspect, a computer-readable storage medium is provided, which is configured to store a computer program. The computer program enables a computer to perform the method in either of the abovementioned first aspect and second aspect or various implementation modes thereof.

In tenth aspect, a computer program product is provided, which includes computer program instructions. The computer program instructions enable a computer to perform the method in either of the abovementioned first aspect and second aspect or various implementation modes thereof.

In an eleventh aspect, a computer program is provided. When the computer program runs on a computer, the computer is enabled to perform the method in either of the abovementioned first aspect and second aspect or various implementation modes thereof.

In a twelfth aspect, a bitstream is provided. The bitstream is obtained by the method described in the first aspect.

Based on the above technical solution, the attribute information of the current point in the point cloud is acquired; the attribute information of the current point is processed to obtain a residual value of the attribute information of the current point; and the residual value of the attribute information of the current point is quantized in a target quantization mode, so as to obtain a quantized residual value of the attribute information of the current point. The target quantization mode includes at least two of the following quantization modes: a first quantization mode, a second quantization mode, and a third quantization mode. The first quantization mode is to set a quantization parameter increment for a quantization parameter of at least one point in the point cloud, the second quantization mode is to weight the residual values of the points in the point cloud, and the third quantization mode is to perform lossless encoding on the residual value of the attribute information of at least one point in the point cloud, thus the quantization effect of the attribute information of the points in the point cloud is improved.

DETAILED DESCRIPTION

Figure 1:
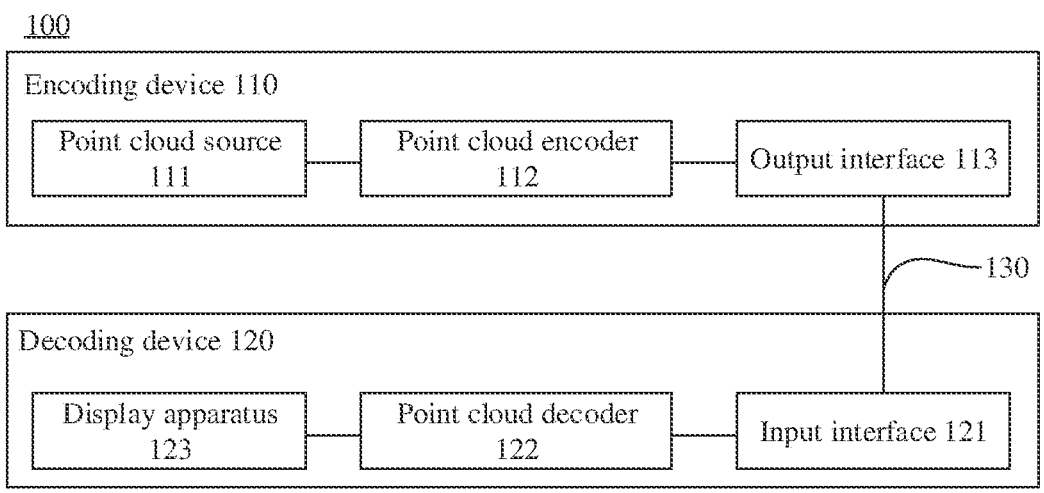
FIG. 1 is a schematic block diagram of a point cloud encoding and decoding system involved in an embodiment of the present disclosure.

The present disclosure may be applied to the technical field of point cloud compression.

For ease of understanding of the embodiments of the present disclosure, related concepts involved in the embodiments of the present disclosure will be briefly introduced as follows first.

A point cloud refers to a group of set of randomly distributed discrete points in space that represent a spatial structure and surface attributes of a 3-Dimension (3D) object or a 3D scenario.

Point cloud data is a specific record form of the point cloud. A point in the point cloud may include position information of the point and attribute information of the point. For example, the position information of a point may be 3D coordinate information of the point. The position information of the point may also be referred to as geometry information of the point. For example, the attribute information of the point may include colour information and/or reflectivity. For example, the colour information may be the information in any colour space. For example, the colour information may be Red, Green, and Blue (RGB). For another example, the colour information may be YcbCr (YUV) information. For example, Y represents luma, Cb (U) represents blue chromatic aberration, Cr (V) represents red, and U and V represent chroma, which is used for describing chromatic aberration information. For example, points in the point cloud obtained according to a principle of laser measurement may include 3D coordinate information of the points and laser reflectance of the points. For yet another example, points in the point cloud obtained according to a principle of photogrammetry may include 3D coordinate information of the points and colour information of the points. For example, points in the point cloud obtained by combining the principles of laser measurement and photogrammetry may include the 3D coordinate information of the points, the laser reflectance of the points, and the colour information of the points.

Acquisition ways of the point cloud data may include, but are not limited to, at least one of the following. (1) The point cloud data may be generated by a computer device. The computer device may generate the point cloud data according to a virtual 3D object and a virtual 3D scenario. (2) The point cloud data is acquired by 3D laser scanning. The point cloud data of a 3D object or a 3D scenario in a static real world may be acquired through 3D laser scanning Million levels of point cloud data may be acquired every second. (3) The point cloud data is acquired by 3D photogrammetry. A visual scenario in the real world is collected by a 3D photographic device (that is, a group of video cameras or a photographic device with a plurality of camera lenses and sensors), so as to obtain the point cloud data of the visual scenario of the real world. The point cloud data of the 3D object or the 3D scenario in a dynamic real world is obtained through 3D photography. (4) The point cloud data of biological tissues and organs is obtained through medical devices. In the field of medicine, the point cloud data of biological tissues and organs is obtained through the medical devices, such as Magnetic Resonance Imaging (MRI), Computed Tomography (CT), and electromagnetic positioning information.

Point clouds may be partitioned into dense point clouds and sparse point clouds according to acquisition ways.

The point clouds may be partitioned into the first category static point cloud, the second category dynamic point cloud, and the third category dynamically acquired point cloud according to the timing type of data.

The first category static point cloud: an object is static, and a device for acquiring the point cloud is also static.

The second category dynamic point cloud: an object is dynamic, but the device for acquiring the point cloud is static.

The third category dynamically acquired point cloud: the device for acquiring the point cloud is dynamic.

The point clouds are partitioned into two categories according to purposes.

Category 1: a machine perception point cloud, which can be used for scenarios, such as an autonomous navigation system, a real-time inspection system, a geographic information system, a visual sorting robot, and a rescue robot.

Category 2: a human eye perception point cloud, which can be used for point cloud application scenarios, such as digital cultural heritage, free view broadcasting, 3D immersive communication, and 3D immersive interaction.

FIG. 1 is a schematic block diagram of a point cloud encoding and decoding system involved in an embodiment of the present disclosure. It is to be noted that FIG. 1 is only an example. The point cloud encoding and decoding system of the embodiment of the present disclosure includes, but is not limited to, that shown in FIG. 1. As shown in FIG. 1, the point cloud encoding and decoding system 100 includes an encoding device 110 and a decoding device 120. The encoding device is configured to perform encoding (which can be understood as compressing) on point cloud data to generate a bitstream, and transmit the bitstream to the decoding device. The decoding device decodes the bitstream generated by the encoding device, so as to obtain decoded point cloud data.

The encoding device 110 of the embodiment of the present disclosure may be understood as a device with a point cloud encoding function. The decoding device 120 may be understood as a device with a point cloud decoding function. That is, the encoding device 110 and the decoding device 120 of the embodiment of the present disclosure includes wider apparatuses, such as smart phones, desktop computers, mobile computing apparatuses, notebook (for example, laptop) computers, tablet computers, set-top boxes, televisions, cameras, display apparatuses, digital media players, video game consoles, vehicle computers, or the like.

In some embodiments, the encoding device 110 may transmit the encoded point cloud data (such as the bitstream) to the decoding device 120 through a channel 130. The channel 130 may include one or more media and/or apparatus that can transmit the encoded point cloud data from the encoding device 110 to the decoding device 120.

In one example, the channel 130 includes one or more communication media that can enable the encoding device 110 to directly transmit the encoded point cloud data to the decoding device 120 in real time. In this example, the encoding device 110 may modulate the encoded point cloud data according to a communication standard, and transmit the modulated point cloud data to the decoding device 120. The communication media include wireless communication media, such as radio-frequency spectra. Optionally, the communication media may also include wired communication media, for example, one or more physical transmission lines.

In another example, the channel 130 includes a storage medium. The storage medium may store the point cloud data after being encoded by the encoding device 110. The storage medium includes a plurality of locally accessible data storage media, such as a compact disk, DVD, flash memory, and the like. In this example, the decoding device 120 may acquire the encoded point cloud data from the storage medium.

In another example, the channel 130 may include a storage server. The storage server may store the point cloud data after being encoded by the encoding device 110. In this example, the decoding device 120 may download the stored and encoded point cloud data from the storage server. Optionally, the storage server may store the encoded point cloud data and transmit the encoded point cloud data to the decoding device 120, such as a web server (for example, a website), and a File Transfer Protocol (FTP) server.

In some embodiments, the encoding device 110 includes a point cloud encoder 112 and an output interface 113. The output interface 113 may include a modulator/demodulator (modem) and/or a transmitter.

In some embodiments, the encoding device 110 may further include a point cloud source 111 in addition to the point cloud encoder 112 and the output interface 113.

The point cloud source 111 may include at least one of a point cloud collection apparatus (for example, a scanner), a point cloud archive, a point cloud input interface, and a computer graphics system. The point cloud input interface is configured to receive the point cloud data from a point cloud content provider. The computer graphics system is configured to generate point cloud data.

The point cloud encoder 112 encodes the point cloud data from the point cloud source 111, so as to generate a bitstream. The point cloud encoder 112 directly transmits the encoded point cloud data to the decoding device 120 through the output interface 113. The encoded point cloud data may also be stored on a storage medium or a storage server for the decoding device 120 to read subsequently.

In some embodiments, the decoding device 120 includes an input interface 121 and a point cloud decoder 122.

In some embodiments, the decoding device 120 may further include a display apparatus 123 in addition to the input interface 121 and the point cloud decoder 122.

The input interface 121 includes a receiver and/or a modem. The input interface 121 may receive the encoded point cloud data through the channel 130.

The point cloud decoder 122 is configured to decode the encoded point cloud data to obtain a decoded point cloud data, and transmits the decoded point cloud data to the display apparatus 123.

The display apparatus 123 displays the decoded point cloud data. The display apparatus 123 may be integrated with the decoding device 120, or may be located outside the decoding device 120. The display apparatus 123 may include a plurality of display apparatuses, for example, liquid crystal displays (LCDs), plasma displays, Organic Light-Emitting Diode (OLED) displays, or other types of display apparatuses.

In addition, FIG. 1 is only an example. The technical solution of the embodiment of the present disclosure is not limited to FIG. 1. For example, the technology of the present disclosure may also be applied to single-sided point cloud encoding or single-sided point cloud decoding.

At present, the point cloud encoder may adopt a Geometry Point Cloud Compression (G-PCC) encoding and decoding framework or a Video Point Cloud Compression (V-PCC) encoding and decoding framework provided by a Moving Picture Experts Group (MPEG), or may also adopt an Audio Video Standard-PCC (AVS-PCC) encoding and decoding framework provided by the AVS. Both the G-PCC and the AVS-PCC are for static sparse point clouds, and their coding frameworks are roughly the same. The G-PCC encoding and decoding framework may be configured to compress a first static point cloud and a third category dynamically acquired point cloud. The V-PCC encoding and decoding framework may be configured to compress a second category dynamic point cloud. The G-PCC encoding and decoding framework is also referred to as a point cloud encoder/decoder TMC13. The V-PCC encoding and decoding framework is also known as a point cloud encoder/decoder TMC2.

The point cloud encoder and the point cloud decoder applicable to the embodiment of the present disclosure will be described below by taking the G-PCC encoding and decoding framework as an example.

Figure 2:
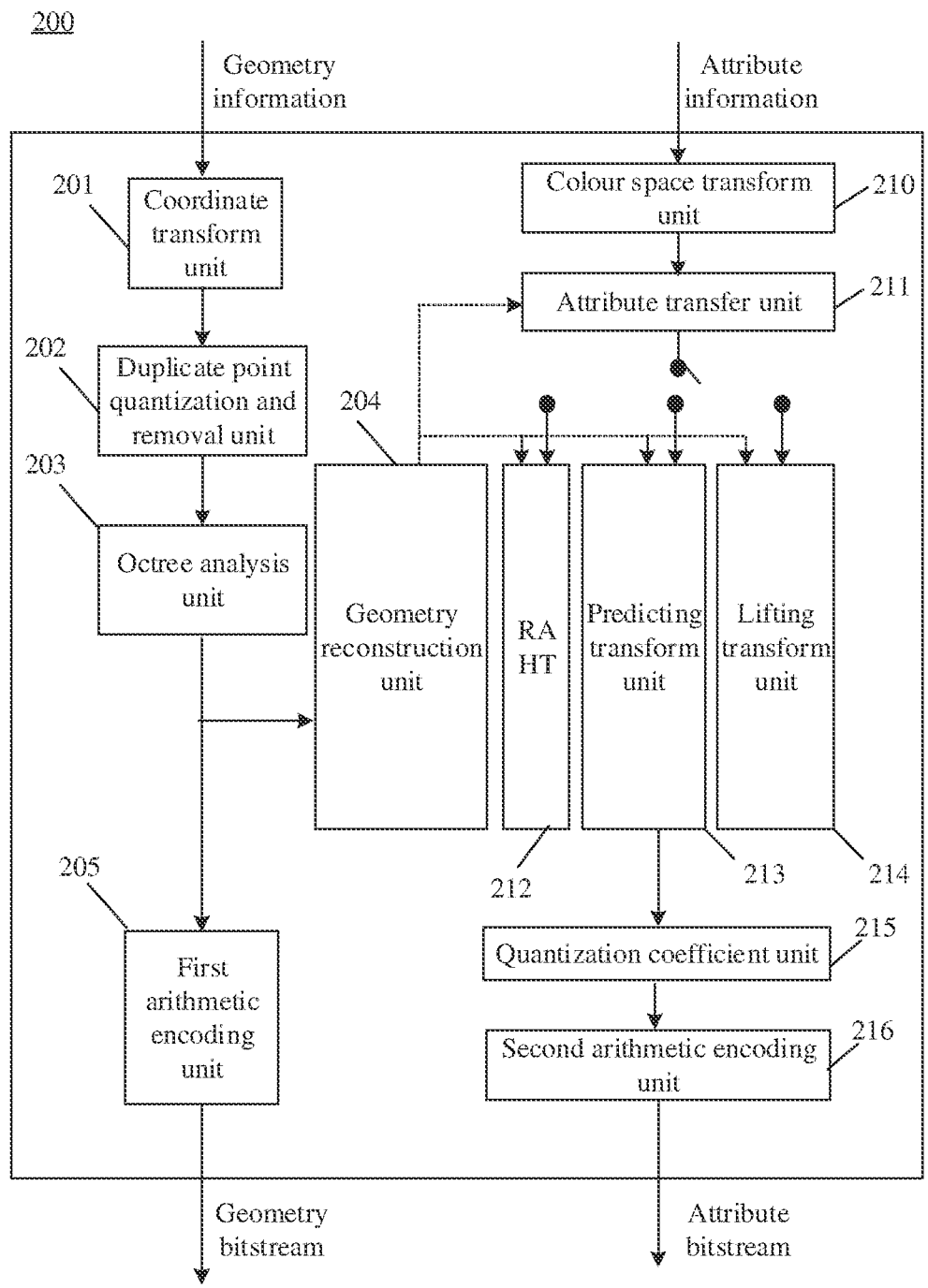
FIG. 2 is a schematic block diagram of a point cloud encoder provided by an embodiment of the present disclosure.

FIG. 2 is a schematic block diagram of a point cloud encoder provided by an embodiment of the present disclosure.

It can be known from the above that the points in the point cloud may include position information of the points and attribute information of the points. The encoding of the points in the point cloud may include position encoding and attribute encoding. In some examples, the position information of the points in the point cloud may also be referred to as geometry information, and the corresponding position encoding of points in the point cloud may also be referred to as geometry encoding.

A process of position encoding includes that: preprocessing, such as coordinate transform, quantization, and removal of duplicate points, is performed on the points in the point cloud; then, geometry encoding, such as octree construction, is performed on the preprocessed point cloud, and geometry encoding is performed based on the constructed octree to form a geometry bitstream. Meanwhile, the position information of each point in the point cloud data is reconstructed based on the position information output by the constructed octree, so as to obtain a reconstructed value of the position information of each point.

A process of attribute encoding includes that: one of three prediction modes is selected to perform point cloud prediction by giving original values of the reconstruction information and attribute information of the position information of an input point cloud, predicted results are quantized, and arithmetic encoding is performed to form an attribute bitstream.

As shown in FIG. 2, the position encoding may be implemented by the following units.

A coordinate transform (Transform coordinates) unit 201, a duplicate point quantization and removal (Quantize and remove points) unit 202, an octree analysis (Analyze octree) unit 203, a geometry reconstruction (Reconstruct geometry) unit 204, and a first arithmetic encoding (Arithmetic encode) unit 205.

The coordinate transform unit 201 may be configured to transform a world coordinates of the points in the point cloud into relative coordinates. For example, the minimum values of xyz coordinate axes are subtracted from the geometry coordinates of the points respectively, which is equivalent to a direct current removal operation, so as to transform the coordinates of the points in the point cloud from world coordinates to relative coordinates.

The duplicate point quantization and removal unit 202 may reduce the number of coordinates by quantization. After the quantization, the original different points may be endowed with the same coordinates. On this basis, duplicate points may be deleted through a de-duplication operation. For example, a plurality of clouds with the same quantization position and different attribute information may be merged into one cloud through attribute transform. In some embodiments of the present disclosure, the duplicate point quantization and removal unit 202 may be an optional unit module.

The octree analysis unit 203 may encode the position information of the quantized points in an octree encoding mode. For example, the point cloud is partitioned in the form of an octree. Therefore, the positions of the points may be in one-to-one correspondence with the positions of the octree. The positions where there are points in the octree are counted, and the flags of the positions are recorded as 1, so as to perform geometry encoding.

The geometry reconstruction unit 204 may perform position reconstruction based on the position information output by the octree analysis unit 203, so as to obtain a reconstructed value of the position information of each point in the point cloud data.

The first arithmetic encoding unit 205 may perform arithmetic encoding on the position information output by the octree analysis unit 203 in an entropy encoding mode, that is, a geometry bitstream is generated from the position information output by the octree analysis unit 203 through an arithmetic encoding mode. The geometry bitstream is also referred to as a geometry bitstream.

The attribute encoding may be implemented by the following units.

A colour space transform (Transform colours) unit 210, an attribute transfer (Transfer attributes) unit 211, a Region Adaptive Hierarchical Transform (RAHT) unit 212, a predicting transform unit 213, a lifting transform unit 214, a quantization coefficient (Quantize coefficients) unit 215, and a second arithmetic encoding unit 216.

It is to be noted that the point cloud encoder 200 may include more, fewer, or different functional components from those in FIG. 2.

The colour space transform 210 may be configured to transform the RGB colour space of the points in the point cloud into a YCbCr format or other formats.

The attribute transfer unit 211 may be configured to transfer the attribute information of the points in the point cloud, so as to minimize attribute distortion. For example, the attribute transfer unit 211 may be configured to obtain original values of the attribute information of the points. For example, the attribute information may be colour information of the points.

After the original value of the attribute information of the point is obtained through transfer of the attribute transfer unit 211, any predicting unit may be selected to predict the points in the point cloud. The predicting unit may include: a RAHT 212, a predicting transform unit 213, and a lifting transform unit 214.

In other words, any one of the RAHT 212, the predicting transform unit 213, and the lifting transform unit 214 may be configured to predict the attribute information of the points in the point cloud, so as to obtain a prediction value of the attribute information of the point, thereby obtaining a residual value of the attribute information of the point based on the prediction value of the attribute information of the point. For example, the residual value of the attribute information of the point may be obtained by subtracting the prediction value of the attribute information of the point from the original value of the attribute information of the point.

In an embodiment of the present disclosure, the predicting transform unit 213 may also be configured to generate a LOD. A process of generating the LOD includes that: Euclidean distances between points are acquired according to the position information of the points in the point cloud; and partitioning the points into different detail expression levels according to the Euclidean distances. In one embodiment, Euclidean distances in different ranges may be partitioned into different detail expression levels after the Euclidean distance is sorted. For example, one point may be randomly selected to serve as a first detail expression level. Then, the Euclidean distances between the remaining points and the point are calculated, and the points with the Euclidean distances meeting a first threshold value requirement are grouped into a second detail expression level. A centroid of the point in the second detail expression level is acquired. The Euclidean distances between the points beyond the first detail expression level and the second detail expression level and the centroid are calculated, and the points with the Euclidean distances meeting a second threshold value requirement are grouped into a third detail expression level. By analogy, all points are grouped into the detail expression levels. The number of the points of each LOD may be gradually increased by adjusting the threshold values of the Euclidean distances. It is to be understood that the LOD may also be partitioned in other modes. No limits are made thereto in the present disclosure.

It is to be noted that, the point cloud may be directly partitioned into one or more detail expression levels, or the point cloud may also be partitioned into a plurality of point cloud slices, and then, each point cloud slice is partitioned into one or more LODs.

For example, the point cloud is partitioned into a plurality of point cloud slices. The number of the points of each point cloud slice may range from 550,000 to 1100,000. Each point cloud slice may be regarded as a separate point cloud. Each point cloud slice may also be partitioned into a plurality of detail expression levels. Each detail expression level includes a plurality of points. In one embodiment, the detail expression level may be partitioned according to the Euclidean distances between the points.

The quantization unit 215 may be configured to quantize the residual values of the attribute information of the points. For example, if the quantization unit 215 is connected to the predicting transform unit 213, the quantization unit may be configured to quantize the residual values of the attribute information of the points output by the predicting transform unit 213.

For example, the residual values of the attribute information of the points output by the predicting transform unit 213 are quantized by using a quantization step, so as to improve the system performance.

The second arithmetic encoding unit 216 may perform entropy coding on the residual value of the attribute information of the point by using zero run length coding, so as to obtain an attribute bitstream. The attribute code may be bitstream information.

Figure 3:
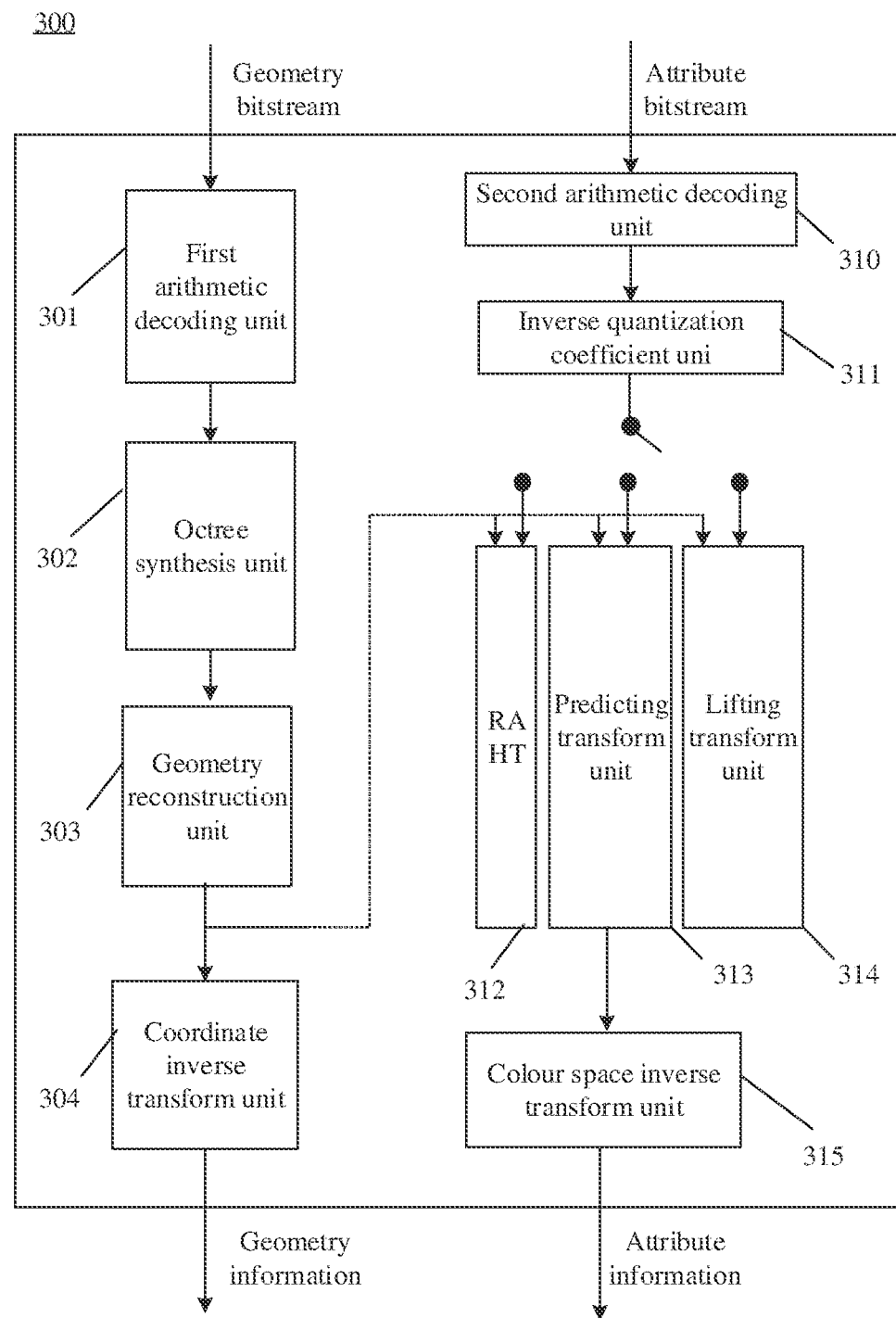
FIG. 3 is a schematic block diagram of a decoder provided by an embodiment of the present disclosure.

FIG. 3 is a schematic block diagram of a decoder provided by an embodiment of the present disclosure.

As shown in FIG. 3, the decoding framework 300 may acquire the bitstream of the point cloud from the encoding device, and obtain the position information and the attribute information of the points in the point cloud by decoding. The decoding of the point cloud includes position decoding and attribute decoding.

A process of position decoding includes that: arithmetic decoding is performed on the geometry bitstream; merging is performed after constructing the octree, and the position information of the points is reconstructed to obtain reconstructed information of the position information of the points; and coordinate transform is performed on the reconstructed information of the position information of the points, so as to obtain the position information of the points. The position information of the points may also be referred to as geometry information of the points.

A process of attribute decoding includes that: residual values of the attribute information of the points in the point cloud are acquired; inverse quantization is performed on the residual values of the attribute information of the points, so as to obtain the residual values of the attribute information of the points after the inverse quantization; based on the reconstructed information of the position information of the points acquired in the process of position decoding, one of the following three predicting modes, such as the RAHT, the predicting transform, and the lifting transform, is selected to perform point cloud predicting to obtain prediction values; the prediction values are added to the residual values to obtain reconstructed values of the attribute information of the points; and colour space inverse transform is performed on the reconstructed values of the attribute information of the points, so as to obtain a decoded point cloud.

As shown in FIG. 3, the position decoding may be implemented by the following units: a first arithmetic decoding unit 301, an octree synthesis (synthesize octree) unit 302, a geometry reconstruction (Reconstruct geometry) unit 304, and a coordinate inverse transform (inverse transform coordinates) unit 305.

The attribute encoding may be implemented by the following units: a second arithmetic decoding unit 310, an inverse quantization unit 311, a RAHT unit 312, a predicting transform unit 313, a lifting transform unit 314, and a colour space inverse transform (inverse transform colours) unit 315.

It is to be noted that the decompression is an inverse process of compression. Similarly, the functions of various units in the decoder 300 may refer to the functions of the corresponding units in the encoder 200. In addition, the point cloud decoder 300 may include more, less, or different functional components from those in FIG. 3.

For example, the decoder 300 may partition the point cloud into a plurality of LODs according to the Euclidean distances between the points in the point cloud; then, the attribute information of the points in the LODs are decoded in sequence, for example, the number (zero_cnt) of zeros in the zero run length coding technology is counted, so as to decode a residual based on the zero_cnt; and next, a decoding framework 200 may perform inverse quantization based on the decoded residual value, and add the residual value after the inverse quantization and the prediction value of the current point to obtain a reconstructed value of the point cloud until all point clouds are decoded. The current point will be used as the nearest point of the points in a subsequent LOD, and the attribute information of the subsequent point is predicted by using the reconstructed value of the current point.

It can be known from the above FIG. 2 that the point cloud encoder 200 mainly includes two parts in terms of function: a position encoding module and an attribute encoding module. The position encoding module is configured to realize the encoding of the position information of the point cloud to form a geometry bitstream. The attribute encoding module is configured to realize the encoding of the attribute information of the point cloud to form an attribute bitstream. The present disclosure mainly relates to the encoding of the attribute information. The attribute encoding module in the point cloud encoder involved in the present disclosure is introduced below in combination with FIG. 4.

Figure 4:
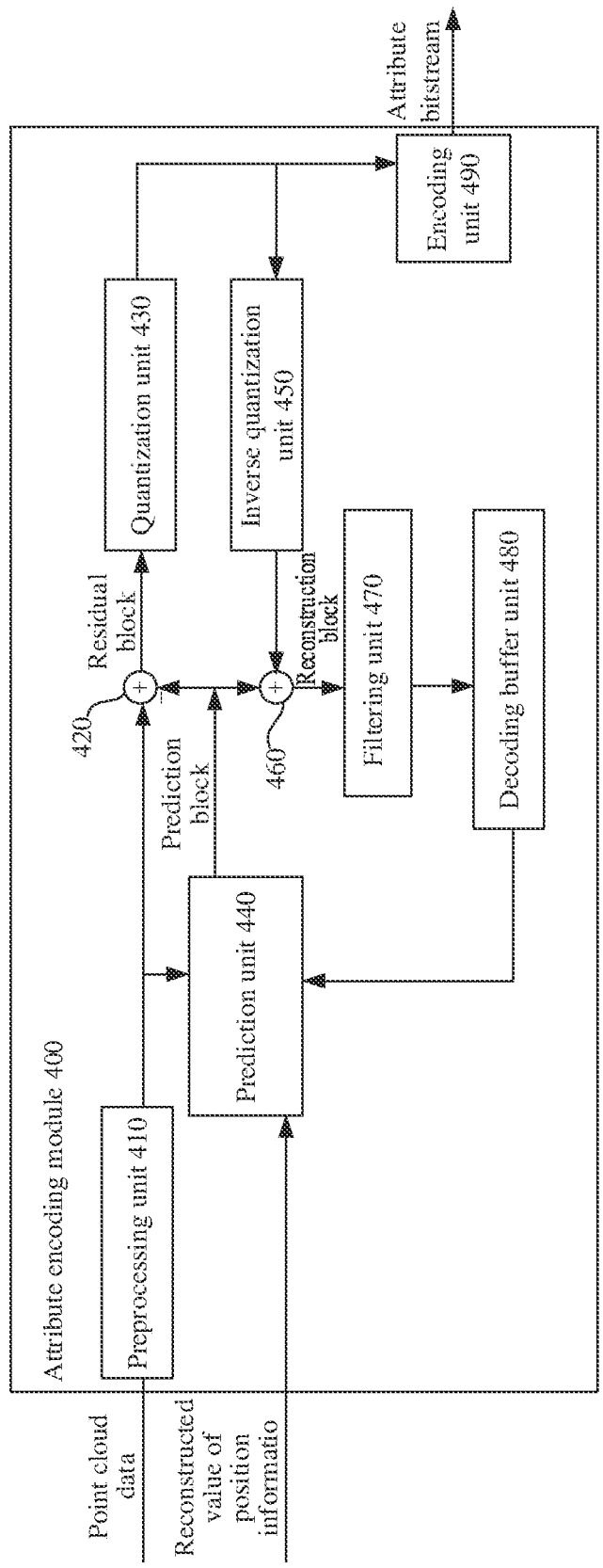
FIG. 4 is a partial block diagram of an attribute encoding module involved in an embodiment of the present disclosure.

FIG. 4 is a partial block diagram of an attribute encoding module involved in an embodiment of the present disclosure. The attribute encoding module 400 may be understood as a unit for realizing the encoding of the attribution information in the point cloud encoder 200 as shown in the above FIG. 2. As shown in FIG. 4, the attribute encoding module 400 includes: a preprocessing unit 410, a residual unit 420, a quantization unit 430, a predicting unit 440, an inverse quantization unit 450, a reconstruction unit 460, a filtering unit 470, a decoding buffer unit 480, and an encoding unit 490. It is to be noted that the attribute encoding module 400 may further include more, fewer, or different functional components.

In some embodiments, the preprocessing unit 410 may include a colour space transform unit 210 and an attribute transfer unit 211 as shown in FIG. 2.

In some embodiments, the quantization unit 430 may be understood as the quantization coefficient unit 215 in above FIG. 2. The encoding unit 490 may be understood as the second arithmetic encoding unit 216 in above FIG. 2.

In some embodiments, the predicting unit 440 may include the RAHT 212, the predicting transform unit 213, and the lifting transform unit 214 as shown in above FIG. 2. The predicting unit 440 is specifically configured to acquire the reconstructed information of the position information of the point in the point cloud, and select any one of the RAHT 212, the predicting transform unit 213, and the lifting transform unit 214 to predict the attribute information of the points in the point cloud based on the reconstructed information of the position information of the point, so as to obtain prediction values of the attribute information of the points.

The residual unit 420 may obtain the residual value of the attribute information of the points in the point cloud based on original values of the attribute information of the points in the point cloud and the reconstructed values of the attribute information of the points in the point cloud. For example, the residual values of the attribute information of the points are obtained by subtracting the reconstructed values of the attribute information of the points from the original values of the attribute information of the points.

The quantization unit 430 may quantized the residual value of the attribute information. Specifically, the quantization unit 430 may quantize the residual value of the attribute information based on a Quantization Parameter (QP) value associated with the point cloud. The point cloud encoder may adjust the quantization degree applied to the point by adjusting the QP value associated with the point cloud.

The inverse quantization unit 450 may apply inverse quantization to the quantized residual value of the attribute information, so as to reconstruct the residual value of the attribute information from the quantized residual value of the attribute information.

The reconstruction unit 460 may add the reconstructed residual values of the attribute information to the prediction values generated by the predicting unit 440, so as to generate reconstructed values of the attribute information of the points in the point cloud.

The filtering unit 470 may eliminate or reduce the noise in a reconstruction operation.

The decoding cache unit 480 may store the reconstructed values of the attribute information of the points in the point cloud. The predicting unit 440 may predict the attribute information of other points by using the reconstructed values of the attribute information of the points.

It can be known from above FIG. 3 that the point cloud decoder 300 mainly includes two parts in terms of function: a position decoding module and an attribute decoding module. The position decoding module is configured to realize the decoding of the geometry bitstream of the point cloud to obtain the position information of the point. The attribute decoding module is configured to realize the decoding of the attribute bitstream of the point cloud to obtain the attribute information of the point. The attribute decoding module in the point cloud decoder involved in the present disclosure is introduced below in combination with FIG. 5.

Figure 5:
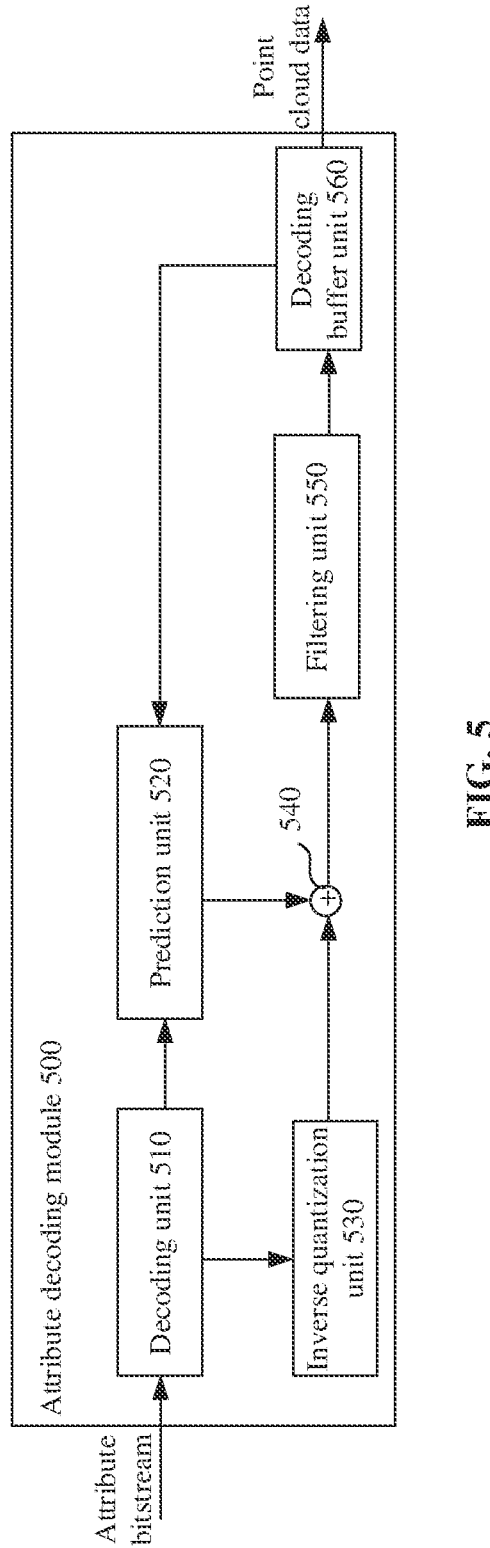
FIG. 5 is a partial block diagram of an attribute decoding module involved in an embodiment of the present disclosure.

FIG. 5 is a partial block diagram of an attribute decoding module involved in an embodiment of the present disclosure. The attribute decoding module 500 may be understood as a unit for realizing the decoding of the attribute bitstream in the point cloud decoder 300 as shown in above FIG. 3. As shown in FIG. 5, the attribute decoding module 500 includes: a decoding unit 510, a predicting unit 520, an inverse quantization unit 530, a reconstruction unit 540, a filtering unit 550, and a decoding buffer unit 560. It is to be noted that the attribute decoding module 500 may include more, fewer, or different functional components.

The attribute decoding module 500 may receive an attribute bitstream. The decoding unit 510 may parse the attribute bitstream to extract a syntax element from the attribute bitstream. As part of parsing the attribute bitstream, the decoding unit 510 may parse the encoded syntax element in the attribute bitstream. The predicting unit 520, the inverse quantization unit 530, the reconstruction unit 540, and the filtering unit 550 may decode the attribute information according to the syntax element extracted from the attribute bitstream.

In some embodiments, the predicting unit 520 may determine a predicting mode of the points according to one or more syntax elements parsed from the attribute bitstream, and predict the attribute information of the points by using the determined predicting mode.

The inverse quantization unit 530 may perform inverse quantization (dequantization) on the quantized residual values of the attribute information associated with the points in the point cloud, so as to obtain the residual values of the attribute information of the points. The inverse quantization unit 530 may determine the quantization degree by using the QP value associated with the point cloud.

The reconstruction unit 540 may reconstruct the attribute information of the points in the point cloud by using the residual values of the attribute information of the points in the point cloud and the prediction values of the attribute information of the points in the point cloud. For example, the reconstruction unit 540 may add the residual values of the attribute information of the points in the point cloud to the prediction values of the attribute information of the points to obtain the reconstructed value of the attribute information of the point.

The filtering unit 550 may eliminate or reduce the noise in a reconstruction operation.

The attribute decoding module 500 may store the reconstructed values of the attribute information of the points in the point cloud in the decoding buffer unit 560. The attribute decoding module 500 may take a reconstructed value of the attribute information in the decoding buffer unit 560 as a reference point for subsequent predicting, or transmit the reconstructed value of the attribute information to a display apparatus for displaying.

A basic process of encoding and decoding the attribute information of a point cloud is as follows: at an encoding end, the attribute information of point cloud data is preprocessed to obtain the original values of the attribute information of points in the point cloud. The predicting unit 410 selects one of the abovementioned three predicting modes to predict the attribute information of the points in the point cloud based on the reconstructed values of the position information of the points in the point cloud, so as to obtain prediction values of the attribute information. The residual unit 420 may calculate the residual values of the attribute information based on the original values of the attribute information of the points in the point cloud and the prediction values of the attribute information, that is, the difference between the original values of the attribute information of the points in the point cloud and the prediction values of the attribute information of the points in the point cloud is taken as the residual values of the attribute information of the points in the point cloud. The residual values are quantized by the quantization unit 430, which can remove information insensitive to human eyes to eliminate visual redundancy. The encoding unit 490 receives the quantized residual values of the attribute information output by the quantization unit 430, and may encode the quantized residual values of the attribute information and output an attribute bitstream.

In addition, the inverse quantization unit 450 may also receive the quantized residual values of the attribute information output by the quantization unit 430, and perform inverse quantization on the quantized residual values of the attribute information, so as to obtain the residual values of the attribute information of the points in the point cloud. The reconstruction unit 460 obtains the residual values of the attribute information of the points in the point cloud output by the inverse quantization unit 450 and the prediction values of the attribute information of the points in the point cloud output by the predicting unit 410, and add the residual values of the attribute information of the points in the point cloud to the prediction values, so as to obtain reconstructed values of the attribute information of the points. The reconstructed values of the attribute information of the points is buffered in the decoding buffered unit 480 after being filtered by the filtering unit 470, and is used for a subsequent predicting process of other points.

At a decoding end, the decoding unit 510 may parse the attribute bitstream to obtain the residual values, the predicted information, the quantization coefficient, and the like of the quantized attribute information in the point cloud. The predicting unit 520 predicts the attribute information of the points in the point cloud based on the predicted information to generate the prediction values of the attribute information of the points. The inverse quantization unit 530 performs quantization on the quantized residual values of the attribute information by using the quantization coefficient obtained from the attribute bitstream, so as to obtain residual values of the attribute information of the points. The reconstruction unit 440 adds the prediction values and the residual values of the attribute information of the points to obtain the reconstructed values of the attribute information of the points. The filtering unit 550 performs filtering on the reconstructed values of the attribute information of the points to obtain decoded attribute information.

It is to be noted that mode information or parameter information of prediction, quantization, encoding, filtering, and the like determined when the attribute information is encoded at the encoding end are carried in the attribute bitstream when necessary. The decoding end determines the same mode information or parameter information of prediction, quantization, encoding, filtering and the like by parsing the attribute bitstream and analyzing according to existing information, so as to ensure that the reconstructed values of the attribute information obtained at the encoding end are the same as the reconstructed values of the attribute information obtained at the decoding end.

The above is a basic process of a point cloud encoder/decoder under a G-PCC encoding/decoding framework. With the development of technology, some modules or steps of the framework or process may be optimized. The present disclosure is applicable to the basic process of the point cloud encoder/decoder under the G-PCC encoding/decoding framework, but is not limited to the framework and process.

The point cloud encoding system, the point cloud encoder, and the point cloud decoder involved in the embodiments of the present disclosure are introduced above. On this basis, the technical solution provided by the embodiment of the present disclosure is described in detail below in combination with specific embodiments.

The encoding end is introduced below in combination with FIG. 6.

Embodiment 1

Figure 6:
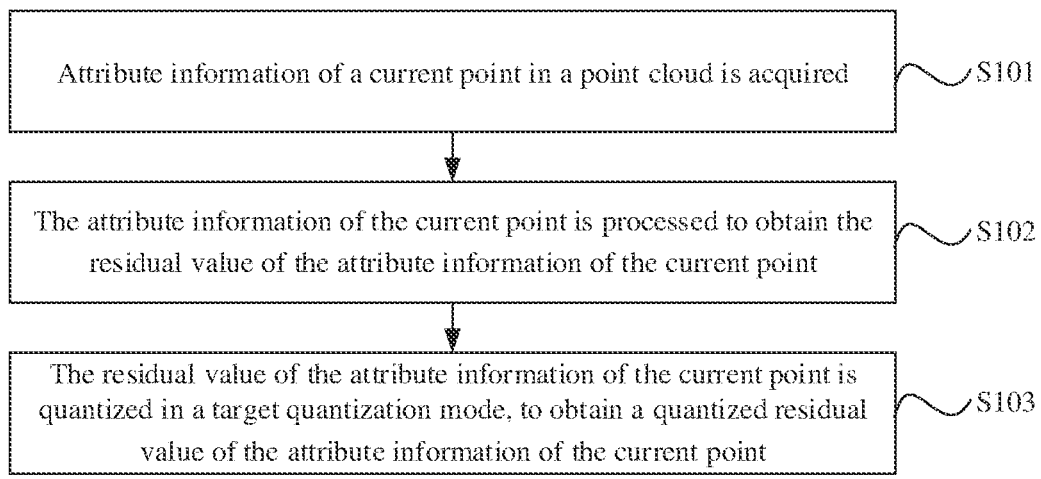
FIG. 6 is a schematic flowchart of a method for point cloud encoding provided by an embodiment of the present disclosure.

FIG. 6 is a schematic flowchart of a method for point cloud encoding provided by an embodiment of the present disclosure. The embodiment of the present disclosure is applied to the point cloud encoder as shown in FIG. 1, FIG. 2, and FIG. 4. As shown in FIG. 6, the method of the embodiment of the present disclosure includes the following operations.

At S101, attribute information of a current point in a point cloud is acquired.

In some embodiments, the current point is also referred to as a current point, a point to be processed, a point being processed, a point to be encoded, and the like.

The point cloud includes a plurality of points. Each point may include geometry information of the point and attribute information of the point. The geometry information of the point may also be referred to as the position information of the point. The position information of the point may be 3D coordinate information of the point. The attribute information of the point may include colour information and/or reflectivity.

In one example, the point cloud encoder may take original attribute information of the point in the point cloud as an original value of the attribute information of the point.

In another example, as shown in FIG. 2, after the point cloud encoder obtains the original attribute information of the point in the point cloud, the original attribute information is subjected to colour space transform. For example, the RGB colour space of the point is transformed into a YCbCr or other formats. The point after the colour space transform is subjected to attribute transfer to minimize attribute distortion, so as to obtain the original value of the attribute information of the point.

At S102, the attribute information of the current point is processed to obtain the residual value of the attribute information of the current point.

In some embodiments, the prediction value of the attribute information of the current point in the point cloud is determined according to the geometry information of the point in the point cloud. For example, the geometry of the point in the point cloud is encoded to obtain a reconstructed value of the geometry information of the current point in the point cloud; the prediction value of the attribute information of the current point is determined according to the reconstructed value of the geometry information of the current point; and the residual value of the attribute information of the current point is determined according to the prediction value of the attribute information of the current point and the original value of the attribute information of the current point.

In some embodiments, the original value of the attribute information is also referred to as a true value of the attribute information.

It is to be noted that the point cloud encoder encodes the attribute information of the point in the point cloud after encoding the geometry information of the point in the point cloud. Referring to FIG. 2, in an encoding process of the geometry information, the first arithmetic encoding unit 205 encodes the geometry information of the point processed by the octree unit 203 to form a geometry bitstream, and the geometry reconstruction unit 204 reconstructs the geometry information of the point after being processed by the octree unit 203, so as to obtain a reconstructed value of the geometry information. The predicting unit may obtain the reconstructed value of the geometry information output by the geometry reconstruction unit 204.

For example, the points in the point cloud are sorted according to the reconstructed values of the geometry information of the points in the point cloud, so as to obtain a sorted point cloud. For example, Morton codes of the points are determined according to the reconstructed values of the geometry information of the points in the point cloud, and the points in the point cloud are sorted according to the Morton codes, so as to obtain a Morton order of the points. For one current point of the sorted point cloud, at least one neighbouring point of the current point is acquired from the points with encoded attribute information. A prediction value of the attribute information of the current point is predicted according to the reconstructed value of the attribute information of at least one neighbouring point.

The modes that the prediction value of the attribute information of the current point is predicted according to the reconstructed value of the attribute information of at least one neighbouring point include, but are not limited to, the following.

Mode one, an average value of the reconstructed value of the attribute information of the at least one neighbouring point is taken as the prediction value of the attribute information of the current point.

Mode two, assuming that at least one neighbouring point is K neighbouring points, the reconstructed value of the attribute information of each of the K neighbouring points is taken as a prediction reference value of the current point, and K prediction reference values are obtained. In addition, an average value of the reconstructed values of the attribute information of the K neighbouring points is taken as another prediction reference value of the current point. Thus, the current point has K+1 prediction reference values. Rate-Distortion Optimization (RDO) cost corresponding to each of the K+1 prediction reference values is calculated. The prediction reference value with the minimum RDO cost is taken as the prediction value of the attribute information of the current point.

Then, the residual values of the attribute information of the points in the point cloud are determined according to the prediction values of the attribute information of the points in the point cloud.

For example, the difference between the original value of the attribute information and the prediction value of the attribute information of the current point is determined as a residual value of the attribute information of the current point.

For example, for one current point in the point cloud, the prediction value of the attribute information of the current point and the original value of the attribute information of the current point may be obtained according to the above operations, and the difference between the original value of the attribute information of the current point and the prediction value of the attribute information of the current point is taken as the residual value of the attribute information of the current point.

For example, a residual value of the attribute information of the current point is determined according to the following formula (1):

$$\text{attrResidual} = \text{attrValue} - \text{attrPredValue} \tag{1}$$

Herein, attrResidual is the residual value of the attribute information, attrValue is the original value of the attribute information, and attrPredValue is the prediction value of the attribute information.

At S103, the residual value of the attribute information of the current point is quantized in a target quantization mode, to obtain a quantized residual value of the attribute information of the current point.

Referring to FIG. 4, it can be known that, in an encoding process of the attribute information at present, the residual unit 420 may calculate the residual values of the attribute information based on the original values of the attribute information of the points in the point cloud and the prediction values of the attribute information of the points in the point cloud. The residual values are quantized by the quantization unit 430, which can remove information insensitive to human eyes to eliminate visual redundancy. The inverse quantization unit 450 may also receive the quantized residual values of the attribute information output by the quantization unit 430, and perform inverse quantization on the quantized residual values of the attribute information, so as to obtain the residual values of the attribute information of the points in the point cloud. The reconstruction unit 460 obtains the residual values of the attribute information of the points in the point cloud output by the quantization unit 430 and the prediction values of the attribute information of the points in the point cloud output by the predicting unit 410, and add the residual values of the attribute information of the points in the point cloud to the prediction value, so as to obtain a reconstructed values of the attribute information of the points. The reconstructed values of the attribute information of the points are buffered in the decoding buffer unit 480, and are used for a subsequent predicting process of other points.

It can be known from the above that, at present, in an encoding process of the attribute information, the residual value of the attribute information of the points are quantized. However, the quantization effect of the quantization process at present is poor.

In order to solve the technical problem, in the embodiment of the present disclosure, the residual value of the attribute information of the current point is quantized in a target quantization mode to obtain the quantized residual value of the attribute information of the current point. The target quantization mode includes at least two of the following quantization modes: a first quantization mode, a second quantization mode, and a third quantization mode. The first quantization mode is to set a quantization parameter increment for a quantization parameter of at least one point in the point cloud, the second quantization mode is to weight the residual values of the points in the point cloud, and the third quantization mode is to perform lossless encoding on the residual value of the attribute information of at least one point in the point cloud.

In some embodiments, the first quantization mode may also be referred to as a progressive quantization mode. The second quantization mode may also be referred to as an adaptive quantization mode. The third quantization mode may also be referred to as an equal interval non-quantization mode.

Embodiment 2

Figure 7:
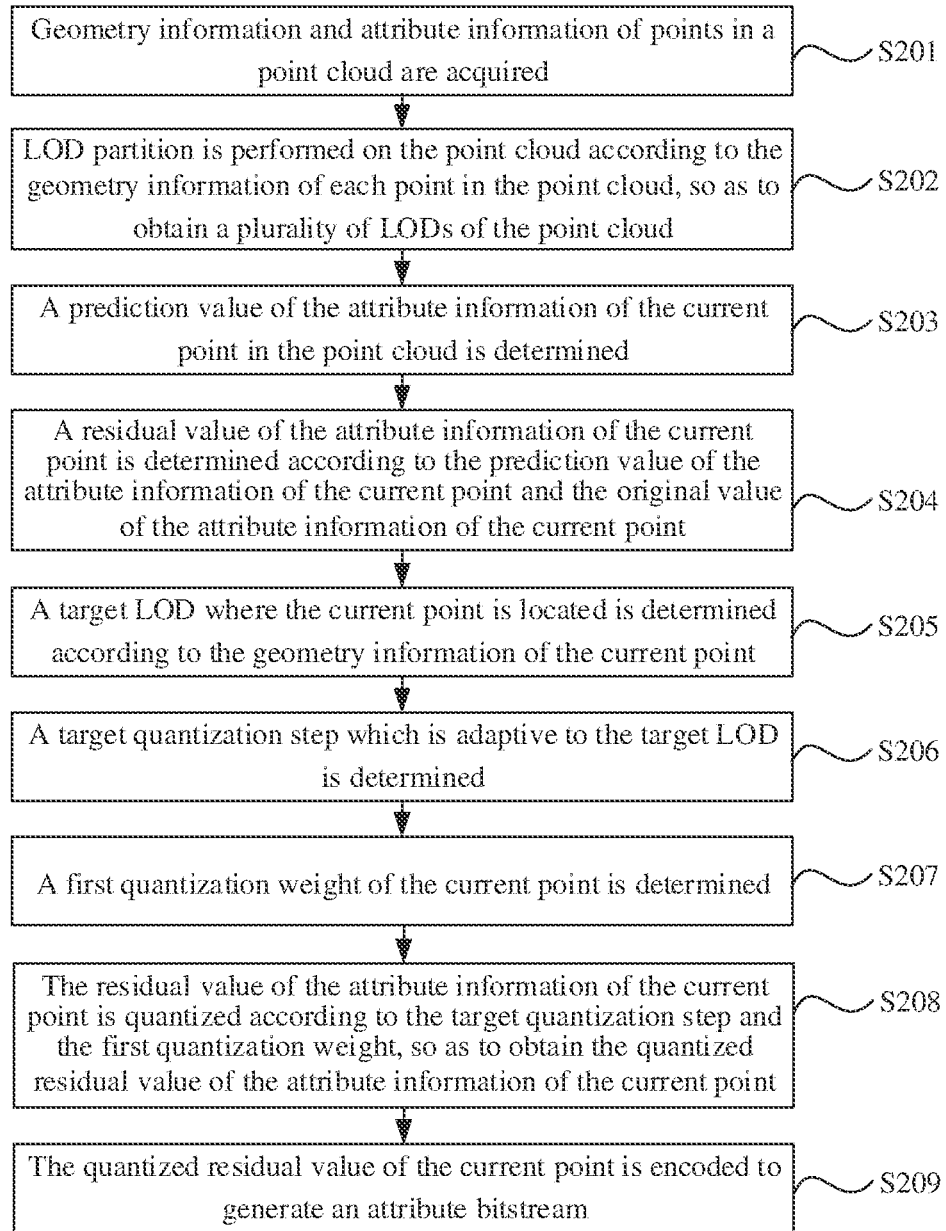
FIG. 7 is a schematic flowchart of a method for point cloud encoding provided by an embodiment of the present disclosure.

If the target quantization mode includes the first quantization mode and the second quantization mode, a point cloud encoding process of the embodiment of the present disclosure is as shown in FIG. 7.

FIG. 7 is a schematic flowchart of a method for point cloud encoding provided by an embodiment of the present disclosure, which includes the following operations.

At S201, geometry information and attribute information of points in a point cloud are acquired.

S202, LOD partition is performed on the point cloud according to the geometry information of each point in the point cloud, so as to obtain a plurality of LODs of the point cloud. Each LOD includes at least one detail expression level, and each detail expression level includes at least one point.

In one example, Morton codes of the points are determined according to the geometry information of the points in the point cloud, and sorting is performed according to the Morton codes, so as to obtain a Morton order of the point cloud. The LOD partition is performed based on the Morton order of the point cloud.

In another an example, the point cloud is sorted according to the geometry information of the points in the point cloud, so as to obtain an original order of the point cloud. The LOD partition is performed based on the original order of the point cloud.

The LOD partition is performed on the sorted point cloud. For example, one point is randomly selected from the sorted point cloud to serve as a first detail expression level. Then, Euclidean distances between the remaining points and the point is calculated, and the points with the Euclidean distances meeting a first threshold value requirement are grouped into a second detail expression level. A centroid of the point in the second detail expression level is acquired. The Euclidean distances between the points beyond the first detail expression level and the second detail expression level and the centroid is calculated, and the points with the Euclidean distances meeting a second threshold value requirement are grouped into a third detail expression level. By analogy, all points are grouped into the detail expression level. The points in each detail expression level are sorted in the detail expression level according to the magnitudes of the reconstructed values of the attribute information of the points.

It is to be understood that the above LOD partition mode is only an example. The LOD partition mode may also adopt other modes. No limits are made thereto in the present disclosure.

Figure 8:
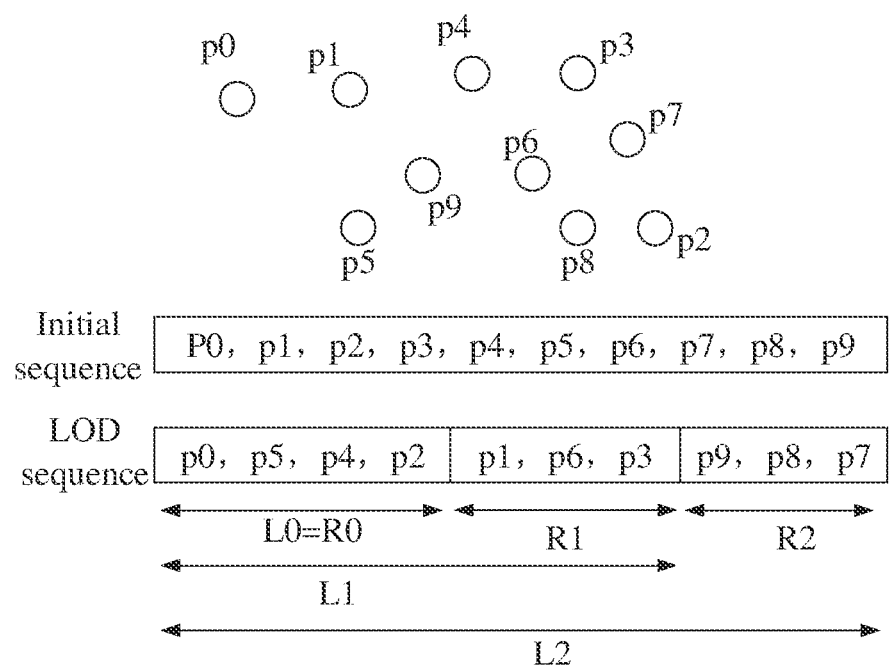
FIG. 8 is a schematic diagram of Level of Detail (LOD) partition of partial point cloud.

FIG. 8 is a schematic diagram of LOD partition of partial point cloud. An upper part of FIG. 8 include 10 points in an original point cloud, p0, p2, . . . , p9. The 10 points are sorted according to the geometry information of the 10 points, so as to obtain the original order of p0, p2, . . . , p9. The LOD partition is performed on p0, p2, . . . , p9 based on the original order of p0, p2, . . . , p9, so as to obtain three detail expression levels. These three detail expression levels do not overlap with each other. For example, the first detail expression level R0 includes p0, p5, p4, and p2; the detail expression level R1 includes p1, p6, and p3; and the third detail expression level R2 includes p9, p8, and p7. The first detail expression level R0 forms a first LOD, which is recorded as L0. The first LOD and the second detail expression level R1 form a second LOD, which is recorded as L1. The second LOD and the third detail expression level R2 form a third LOD, which is recorded as L2. The number of points included in the LODs is gradually increased level by level.

Referring to FIG. 8, a plurality of detail expression levels obtained by LOD partition may be sorted according to the number of levels from low to high, so as obtain a LOD order of the point cloud. In some embodiments, the plurality of detail expression levels may be sorted according to the number of levels from high to low, so as obtain the LOD order of the point cloud.

At S203, a prediction value of the attribute information of the current point in the point cloud is determined.

For example, sorting is performed according to the plurality of detail expression levels of the point cloud based on the levels from low to obtain the LOD order of the point cloud. Prediction values of attribute information of the points in the point cloud are determined based on the LOD order of the point cloud.

In some embodiments, taking one current point to be encoded in the point cloud as an example, the above S203 includes, but is not limited to, the following modes.

Mode one, based on the LOD order of the point cloud, at least one neighbouring point of the current point is obtained from the encoded point cloud. For example, three nearest points of the current point are found from the encoded point cloud according to a KNN algorithm, and the weighted average value of the reconstructed values of the attribute information of the three nearest points is taken as the prediction value of the attribute information of the current point.

Mode two, at least one neighbouring point of the current point is acquired from the encoded point cloud based on the LOD order of the point cloud. For example, three nearest points of the current point are found from the encoded point cloud according to the KNN algorithm, and a reconstructed value of the attribute information of each of the three nearest points is taken as a prediction reference value of the current point, so as to obtain three predicted reference values. In addition, an average value of the reconstructed values of the attribute information of the three nearest points is taken as another prediction reference value of the current point. Thus, the current point has 3+1 prediction reference values in total. Rate-Distortion Optimization (RDO) cost corresponding to each of the 3+1 prediction reference values is calculated. The prediction reference value with the minimum RDO cost is taken as the prediction value of the attribute information of the current point.

In one example, when the RDO cost is determined, a reciprocal of a distance (for example, a Euclidean distance) between the neighbouring point and the current point is taken as a weight of the neighbouring point.

In some embodiments, a prediction index corresponding to the above 3+1 prediction reference values may be determined according to the following Table 1.

TABLE 1

| Prediction index | Prediction reference value |
|---|---|
| 0 | Weighted average value |
| 1 | P4 (First neighbouring point) |
| 2 | P5 (Second neighbouring point) |
| 3 | P0 (Third neighbouring point) |

For example, taking the current point being the point p2 in FIG. 8 as an example, the three nearest neighbouring points to point p2 are p4, p5, and p1. Herein, p4 is the nearest point of the current point p2 in the three neighbouring points of the p2, and p4 is recorded as the first neighbouring point, that is, the $1^{st}$ nearest point, as shown in Table 1, and the corresponding prediction index thereof is 1. P5 is the point of which the distance from it to the current point p2 is only less than that of p4 in the three neighbouring points of the current point p2, and p5 is recorded as the second neighbouring point, that is, the $2^{nd}$ nearest point, as shown in Table 1, and the corresponding prediction index thereof is 2. P1 is the point which is the farthest from the current point p2 in the three neighbouring points of the current point p2, and p1 is recorded as the third neighbouring point, that is, the $3^{rd}$ nearest point, as shown in Table 1, and the corresponding prediction index thereof is 3. As shown in Table 1, the prediction index corresponding to the weighted average value of the reconstructed values of the attribution information of p4, p5, and p1 is 0.

According to the above method, the RDO cost corresponding to each of the 3+1 predicted reference values, i.e., p4, p5, p1, and the average value of the attribute information of p4, p5, and p1, are calculated The prediction reference value with the minimum RDO cost is taken as the prediction value of the attribute information of the current point. For example, the prediction reference value with the minimum RDO cost is the reconstructed value of the attribute information of point 5.

Optionally, the point cloud encoder may carry the prediction index 2 corresponding to the point p5 in a subsequently formed attribute bitstream. Thus, a decoding end may directly parse the prediction index 2 from the attribute bitstream, and predicts the attribute information of the point p2 by using the reconstructed value of the attribute information of the point p5 corresponding to the prediction index 2, so as to obtain a prediction value of the attribute information of the point p2.

At S204, a residual value of the attribute information of the current point is determined according to the prediction value of the attribute information and the original value of the attribute information of the current point. For example, the difference between the original value and the prediction value of the attribute information of the current point is determined as a residual value of the attribute information of the current point.

At S205, a target LOD where the current point is located is determined according to the geometry information of the current point.

The LOD is partitioned based on the geometry information of the points in the point cloud, so the target LOD where the current point is located may be determined according to the geometry information of the current point.

At S206, a target quantization step which is adaptive to the target LOD is determined.

Modes for determining the target quantization step which is adaptive to the target LOD include, but are limited to, the following.

Mode 1, operations for determining the target quantization step which is adaptive to the target LOD include the following operation A1, operation A2, and operation A3.

At operation A1, a quantization parameter of coding parameters of the current point is determined.

At operation A2, a hierarchical level index of the target LOD is acquired, and a quantization parameter increment of the target LOD is determined according hierarchical level index of the target LOD.

At operation A3, the target quantization step corresponding to the target LOD is determined according to the quantization parameter and the quantization parameter increment of the target LOD.

In some embodiments, the quantization parameter increment DeltaQP values of first seven LOD devices are as shown in Table 2.

TABLE 2

| LOD | R1 | R2 | R3 | R4 | R5 |
|---|---|---|---|---|---|
| 0 | −6 | −12 | −18 | −24 | −24 |
| 1 | −6 | −12 | −18 | −18 | −18 |
| 2 | −6 | −12 | −18 | −18 | −18 |
| 3 | −6 | −12 | −12 | −12 | −12 |
| 4 | −6 | −12 | −12 | −12 | −12 |
| 5 | −6 | −6 | −6 | −6 | −6 |
| 6 | −6 | −6 | −6 | −6 | −6 |

Herein, R is an encoding rate. Table 2 shows the DeltaQP values of the first seven LOD under five code rates. It is to be noted that above Table 1 is only an example. The DeltaQP values corresponding to the first seven LODs of the embodiment of the present disclosure includes, but is not limited to, that shown in Table 2.

Optionally, all DeltaQP values in above Table 2 may be set as −10.

In some embodiments, R1 to R5 represent five encoding rates recommended by a public test environment of an MPEG. The QP values of a preset code rate point in the public test environment are as shown in Table 3.

TABLE 3

| QP under R1 | QP under R2 | QP under R3 | QP under R4 | QP under R5 |
|---|---|---|---|---|
| 10 | 16 | 22 | 28 | 34 |

In some embodiments, the values of true QP of the first seven LODs under five code rates are as shown in Table 4.

TABLE 4

| LOD | QP under R1 | QP under R2 | QP under R3 | QP under R4 | QP under R5 |
|---|---|---|---|---|---|
| 0 | 4 | 4 | 4 | 4 | 10 |
| 1 | 4 | 4 | 4 | 10 | 16 |
| 2 | 4 | 4 | 4 | 10 | 16 |
| 3 | 4 | 4 | 10 | 16 | 22 |
| 4 | 4 | 4 | 10 | 16 | 22 |
| 5 | 4 | 10 | 16 | 22 | 28 |
| 6 | 4 | 10 | 16 | 22 | 28 |

The DeltaQP values under various core rates in Table 2 are added to the QPs under the corresponding code rates as shown in Table 3 to obtain the true QP values under the corresponding code rates in Table 4.

It is to be noted that above Table 4 is only an example. The true QP values corresponding to the first seven LODs of the embodiment of the present disclosure includes, but is not limited to, that shown in Table 4.

It is to be noted that above Table 2 and Table 4 only show the QP values and the DeltaQP values of the first seven levels. The QP values and the DeltaQP values of other layers may refer to the conventional technology, which will not elaborated herein.

In mode 1, a quantization parameter corresponding to the current point may be determined from coding parameters of the current point, for example, Qpi in Table 3; a quantization parameter increment corresponding to a target LOD is determined from above Table 2 according to the hierarchical level index of the target LOD where the current point is located, for example, DeltaQPi in table 2. A target quantization step corresponding to the target LOD is determined according to the quantization parameter and the quantization parameter increment of the target LOD, for example, a QPi value corresponding to the current point is added to the DeltaQPi value of the target LOD to obtain QPi+ DeltaQPi; and the quantization step corresponding to QPi+ DeltaQPi is determined as the target quantization step corresponding to the target LOD.

In some embodiments, the operation that the quantization parameter increment of the target LOD is determined according to the hierarchical level index of the target LOD includes that: if the target LOD belongs to the first N LODs of the point cloud, then the quantization parameter increment of the target LOD is determined as j, herein N is a positive integer less than or equal to a first threshold value, and j is an integer greater than 0 and less than or equal to a second threshold value. If the target LOD does not belong to the first N LODs of the point cloud, then the quantization parameter increment of the target LOD is determined as 0.

Optionally, if the quantization parameter is greater than or equal to a third threshold value, then j is a first preset value. If the quantization parameter is less than the third threshold value, then j is a second preset value.

Optionally, the first threshold value may be 14, and the second threshold value may be 10.

Optionally, for example, j may be 6 or 10.

Optionally, N may be 6, 7, or 8.

Mode 2, operations for determining the target quantization step which is adaptive to the target LOD include the following operation B1 and operation B2.

At operation B1, a hierarchical level index of the target LOD is acquired.

At operation B2, the target quantization step corresponding to the target LOD is in queried in a quantization step look-up table according to the hierarchical level index of the target LOD.

The quantization step look-up table includes a corresponding relationship between the LODs and the quantization steps.

In some embodiments, the above quantization step look-up table is preset.

In some embodiments, the embodiment of the present disclosure further includes a process of constructing the quantization step look-up table. Specifically, a hierarchical level index and a quantization parameter offset parameter of a current image block are determined. The quantization step Qstep corresponding to a LOD is determined according to the hierarchical level index and the quantization parameter offset parameter of the current picture block. The corresponding relationship between the LODs and the quantization steps are then acquired. The corresponding relationship is stored in the loop-up table for finding to determine a quantization step in a subsequent encoding operation or decoding operation.

Optionally, the hierarchical level index may be LodSplitIndex; and for example, the quantization parameter offset parameter may be QpShiftValue.

In some embodiments, the above mode that the hierarchical level index and the quantization parameter offset parameter of the current picture block is determined may be that: coding parameters of a current coding block are acquired; and the hierarchical level index and the quantization parameter offset parameter in the coding parameters are read.

A specific implementation mode for acquiring the coding parameters of the current coding block at least includes that: the coding parameters of the current coding block are determined by using rate distortion optimization.

The coding parameters may include parameters preset in a configuration file and/or parameters determined according to the data of the point cloud.

It can be seen that, in the present example, the coding parameters of the current coding block are acquired first, and then a quantization parameter optimization enable identifier, the hierarchical level index, and the quantization parameter offset parameter in the coding parameters are read, which is beneficial to improving the efficiency of determining the quantization parameter optimization enable identifier, the hierarchical level index, and the quantization parameter offset parameter of the current coding block.

In a possible example, the bitstream includes a parameter set bitstream, so the corresponding parameter may be directly determined for decoding according to a parameter set bitstream in the bitstream when the bitstream is decoded subsequently, which is beneficial to improving the efficiency in subsequent decoding.

In a possible example, the parameter set includes the data for decoding one or more point clouds at different times. The data is attribute data. The parameter set is an attribute parameter set. Thus, when the decoding end decodes the bitstream, the parameter set in the bitstream may be directly used for decoding the point clouds at different times, which is beneficial to improving the efficiency in subsequent decoding.

In some embodiments, the operation that the quantization step Qstep corresponding to the LOD is determined according to the hierarchical level index and the quantization parameter offset parameter of the current picture block includes that: a quantization parameter Qp in the coding parameter of the current coding block is determined; a quantization parameter offset of each LOD is determined according to the hierarchical level index and the quantization parameter offset parameter of the current coding block; and a quantization step Qstep corresponding to each LOD is determined according to the quantization parameter Qp of the current coding block and the quantization parameter offset of each LOD.

In some embodiments, the above quantization parameter offset may also be referred to as a quantization parameter increment.

The quantization parameter Qp may be determined according to the QP parameter provided by the attribute parameter set.

In some embodiments, the relationship between the quantization parameter Qp and the quantization step Qstep of the current coding block is as shown in Formula (2):

$$\text{Qstep}=2^{(Q_p-4)/6} \times 2^{\lfloor Q_p/6 \rfloor} \qquad (2).$$

In practical application, the quantization step Qstep may be determined by using the following Formula (3):

$$\text{Qstep}=\Delta_0[Q_p \% 6] \times 2^{\lfloor Q_p/6 \rfloor} \qquad (3).$$

Herein, $\Delta_0 = \{2^{-4/6}, 2^{-3/6}, 2^{-2/6}, 2^{-1/6}, 2^{1/6}\} \ll 8 = \{161, 181, 203, 228, 256, 287\}$.

In the above formula, "×" is a multiplication operation, "<<" is a left shift operation, and "%" is a remainder operation.

When the residual is quantized, the residual may also be shifted 8 bits to the left for matching.

It can be seen that, in the present example, the quantization parameter Qp in the coding parameter of the current coding block is determined first; then, the quantization parameter offset of each LOD is determined according to the hierarchical level index and the quantization parameter offset parameter of the current coding block; and the quantization step Qstep corresponding to each LOD is determined according to the quantization parameter Qp and the quantization parameter offset of each LOD, which is beneficial to improving the flexibility of improving the quantization step.

In a possible example, the operation that the quantization parameter offset of each LOD is determined according to the hierarchical level index and the quantization parameter offset parameter includes that: whether the LOD of the currently processed LOD belongs to a level range restrained by the hierarchical level index is determined. The level range includes first N levels of a plurality of LODs, and N is a positive integer less than or equal to a first threshold value. If so, a value j of the quantization parameter offset of the currently processed LOD is determined according to the quantization parameter offset parameter, herein j is an integer greater than 0 and less than or equal to a second threshold value; and if not, the value of the quantization parameter offset of the currently processed LOD is determined as 0.

That is to say, the LODs of the point cloud are grouped. Each group of LODs corresponds to one quantization step look-up table. The quantization step look-up table corresponding to the present group includes a quantization step corresponding to at least one LOD in the group. When a target quantization step corresponds to the target LOD where the current point is located is looked up, a target LOD group that the target LOD belongs is determined first, and then the target quantization step corresponding to the target LOD is looked up in the quantization step look-up table corresponding to the target LOD group.

The range of the hierarchical level index is the number of 0 to LOD (a positive integer). Assuming that the hierarchical level index is 6, then the quantization steps of $LOD_0$ to $LOD_5$ (that is, the quantization steps of the first 6 LODs) are transformed from QP− QpShiftValue (that is, a quantization parameter-quantization offset parameter).

In addition, if the LOD is further partitioned into a plurality of groups, for example, the hierarchical level index is a number group 4, 5, 6, correspondingly, the LOD may be partitioned into 4 groups according to these 3 partition positions, which are respectively $LOD_0$ to $LOD_3$, $LOD_4$, LODs including $LOD_5$, $LOD_6$ and the subsequent LODs. The values j of the quantization parameter offsets corresponding to different groups may be different.

In a specific implementation, the larger the quantization parameter is, the larger the corresponding quantization step is, and the smaller the size of the compressed bitstream is. Herein, j is a positive integer greater than 0 and less than or equal to a second threshold value, then the quantization parameters corresponding to the LODs of the first N levels are smaller than those of the subsequent levels, which considers that the points in the LODs of subsequent high levels will be predicted or transformed by using the reconstructed value of the points in the LODs of previous low levels. If the quantization step of a LOD of a previous layer is long, then the corresponding reconstruction error is large. At this moment, the reconstruction error is transferred into the subsequent level, which will affect the prediction of the points of subsequent LOD, and reduces the accuracy of prediction. Therefore, when the quantization step $\text{Qstep}_i$ is determined, the quantization step corresponding to an LOD of low level which is adaptive to a small quantization parameter may be determined, so as to reduce the reconstruction error. Meanwhile, the number of the points in the LOD of low level is small, and the size of the colour bitstream cannot be affected greatly by using a small quantization step. When error of the previous layer LOD is small, the prediction result of the LOD of subsequent level will be better. At this moment, a good effect can also be achieved without using a small quantization step, the size of the bitstream can also be reduced by the appropriately increased quantization step, and the influence on the encoding efficiency is reduced.

The first threshold value may be 14, and the second threshold value may be 10. This considers that the total number of level number the LODs is generally 11 to 14. The minimum Qp value of the five code rates set in a common test environment CTC is set as 10, so j may be a positive integer greater than 0 and less than or equal to 10, so as to ensure that there is no negative number after subtracting the value.

For example, j may be 6 or 10. The smaller the value of j, the smaller the Qp−j, the smaller the corresponding quantization step. Further, the lower the distortion of the reconstructed point, the smaller the error of the reconstructed point is, and the more accurate the prediction of the point of the LOD of the subsequent level is. Therefore, when j is 10, the prediction result is more accurate, that is, the prediction effect is better. Of course, when the residual of the point of the LOD of low level is quantized, the value of j may also be taken as 6, so as to obtain a smaller quantization step for quantizing the points of the LODs of the first N levels, which is beneficial to reducing the error of the reconstructed value, improving subsequent prediction accuracy, and meanwhile, reducing the influence on the size of the bitstream.

For example, N may be 6 or 8. The decrease of the quantization step reduces the error, meanwhile, increases the size of the encoded bitstream, and affects the encoding efficiency. Therefore, the value of N may be taken as 6, which is basically half of the total level number of the LODs. The number of the points in the previous levels is small, the error is reduced by the small quantization step, and meanwhile, the bitstream cannot be increased too much. Or, the value of N is 8. The points of LODs of the first 8 levels is quantized by using a small quantization step, which is beneficial to reducing the error of the reconstructed value, improving the subsequent prediction accuracy, and meanwhile, reducing the influence on the size of the bitstream.

It can be seen that, in the present example, whether the currently processed LOD belongs to a level range restrained by the hierarchical level index is determined first. If yes, a value j of the quantization parameter offset of the currently processed LOD is determined according to the quantization parameter offset parameter, and j is a positive integer greater than 0 and less than or equal to a second threshold value; and if not, the value of the quantization parameter offset of the currently processed LOD is determined as 0. The LOD of a previous level is adaptive to the quantization step corresponding to a small quantization parameter, that is, the LOD of the previous layer corresponds to a small quantization step, and the quantization step corresponding to the LOD of a subsequent level is larger than that of the previous level, which is beneficial to improving the prediction accuracy, and meanwhile, reducing the influence on the encoding efficiency.

In a possible example, if the quantization parameter Qp is greater than or equal to the third threshold value, then j is the first preset value. If the quantization parameter Qp is less than the third threshold value, then j is a second preset value.

The third threshold value may be 30. The first preset value may be 10. The second preset value may be 6.

That is to say, the value of j may be determined in a form of a piecewise function according to the size of the quantization parameter Qp corresponding to the current coding block. For example, when the quantization parameter Qp is greater than or equal to 30, j is 10, and when Qp is less than 30, j is 6.

It can be seen that, in the present example, if the quantization parameter Qp is greater than or equal to 30, then j is 10. If the quantization parameter Qp is less than 30, then j is 6. The value of j is determined according to the value of the quantization parameter Qp, which is beneficial to improving the flexibility of determining the value of j.

In a possible example, the operation that the quantization parameter offset of the LOD is determined according to the hierarchical level index and the quantization parameter offset parameter includes that: a level combination corresponding to the currently processed LOD is determined, the hierarchical level index is queried to determine the hierarchical level index of the currently processed LOD; and the quantization parameter offset parameter is queried according to the hierarchical level index of the currently processed LOD, and the corresponding quantization parameter offset is determined.

For the case that there are a plurality of level groups, for example, four groups. The quantization parameter offset parameter may be a number group, for example 3, 5, 6. That is, the first to fourth groups of quantization parameter offsets are respectively −3, −5, and −6. If the determined quantization parameter is QP, then the quantization parameters of the first to fourth groups are actually QP−3, QP−5, QP−6, and QP respectively.

There may be a plurality of level combinations. Any one level combination may include at least two layers that are neighbouring to each other front and back. The plurality of level combinations include a first level combination and a second level combination. The levels in the first layer combination are previous to the levels in the second layer combination. The quantization parameter corresponding to the first level combination is smaller than the quantization parameter corresponding to the second level combination. Different level combinations corresponding to different quantization parameters, which is beneficial to further distinguishing the quantization step corresponding to the LODs of different levels, and improving the flexibility of determining the quantization step.

The first level combination may include the first two level of the plurality of LODs. The quantization step corresponding to the first level combination is 1. The first two level may adopt lossless quantization, which is beneficial to further reducing the error, and improving the accuracy of subsequent prediction. Since the numbers of points in the first two levels are small, the size of the bitstream will not be greatly affected.

The plurality of level combinations may include a first level combination, a second level combination, a third level combination, and a fourth level combination which are sorted from front to back. Any one level combination includes at least two levels that are neighbouring to each other front and back. The first level combination takes the 1/sqrt(4) of the original quantization step as the quantization length of the current level. The original quantization step refers to the quantization step determined according to the quantization parameter. The second level combination takes the 1/sqrt(3) of the original quantization step as the quantization length of the current level. The third level combination takes the 1/sqrt(2) of the original quantization step as the quantization length of the current level. The fourth level combination takes the original quantization step as the quantization length of the current level.

For example, if the original quantization step, that is, the quantization step determined by the quantization parameter corresponding to the current coding block is a (a is a positive integer), then the first level combination, the second level combination, the third level combination, and the fourth level combination respectively take a/sqrt(4), a/sqrt(3), a/sqrt(2), and a as the quantization step of the current level. The later the level combination is, the larger the corresponding quantization step is. Different levels in the same level combination adopt the same quantization step. The quantization steps corresponding to the LODs of different level are further distinguished, which improves the flexibility of determining the quantization step.

It can be seen that, in the present example, when the quantization parameter offset is determined, the level combination corresponding to the LOD is determined first, and then the hierarchical level index corresponding to the LOD in the level combination is further determined, and then the quantization parameter offset parameter is queried according to the corresponding hierarchical level index, so as to determine the corresponding quantization parameter offset. Different level combinations correspond to different quantization parameter offsets, which is beneficial to further partitioning the quantization steps corresponding to the LODs of different levels, and improving the flexibility of determining the quantization step.

In some embodiments, the present disclosure further includes a quantization parameter optimization enable identifier. The quantization parameter optimization enable identifier is used for indicating whether the above first quantization mode may be used for quantizing. For example, the quantization parameter optimization enable identifier may be enableProgressiveQp, which may be two values, 0 or 1.

At S207, a first quantization weight of the current point is determined.

In some embodiments, for the convenience of description, the prediction value before quantizing the prediction residual value based on the quantization weight of the current point and the quantization step of the current point is referred to as a prediction residual value, and the prediction value after processing the prediction residual value based on the quantization weight of the current point and before processing the prediction residual value based on the quantization step of the current point is referred to as a weighted residual value, and the prediction value after quantizing the prediction residual value based on the quantization weight of the current point and the quantization step of the current point is referred to as a quantized residual value. Of course, the above naming mode is only an example of the present disclosure, and is not to be understood as a limitation to the present disclosure. In an alternative embodiment of the present disclosure, the quantized residual value may also be referred to as the weighted quantized residual value, or even directly referred to as the residual value.

In some embodiments, the above S207 includes that: an index of the current point is determined; and the quantization weight corresponding to the index of the current point is determined as a first quantization weight of the current point.

In short, the encoder may acquire the first quantization weight of a point based on the index of the point.

Optionally, the quantization weight of the point cloud is saved as an array, and the dimension of the array is the same as the number of points in the point cloud. For example, QuantWeight[index] represents the quantization weight of a point index being index. At this moment, the QuantWeight[ ] may be understood as an array that stores the quantization weights of all points in the point cloud. The dimension of the array is the same as the number of points in the point cloud. The quantization weights of the points may be queried through the indexes of the points.

In some embodiments of the present disclosure, the point cloud is partitioned into one or more LODs, and each LOD includes one or more points. The initial value of the first quantization weight of the points in the first M LODs in the plurality of LODs is greater than the initial value of the first quantization weight of the points in the remaining LODs in the plurality of LODs. M is an integer greater than 0. For example, the initial value of the first quantization weight of each point in the first seven LODs is set as 512, and the initial value of the first quantization weight of each of the remaining LODs is set as 256.

In an implementation mode, first quantization weights of N nearest points of the current point are updated based on the first quantization weight of the current point by traversing the points in the point cloud according to a reverse order of the encoding order of the point cloud, and N is an integer greater than 0. For example, for the current point, the first quantization weight of each of the N nearest points of the current point is updated based on the first quantization weight of the current point, and N is an integer greater than 0. In an implementation mode, an influence weight of the current point on each of the N nearest points is acquired, and the influence weight depends on the position information of the current point and the N nearest points; and the first quantization weights of the N nearest points are updated based on the first quantization weight of the current point and the influence weight of the current point on each of the N nearest points. In an implementation mode, the attribute parameter set of the point cloud includes the influence weight of the current point on each of the N nearest points. The influence weight of the current point on each of the N nearest points is acquired by querying the attribute parameter set.

Optionally, the initial value of the first quantization weight of each point in the point cloud is a preset value.

It is to be noted that a specific value of the initial value is not limited in the embodiments of the present disclosure. As an example, the initial value may be 256, 512, or other specific values. Initializing to 256 refers to that the values of the quantization weight values of all points in the point cloud are set as 256.

After the encoder traverses each point in the point cloud in the reverse order, the first quantization weight of each point will be updated according to the importance thereof in the process of predicting the attribute information of the points in the point cloud. The more important the point is, the greater the value of the quantization weight is.

In an implementation mode, the first quantization weights of the N nearest points are updated based on the following Formula (4):

$$w(P_i) \leftarrow w(P_i) + ((a(P_i, Q) \times w(Q)) \gg k) \qquad (4).$$

Herein, Q repsents the current point, $P_i$ represents the ith nearest neighbouring point of Q. Optionally, i=1,2,3·w(Q) represents the first quantization weight of the current point, $a(P_i, Q)$ represents the magnitude of the influence weight of the current point on the neighbouring point, ">>" represents a right shift operation, and "←" represents an assignment operation, for example, "A←B" represents that the value of B is assigned to A.

Optionally, $a(P_i, Q) = 2^{5-i}$.

Optionally, $a(P_i, Q) = 2^{6-i}$.

Optionally, the value of $a(P_i, Q)$ decreases with the increment of i.

Figure 9:
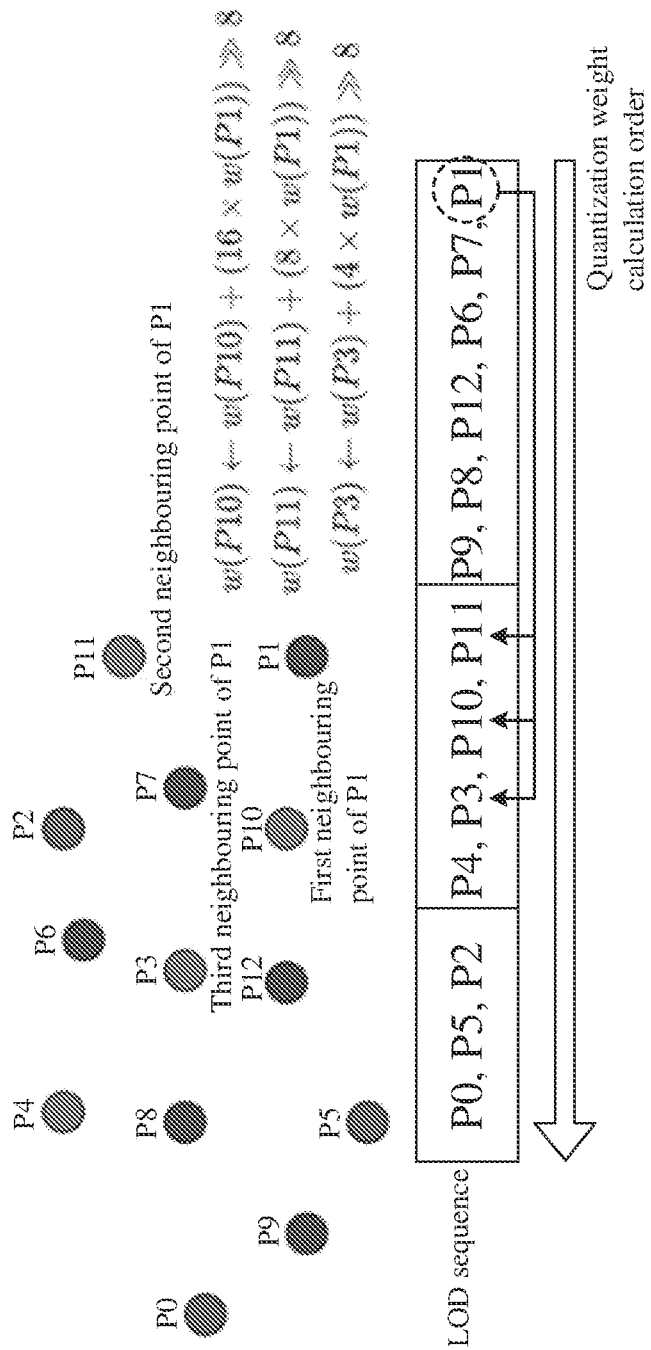
FIG. 9 is a schematic diagram of LOD partition of partial point cloud.

For example, as shown in FIG. 9, assuming that the initial values of the first quantization weights of all points in the point cloud are set as 256, and then each point is traversed in the reverse encoding order to update the first quantization weights of three nearest points thereof. Assuming that the currently traversed point index is index, and the indexes of the three nearest points of the current point are indexN1, indexN2, and indexN3 respectively, then the first quantization weights of the three nearest points P10, P3, and P11 of the current point P1 may be recorded as:

$w(P10) = W[\text{indexN1}];$ $w(P11) = W[\text{indexN2}];$ $w(P3) = W[\text{indexN3}].$ The first quantization weights of the three nearest points of the current point P1 are updated by using the first quantization weight of thereof in the following modes:

$$w(P10) \leftarrow w(P10)+((16 \times w(P1)) \gg k);$$

$$w(P11) \leftarrow w(P11)+((8 \times w(P1)) \gg k);$$

$$w(P3) \leftarrow w(P3)+((4 \times w(P1)) \gg k).$$

Optionally, the value of k is 8.

Herein, 16, 8, and 4 are respectively the influence weights of the current point on the first, second, and third nearest points. These influence weights may be defined in the attribute parameter set of the point cloud as syntax. That is, the value of the influence weight may be set through the attribute parameter set. The encoder may activate or access the attribute parameter set in the process of encoding the attribute information, and then call the value of the influence weight of a point from the attribute parameter set. No limits are made to the specific value of k and influence weights in the embodiments of the present disclosure. The above numbers are only illustrative and are not to be interpreted as limitations to the present disclosure. For example, in an alternative embodiment of the present disclosure, the influence weights of the first, second, and third nearest points may also be respectively changed into 64, 32, and 16. Assuming that the first quantization weight of the current point is 256, and the first quantization weight of the nearest point 0 (i.e. the first nearest point) is 256 too, and the result of $(32 \times 256) \gg 8$ is 32, that is, the operation result is shifted 8 bits to the right. At this moment, the quantization weight of the nearest point 0 is updated to 256+32=288. This result may be saved in the array QuantWeight [ ] containing the quantization weights of all points of the point cloud. When the nearest point 0 is traversed, the three neighbours of the nearest point 0 are updated by using the first quantization weight 288.

The syntax of the attribute parameter set is introduced below in combination with Table. 5.

TABLE 5

Attribute parameter set attribute_parameter_set( ) {
......
  aps_chroma_qp_offset
  for( idx = 0; i < max_num_direct_predictors; i++){
    weightOfNearestNeighboursInAdaptiveQuant[i]
  }
  aps_slice_qp_deltas_present_flag
......
}

As shown in Table 5, attribute_parameter_set represents the attribute parameter set, aps_chroma_qp_offset represents the offset of chroma, weightOfNearestNeighboursInAdaptiveQuant[i] represents the influence weight of the current point on the ith nearest neighbouring point, herein i being 0, 1, and 2 respectively represent the first, second, and third nearest points of the current point. Specifically, the first nearest point represents the nearest neighbouring point of the current point, the second nearest point represents the second nearest neighbouring point of the current point, and so on.

At S208, the residual value of the attribute information of the current point is quantized according to the target quantization step and the first quantization weight, so as to obtain the quantized residual value of the attribute information of the current point.

In some embodiments of the present disclosure, the above S204 and S403 include the following operation C1 and operation C2.

At operation C1, a second quantization weight of the current point is determined according to the first quantization weight of the current point.

At operation C2, inverse quantization is performed on the quantized residual value of the attribute information of the current point according to the target quantization step and the second quantization weight, so as to obtain a reconstructed residual value.

Optionally, the second quantization weight is less than or equal to the target quantization step of the current point. The target quantization step of the current point is the target quantization step of the target LOD where the current point is located.

Optionally, the second quantization weight of the current point is determined by using the following Formula (5):

$$\text{effectiveQuantWeight} = \min(w(Q) \gg k, \text{Qstep}) \qquad (5).$$

Herein, effectiveQuantWeight represents the second quantization weight of the current point, w(Q) represents the first quantization weight of the current point, k represents the number of bits for a right shift operation on the w(Q), and Qstep represents the target quantization step of the current point, and ">>" represents a right shift operation.

Optionally, the second quantization weight of the current point is determined by using the following Formula (6):

$$\text{effectiveQuantWeight} = \min(w(Q), \text{Qstep}) \qquad (6).$$

In the embodiment of the present disclosure, when the target quantization step size of the current point is set to be small, the first quantization weight of the current point may exceed the target quantization step size. At this moment, the smaller value of the first quantization weight and the target quantization step size may be taken to obtain the second quantization weight, thus ensuring that the encoder can quantize the prediction residual value, that is, ensuring the encoding performance of the encoder.

Optionally, the value of the second quantization weight is equal to the integer power of 2.

Optionally, the value of the first quantization weight of the current point is not equal to the integer power of 2. An integer power of 2 which is the closest to the first quantization weight of the current point is determined as the second quantization weight based on the value of the first quantization weight of the current point.

For example, it is assumed that the value of the first quantization weight of the current point is 18. To facilitate the implementation of hardware, 18 may be transformed into the integer power of 2 which is the closest to it, that is, 16 or 32. For example, 18 is transformed into 16, that is, 18 is replaced with 16. Assuming that the value of the first quantization weight of the current point is 30, the integer power of 2 which is the closest to it will become 32. At this moment, the first quantization weight of the current point will be transformed into 32. For the integer power of 2, the function of adaptive quantization may be realized by binary shift operation, which facilitates the implementation of the hardware.

In an embodiment of the present disclosure, a weighted multiplication operation can be processed as a shift operation by constructing the value of the second quantization weight as an integer power of 2, which can improve the processing efficiency of the encoder, thereby improving the performance of the encoder.

It is to be noted that, in other alternative embodiments of the present disclosure, the minimum value of the quantization weight of the current point and the target quantization step of the current point may be taken first, and then the integer power of 2 which is the closest to the minimum value may be determined as the second quantization weight. Of course, the second quantization weight may also be determined in other modes. No specific limits are made thereto in the embodiments of the present disclosure. For example, the first quantization weight of the current point may be directly determined as the second quantization weight of the current point.

In some embodiments, operation C2 may include that: the second quantization weight is multiplied by the prediction residual value to obtain the weighted residual value; and the weighted residual value is quantized by using the target quantization step of the current point to obtain the quantized residual value.

Specifically, an encoder may obtain the prediction value of the attribute information of the current point through predicting transform. The true value of the attribute information of the current point is known, and then the prediction residual value of the attribute information of the current point may be obtained by subtracting the prediction value from the true value. The prediction residual value is multiplied by the second quantized weight to obtain the weighted prediction residual value. The quantized weighted prediction residual value, that is, the quantized residual value, may be obtained through quantizing the weighted prediction residual value by using the quantization step size, and then, the quantized residual value of the current point is subjected to entropy encoding and is signalled in a bitstream.

Correspondingly, a decoder first calculates the first quantization weight of each point in the point cloud according to the reconstructed position information, determines the second quantization weight of each point by comparing with the target quantization step, then parses the bitstream to obtain the quantized residual value of the current point, performs inverse quantizes to obtain the weighted prediction residual value, and divides the weighted prediction residual value by the second quantization weight to obtain the prediction residual value. The decoder determines the prediction value of the attribute information of the current point through predicting transform, and then obtains the reconstructed value of the attribute information of the current point based on the prediction value and the prediction residual value of the attribute information of the current point. The decoder traverses the next point for decoding and reconstructing after obtaining the reconstructed value of the attribute information of the current point.

In conclusion, in the embodiment of the present disclosure, the encoder performs weighting by multiplying the prediction residual value by the second quantization weight before quantization. The decoder divides the weighted prediction residual value subjected to inverse quantization by the second quantization weight to remove a weighted influence after inverse quantization, so as to obtain the prediction residual value. It is to be noted that, the quantization is not lossless, so the weighted prediction residual value obtained by the decoder is not necessarily equal to the weighted prediction residual value obtained by the encoder.

In some embodiments of the present disclosure, operation C2 may include the following operations.

Quantization is performed on the prediction residual value by using the following Formula (7), so as to obtain the quantized residual value.

$$\text{attrResidualQuant2}=\text{attrResidualQuant1}\times\text{effectiveQuantWeight}/\text{Qstep} \quad (7).$$

Herein, attrResidualQuant2 represents the quantized residual value, attrResidualQuant1 represents the original value of the residual value, effectiveQuantWeight represents the second quantization weight of the current point, Qstep represents the quantization step of the current point, "×" represents a multiplication operation, and "/" represents a division operation.

In some embodiments of the present disclosure, operation C2 may include that: the target quantization step is updated according to the second quantization weight of the current point; and the residual value of the attribute information of the current point is quantized according to the updated quantization step.

Optionally, the operation that the target quantization step is updated according to the second quantization weight of the current point includes that: the target quantization step of the current point is updated by using the following Formula (8):

$$\text{newQstep}=\lceil \text{Qstep}/\text{effectiveQuantWeight}\rceil \quad (8).$$

Herein, effectiveQuantWeight represents the second quantization weight of the current point, newQstep represents the quantization step of the current point after being updated based on the target quantization step of the current point, Qstep represents the target quantization step of the current point, $\lceil\ \rceil$ represents a round up operation, and "/" represents a division operation.

At S209, the quantized residual value of the current point is encoded to generate an attribute bitstream.

On the basis of the above embodiment, a point cloud encoding process provided by a specific embodiment of the present disclosure includes that: the quantization weights of all points are calculated at an encoding end in a first quantization mode first. The target LOD that the current point belongs is determined, and whether the current point belongs to the first seven LODs is determined. If the current point belongs to the first seven LODs, the QP value of the current coding parameter is read, and a DeltaQP value of the target LOD is added, QP+DeltaQP is transformed into a corresponding Qstep, that is, the target quantization step. The quantization weight of the current point is w(Q)=min (w(Q), Qstep). Before quantization, weighting is performed by multiplying the w(Q) by the prediction residual value of the current point.

If the current point does not belong to the first seven LODs, the QP value of the current coding parameter is read, and QP is transformed into a corresponding Qstep, the quantization weight of the current point is w(Q)=min (w(Q), Qstep). Before quantization, weighting is performed by multiplying the w(Q) by the prediction residual value of the current point.

In an embodiment of the present disclosure, the target LOD where the current point is located is determined according to the geometry information of the current point, and the target quantization step corresponding to the target LOD is determined. The target quantization step is determined based on a quantization parameter increment, which improves the flexibility of determining the quantization step. In addition, the present embodiment introduces the first quantization weight for weighting the quantization step of the current point. The quantization weight of the current point is introduced, which is equivalent to modifying the target quantization step of the current point based on the first quantization weight of the current point, that is, the target quantization step of the current point may be adaptively adjusted according to the importance degree of the current point, and then the residual value of the current point is quantized based on the adjusted target quantization step. In a process of predicting the attribute information of the points in the point cloud, for the points that are in front positions of the encoding order, when the points are important in the prediction, the quantization step can be prevented from too large, thereby avoiding a large reconstruction error, which is equivalent to that the points with high quantization weights are quantized with small quantization steps to reduce their reconstruction errors. For the points that are in the back positions of the encoding order, the prediction accuracy can be improved, the encoding effect can be improved.

Based on the technical solution provided by the present disclosure, a test is performed on reference software TMC13 V11.0 of G-PCC. Part test sequence required by the MPEG is tested under the test condition of CTC CY. Test results are as shown in the following Table 6. The performing improving effect is described below in combination with Table 6.

TABLE 6

| Point cloud sequence | end to end BD-AttrRate[%] | | |
| --- | --- | --- | --- |
| | Luma component (Luma) | Chroma component Cb | Chroma component Cr |
| cat1-A | −0.8% | −4.1% | −5.4% |
| cat1-B | −0.2% | −2.0% | −2.5% |
| Average value | −0.5% | −3.0% | −3.9% |

The points in the point cloud sequence cat1-A include colour attribute information and other attribute information, such as reflectivity attribute information. The points in the point cloud sequence cat1-B include colour attribute information. BD-AttrRate is one of the main parameters for evaluating the performance of a video encoding algorithm, which represents the change situation of the video encoded by a new algorithm relative to that encoded by the original algorithm in terms of code rate and Peak Signal to Noise Ratio (PSNR). That is, the change situation of the new algorithm and the original algorithm under the same signal to noise ratio. Herein, "−" represents performance improvement, such as the performance improvement of the code rate and the PSNR. As shown in Table 6, for the point cloud sequence cat1-A, compared with the conventional technology, by using the technical solution of the present disclosure, the performance is improved by 0.8% in terms of luma component, the performance is improved by 4.1% in terms of chroma component Cb, and the performance is improved by 5.4% in terms of chroma component Cr. An "average value" represents the average value of the performance improvement of the point cloud sequence cat1-A and the point cloud sequencecat1-B.

Embodiment 3

Figure 10:
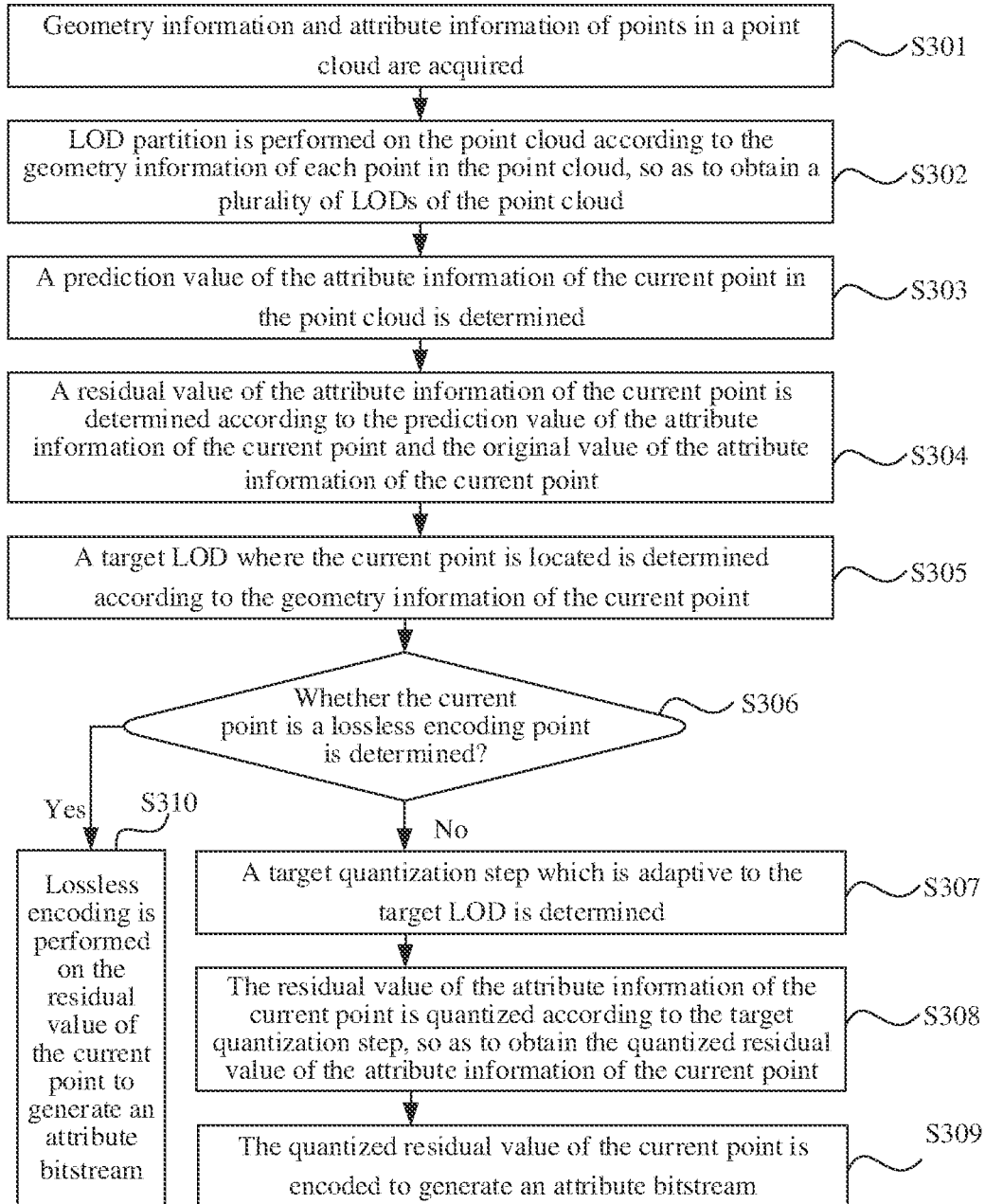
FIG. 10 is a schematic flowchart of a method for point cloud encoding provided by an embodiment of the present disclosure.

If the target quantization mode includes the first quantization mode and the third quantization mode, a point cloud encoding process of the embodiment of the present disclosure is as shown in FIG. 10.

FIG. 10 is a schematic flowchart of a method for point cloud encoding provided by an embodiment of the present disclosure. As shown in FIG. 10, the method includes the following operations.

At S301, geometry information and attribute information of points in a point cloud are acquired.

At S302, LOD partition is performed on the point cloud according to the geometry information of each point in the point cloud, so as to obtain a plurality of LODs of the point cloud. Each LOD includes at least one detail expression level, and each detail expression level includes at least one point.

At S303, a prediction value of the attribute information of the current point in the point cloud is determined.

At S304, a residual value of the attribute information of the current point is determined according to the prediction value of the attribute information of the current point and the original value of the attribute information of the current point. For example, the difference between the original value of the attribute information of the current point and the prediction value of the attribute information of the current point is determined as a residual value of the attribute information of the current point.

An implementation process of the above S301 to S304 may refer to the description of the above S201 to S204, which will not be elaborated herein.

At S305, a target LOD where the current point is located is determined according to the geometry information of the current point.

At S306, whether the current point belongs to a lossless encoding point is determined; if it is determined that the current point belongs to a lossy encoding point, the following S307 to S309 are performed; and if it is determined that the current point belongs to a lossless encoding point, the following S310 is performed.

At S307, a target quantization step which is adaptive to the target LOD is determined. Specific reference is made to the description of above S206, which will not be elaborated herein.

At S308, the residual value of the attribute information of the current point is quantized according to the target quantization step, so as to obtain the quantized residual value of the attribute information of the current point.

At S309, the quantized residual value of the current point is encoded to generate an attribute bitstream.

At S310, the residual value of the current point is subjected to lossless encoding to generate an attribute bitstream.

Since errors in the reconstructed values of attribute information will be caused by quantization, the accuracy of subsequent attribute information prediction will be reduced, thereby reducing encoding effect of the whole attribute information. In order to solve the technical problem, in the present disclosure, the residual value of the attribute information of at least one point in the point cloud is subjected to lossless encoding to reduce the influence of quantization on the reconstructed value of the attribute information, thereby improving the accuracy of attribute information prediction. The size of the attribute bitstream cannot be affected greatly, thereby improving the encoding effect of the attribute information.

A lossless encoding process involved in the present disclosure is introduced below.

It is to be noted that, in the present disclosure, the lossless encoding of the residual value of the attribute information of the point may also be referred to as not quantizing the residual value of the attribute information of the point.

No limits are made to the number of points of which the residual values of the attribute information are subjected to the lossless encoding in the present disclosure. For example, the residual values of the attribute information of part points in the point cloud are quantized, and the residual values of the attribute information of part points are not quantized (i.e., subjected to lossless encoding); or, the residual values of the attribute information of all points in the point cloud are not quantized (i.e., lossless encoding).

In one example, the at least one point with the residual point of the attribute information subjected to lossless encoding may include N points.

Optionally, N is an integer multiple of 2. For example, the residual values of the attribute information of 2, 4, 16, or 24 points in the point cloud are subjected to lossless encoding.

Optionally, the above N points may be any N points in the point cloud, for example, continuous N points in the sorted point cloud, or randomly selected N points, or specified N points, or N points selected according to a preset point selecting interval, where the point selecting interval may be uneven intervals.

Optionally, the interval between every two neighbouring points in the above N points is equal. For example, the above point cloud includes 1200 points. If N is 24, the intervals between these 24 points are equal, and are all 50 points.

In some embodiments, lossless encoding is performed on the residual value of the attribute information of the points at an interval of a preset interval in the point cloud according to the preset interval. For example, the above point cloud includes 1200 points. The preset interval is 10, and then lossless encoding is performed on the residual values of the attribute information of the points at an interval of 10 points in the sorted point cloud. Optionally, the first point of the 1200 points may be taken as the first point of which the residual value of the attribute information is not quantized, with an interval of 10 points, the $11^{th}$ point may be taken as the second point of which the residual value of the attribute information is not quantized, and so on. Optionally, the $11^{th}$ point of the 1200 points may be taken as the first point of which the residual value of the attribute information is subjected to the lossless encoding, with an interval of 10 points, the $21^{st}$ point may be taken as the second point of which the residual value of the attribute information is subjected to the lossless encoding, and so on.

In some embodiments, the embodiment of the present disclosure further includes S3061 that lossless encoding is performed on the residual value of the attribute information of the at least one point in at least one detail expression level in a plurality of detail expression levels.

In some embodiments, the above S3061 may include that lossless encoding is performed on the residual value of the attribute information of the at least one point in at least one detail expression level in a plurality of detail expression levels; or lossless encoding is performed on the residual value of the attribute information of the at least one point of part detail expression levels in the plurality of detail expression levels, and the residual value of the attribute information of each point in part detail expression levels in the plurality of detail expression levels is quantized; or, lossless encoding is performed on the residual value of the attribute information of the at least one point of each detail expression level in the plurality of detail expression levels.

In some embodiments, the above S3061 includes S3061-A1, S3061-A2, and S3061-A3.

At S3061-A1, at least one first category detail expression level including a total number of points less than or equal to a first preset value and at least one second category detail expression level including a total number of points greater than the first preset value in a plurality of detail expression levels are acquired. The specific value of the first preset value is determined according to an actual requirement. No limits are made thereto in the present disclosure.

At S3061-A2, lossless encoding is performed on the residual values of the attribute information of all points in the first category detail expression level.

At S3061-A3, lossless encoding is performed on the residual value of the attribute information of at least one point in the second category detail expression level.

It can be known from the above that the number of points included in each of the plurality of detail expression levels may be the same or different. On this basis, the plurality of detail expression levels are divided into first category detail expression levels and second category detail expression levels according to the total number included in each of the plurality of detail expression levels. The total number of points included in the first category detail expression level is less than or equal to the first preset value, and the total number of points included in the second category detail expression level is greater than the first preset value. For example, LOD partitioned is performed on the point cloud to obtain 14 detail expression levels. Assuming that as the level number increases from small to large, the number of points included in the detail expression level is 1, 6, 28, 114, 424, 1734, 10000, . . . . Assuming that the first preset value is 24, as shown in FIG. 9, the first two detail expression levels (i.e. the first detail expression level including one point and the second detail expression level including six points) of the above 14 detail expression levels are divided into the first category detail expression levels, so as to obtain two first category detail expression levels; and the remaining 12 detail expression levels (i.e., the third layer of detail expression level including 28 points, and other detail expression levels after the third layer of detail expression level) of the above 14 layers are divided into the second category detail expression levels, so as to obtain 12 second category detail expression levels.

The residual values of the attribute information of all points in the first category detail expression level are not quantized. For example, lossless encoding is performed on the residual value of the attribute information of all points in the first two detail expression levels of the above 14 detail expression levels.

The residual value of the attribute information of at least one point in the second category detail expression level is not quantized. For example, lossless encoding is performed on the residual value of the attribute information of at least one point in each of the last 12 detail expression levels of the above 14 detail expression levels. When a point with the residual value of the attribute information subjected to lossless encoding is selected, different second category detail expression levels may adopt different skip quantization point selecting modes. For example, each second category detail expression level has different point selecting modes. Optionally, different second category detail expression levels may adopt the same skip quantization point selecting modes. For example, each second category detail expression level has the same point selecting mode.

In some embodiments, in order to keep the consistency between the encoding end and the decoding end, the encoding end may carry the relevant information of the above first category detail expression level and second category detail expression level in the attribute bitstream. Thus, the decoding end may parse the relevant information of the above first category detail expression level and second category detail expression level from the attribute bitstream, and reconstruct the attribute information of the point according to the parsed relevant information of the first category detail expression level and second category detail expression level.

In some embodiments, the numbers of the points with the residual values of the attribute information subjected to lossless encoding of each second category detail expression level are the same. Then, the above S3061-A3 includes S3061-A3-1.

At S3061-A3-1, lossless encoding is performed on the residual values of the attribute information of M points in the second category detail expression level. M is an integer multiple of 2, for example, 2, 4, 24, 32, and the like.

Optionally, the interval between two neighbouring points in M points of the second category detail expression level in the same layer is equal. For example, the second category detail expression level 1 includes 200 points, and the second category detail expression level 2 includes 300 points. Assuming that M is equal to 10, the residual values of attribute information of 20 points in the second category detail expression level 1 are subjected to lossless encoding, which are: the $1^{st}$ point, the $11^{th}$ point, the $21^{st}$ point, the $31^{st}$ point . . . the $181^{st}$ point, and the $191^{st}$ point in sequence. The interval between two neighbouring points with the residual values of the attribute information subjected to lossless encoding is 10 points. The residual values of attribute information of 30 points in the second category detail expression level 2 are subjected to lossless encoding, which are: the $1^{st}$ point, the $11^{th}$ point, the $21^{st}$ point, the $31^{st}$ point . . . the $281^{st}$ point, and the $291^{st}$ point in sequence. The interval between two neighbouring points with the residual values of the attribute information subjected to lossless encoding is 10 points.

In some embodiments, the above M may be added to the attribute parameter set at the encoding end according to the following program, so as to set the specific values of equal-interval unquantized points in each second category detail expression level through the coding parameters:

|  | Descriptor |
|---|---|
| attribute_parameter_set( ) { |  |
| . . . . . . |  |
| aps_chroma_qp_offset | se(v) |
| aps_equal_intervals_unquantized_num | ue(v) |
| aps_slice_qp_deltas_present_flag | u(1) |
| . . . . . . |  |
| } |  |

Herein, aps_equal_intervals_unquantized_num represents the number of equal-interval unquantized points in each second category detail expression level, for example, 24.

In some embodiments, if at least one second category detail expression level includes L second category detail expression levels, the numbers of the points with the residual values of the attribute information subjected to lossless encoding of different second category detail expression levels may be different. Then, the above S3061-A3 includes S3061-A3-2 and S3061-A3-3.

At S3061-A3-2, lossless encoding is performed on the residual values of the attribute information of a first number of points in each of P second category detail expression levels.

At S3061-A3-3, lossless encoding is performed on the residual values of the attribute information of a second number of points in each of Q second category detail expression levels.

Herein, L is a positive integer greater than or equal to 2, both P and Q are positive integers, and the sum of P and Q is less than or equal to L, P second category detail expression levels and Q second category detail expression levels do not overlap with each other, and the first number is different from the second number.

The above P second category detail expression levels may be any P second category detail expression levels in the L second category detail expression levels. These P second category detail expression levels may be continuous detail expression levels, or may also be discontinuous second category detail expression levels.

The above Q second category detail expression levels may be any Q second category detail expression levels other than the P second category detail expression levels in the L second category detail expression levels. These Q second category detail expression levels may be continuous detail expression levels, or may also be discontinuous second category detail expression levels.

Figure 11:
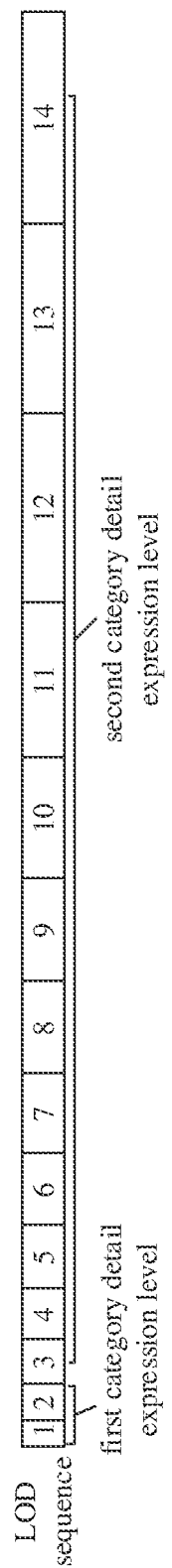
FIG. 11 is another schematic diagram of LOD partition involved in an embodiment of the present disclosure.

For example, as shown in FIG. 11, L equals to 12. P (for example, P=7) second category detail expression levels are randomly selected from the 12 second category detail expression levels, and Q (for example, Q=7) second category detail expression levels are randomly selected from the remaining 7 second category detail expression levels.

In one example, the P second category detail expression levels are the first P second category detail expression levels in L second category detail expression levels.

In one example, the Q second category detail expression levels are the last Q second category detail expression levels in L second category detail expression levels.

Continuing to refer to FIG. 11, the first P (for example, P=7) second category detail expression levels of the 12 second category detail expression levels are taken as the P second category detail expression levels, and the last Q (for example, Q=7) second category detail expression levels of the 12 second category detail expression levels are taken as the Q detail expression levels. The P second category detail expression levels are continuous, and the Q second category detail expression levels are continuous.

In some embodiments, as shown in FIG. 11, if the plurality of detail expression levels of the point cloud include 14 detail expression levels, then P may be 7 or 8.

In one example, the last second category detail expression level in P second category detail expression levels is neighbouring to the first second category detail expression level in Q second category detail expression levels. For example, as shown in FIG. 11, assuming that P=7 and Q=7, the last second category detail expression level in the P second category detail expression levels is the seventh detail expression level; the first second category detail expression level in the Q second category detail expression levels is the eighth detail expression level; and the seventh second category detail expression level is neighbouring to the eighth second category detail expression level.

The L second category detail expression levels are partitioned into P second category detail expression levels and Q second category detail expression levels according to the above method. For each of the P second category detail expression levels, the residual values of the attribute information of a first number of points in the second category detail expression level are not quantized. For each of the Q second category detail expression levels, the residual values of the attribute information of a second number of points in the second category detail expression level are not quantized.

If the P second category detail expression levels are in front of the Q second category detail expression levels, the first number is greater than the second number, for example, the first number is 24, 32 or 64, and correspondingly, the second number may be 8, 16 or 32. In a process of predicting the attribute information, for example, as shown in FIG. 8, the plurality of detail expression levels are sorted according to the level number from low to high, so as to obtain a LOD order of the point cloud. The encoding of the attribute information is performed according to the LOD order of the point cloud. In a predicting process, the points ranked top in the LOD order have greater opportunities to be used as reference points in the subsequent predicting process. Therefore, in order to reduce the influence of quantification on the reconstructed value of attribute information, the residual values of attribute information of more points in the previous P second category detail expression levels are not quantized. In order to eliminate redundancy, the residual values of the attribute information of fewer points in the later Q second category detail expression levels are not quantized.

In some embodiments, the first number is a positive integer multiple of the second number. For example, the first number is 3 or 2 multiples of the second number. For example, the first number is 24 and the second number is 8.

In one example, the intervals between two neighbouring points in the first number of points of each of the P second category detail expression levels are equal.

In one example, the intervals between two neighbouring points in the second number of points of each of the Q second category detail expression levels are equal.

In some embodiments, because the points in several previous LODs will affect prediction results of the points in the subsequent LODs, the prediction results of the points in the several previous LODs are more important. Therefore, the number of the points, of which the residual values of the attribute information are not quantized and the intervals thereof are equal, of each of the previous seven LODs (LOD0 to LOD6) is designed as 32 (intermittent_unquantized_num), and the number of the points, which are not quantized and the intervals thereof are equal, of each subsequent LOD is 10 (intermittent_unquantized_num/3).

Figure 12A:
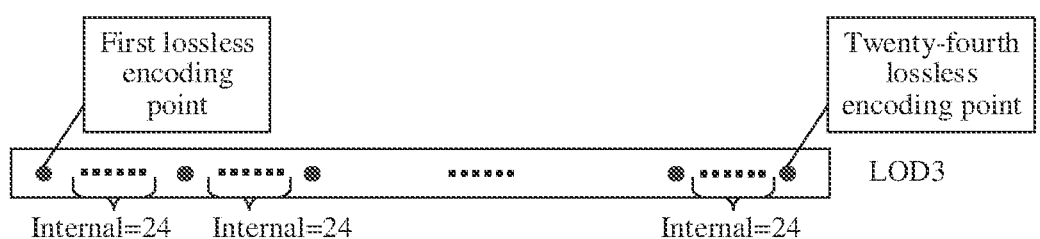
FIG. 12A is another schematic diagram of LOD partition involved in an embodiment of the present disclosure.

Taking the third LOD as an example, as shown in FIG. 12A, intermittent_unquantized_num=32.

Figure 12B:
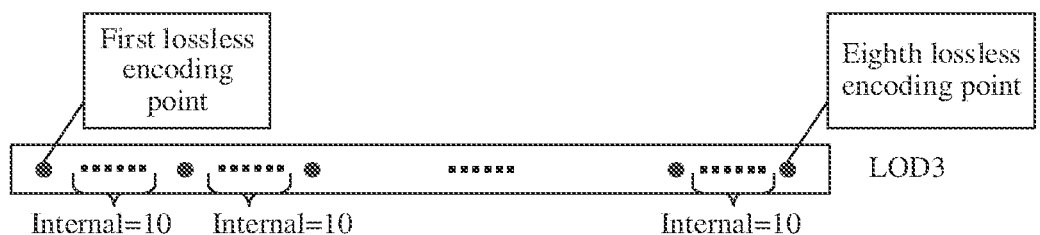
FIG. 12B is another schematic diagram of LOD partition involved in an embodiment of the present disclosure.

Taking the eighth LOD as an example, as shown in FIG. 12B, intermittent_unquantized_num/3=10.

In an actual quantization process of the present embodiment, the quantization may be performed in the following modes.

Mode 1, at least one point with the residual value of the attribute information is subjected to lossless encoding during quantizing the residual value of the attribute information of the point in the point cloud.

Mode 2, the quantization step of at least one point with the residual value of the attribute information subjected to lossless encoding is set as 1.

For example, the residual value of the attribute information of the point is quantized according to the following Formula (9) at present.

$$attrResidualQuant = \frac{attrValue - attrPredValue}{Qstep}. \quad (9)$$

Herein, attrResidualQuant is a residual value of the quantized attribute information, and Qstep is a quantized step.

In the mode, a quantization step of the point with the residual value of the attribute information subjected to lossless encoding may be set as 1, that is, Qstep=1.

Mode 3, a quantization parameter QP of the at least one point with the residual value of the attribute information subjected to lossless encoding may be set as a target value, and the target value is a corresponding QP value when the quantization step is 1.

The quantization step is calculated according to the quantization parameter QP value, and the QP is usually configured in advance through a configuration file. On this basis, the QP may be set as the corresponding QP value when the quantization step is 1.

In some embodiments, the attribute bitstream includes first information. The first information is used for indicating points with the residual values of the attribute information subjected to lossless encoding.

In some embodiments, the first information includes identifier information of the points with the residual values of the attribute information subjected to lossless encoding. For example, the point cloud includes 100 points with the residual values of the attribute information subjected to lossless encoding, so that the identifier information of these 100 points is carried in the attribute bitstream. After the decoding end parses the attribute bitstream, obtains the identifier information of the points with the residual values of attribute information subjected to lossless encoding and the residual values of the attribute information of these points, inverse quantization is not performed on the residual values of the attribute information of the points corresponding to the identifier information, but the attribute information is reconstructed by directly using the residual values of the attribute information of these points, so as to keep consistent with the encoding end.

In some embodiments, the first information includes the total number of the points with the residual values of the attribute information subjected to lossless encoding, such as N above.

In some embodiments, if the numbers of points with the residual values of attribute information subjected to lossless encoding included in each of the L second category detail expression levels are the same, and these points are arranged at equal intervals, then the first information includes the specific number (num) of points with the residual values of attribute information subjected to lossless encoding at equal intervals included in each second category detail expression level, that is, the attribute bitstream carries the num.

In the present example, if the first point with the residual value of the attribute information in the second category detail expression level is not the first point in the second category detail expression level, the above first information also needs to carry the identifier information of the first point with the residual value of the attribute information subjected to lossless encoding.

In some embodiments, if the points subjected to lossless encoding in the P second category detail expression levels and Q second category detail expression levels are arranged at equal intervals, then the above first information may further include a first number and a second number, and partition information of the P second category detail expression levels and the Q second category detail expression levels.

In the present example, if the last second category detail expression level of the P second category detail expression levels is neighbouring to the first second category detail expression level of the Q second category detail expression levels, then the above partition information further includes the identifier information of the first second category detail expression level of the Q second category detail expression levels, or, includes the identifier information of the last second category detail expression level of the P second category detail expression levels, or including P and/or Q. Thus, the decoding end may determine P second category detail expression levels and Q second category detail expression levels from L second category detail expression levels according to the information, and then perform lossless encoding on the residual values of the attribute information of the first number of points at equal intervals in each of the P second category detail expression levels, and perform lossless encoding on the residual values of the attribute information of the first second of points at equal intervals in each of the Q second category detail expression levels.

In the example, the first information further includes identifier information of the first point with the residual value of the attribute information in each second category detail expression level subjected to lossless encoding.

On the basis of the above embodiments, in a specific embodiment of the present disclosure, a point cloud encoding process includes that: the decoding end determines whether the current point belongs to the first seven LODs, and determines whether the current point is an unquantized point according to the third quantization mode.

If the current point belongs to the first seven LODs, and the current point is not an unquantized point, then the QP value of the current coding parameter is read, a DeltaQP value of the target LOD that the current point belongs is added, and QP+DeltaQP is transformed into the corresponding Qstep; and if the current point is the unquantized point, then Qstep=1 for this point (that is, the point does not need to be quantized).

If the current point does not belong to the first seven LODs, and the current point is not an unquantized point, then the QP value of the current coding parameter is read, and the QP is transformed into the corresponding Qstep; and if the current point is the unquantized point, then Qstep=1 for this point (that is, the point does not need to be quantized). Next, the residual value of the attribute information of the current point is quantized by using the quantization step determined above.

In an embodiment of the present embodiment, the first quantization mode is combined with the third quantization mode. Specifically, the target LOD where the current point is located is determined according to the geometry information of the current point; the target quantization step which is adaptive to the target LOD is determined if it is determined that the current point is a lossy encoding point; and the residual value of the attribute information of the current point is quantized according to the target quantization step, so as to obtain the quantized residual value of the attribute information of the current point. Lossless encoding is performed on the residual value of the attribute information of the current point if it is determined that the current point is a lossless encoding point. In the present embodiment, the target LOD where the current point is located is determined according to the geometry information of the current point, and the target quantization step corresponding to the target LOD is determined. The target quantization step is determined based on a quantization parameter increment, which improves the flexibility of determining the quantization step. In addition, lossless encoding is performed on the residual value of the attribute information of at least one point in the point cloud (that is, quantization is not performed) to reduce the influence of the quantization on the reconstructed value of the attribute information, thereby improving the accuracy of attribute information prediction.

After the technical solution of the present disclosure is realized on reference software TMC13 V11.0 of G-PCC, part point cloud test sequences (cat1-A) required by the MPEG is tested under the test condition of common text configuration CTC CY. Test results are as shown in the following Table 7.

TABLE 7

| CY_ai geometry lossless, and attribute proximately lossless | | End to end BD-AttrRate[%] | | | |
|---|---|---|---|---|---|
| | | Luma | Chroma component | Chroma component | |
| Category | Sequence | component | Cb | Cr | Reflectance |
| cat1-A | basketball_player_vox11_0000020 | −10.4% | −15.0% | −25.8% | |
| | boxer_viewdep_dep_vox 12 | −10.9% | −28.0% | −27.9% | |
| | dancer_vox11_00000001 | −5.9% | −9.9% | −19.4% | |
| | egyptian_mask_vox12 | −3.8% | −20.6% | −8.2% | |
| | facade_00009_vox12 | 0.0% | −2.4% | −1.8% | |
| | facade_00015_vox14 | −0.2% | −2.5% | −2.5% | |
| | facade_00064_vox11 | −1.8% | −5.9% | −9.8% | |
| | frog_00067_vox12 | −1.8% | −5.8% | −6.0% | |
| | head_00039_vox12 | −0.3% | −1.8% | −5.4% | |
| | house_without_roof_00057 | −2.3% | −4.9% | −6.6% | |
| | longdress_viewdep_vox12 | −1.0% | −6.1% | −4.2% | |
| | longdress_vox10_1300 | −0.1% | −1.9% | −1.1% | |
| | loot_viewdep_vox12 | −11.4% | −31.2% | −33.3% | |
| | loot_vox10_1200 | −7.1% | −18.5% | −20.2% | |
| | queen_0200 | −5.4% | −17.2% | −15.5% | |
| | redandblack_viewdep_vox12 | −10.0% | −16.8% | −13.2% | |
| | redandblack_vox10_1550 | −3.8% | −9.1% | −6.1% | |
| | shiva_00035_vox12 | 20.0% | −0.4% | −0.4% | |
| | soldier_viewdep_vox12 | −4.4% | −18.0% | −21.9% | |
| | soldier_vox10_0690 | −1.5% | −9.3% | −11.7% | |
| | thaidancer_viewdep_vox12 | −5.3% | −12.5% | −9.2% | |
| | ulb_unicorn_vox13 | −6.4% | −15.2% | −13.7% | |
| | Average value | −4.3% | −11.5% | −12.0% | |

Herein, the points in the point cloud sequence cat-A include colour attribute information and other attribute information. As shown in Table 7, for the point cloud sequence cat1-A, compared with the conventional technology, by using the technical solution of the present disclosure, the performance of the luma component, the chroma component Cb, and the chroma component Cr is improved.

Embodiment 4

If the target quantization mode includes the first quantization mode, the second quantization mode, and the third quantization mode. The encoding process of the embodiment of the present disclosure is as shown in FIG. 13.

Figure 13:
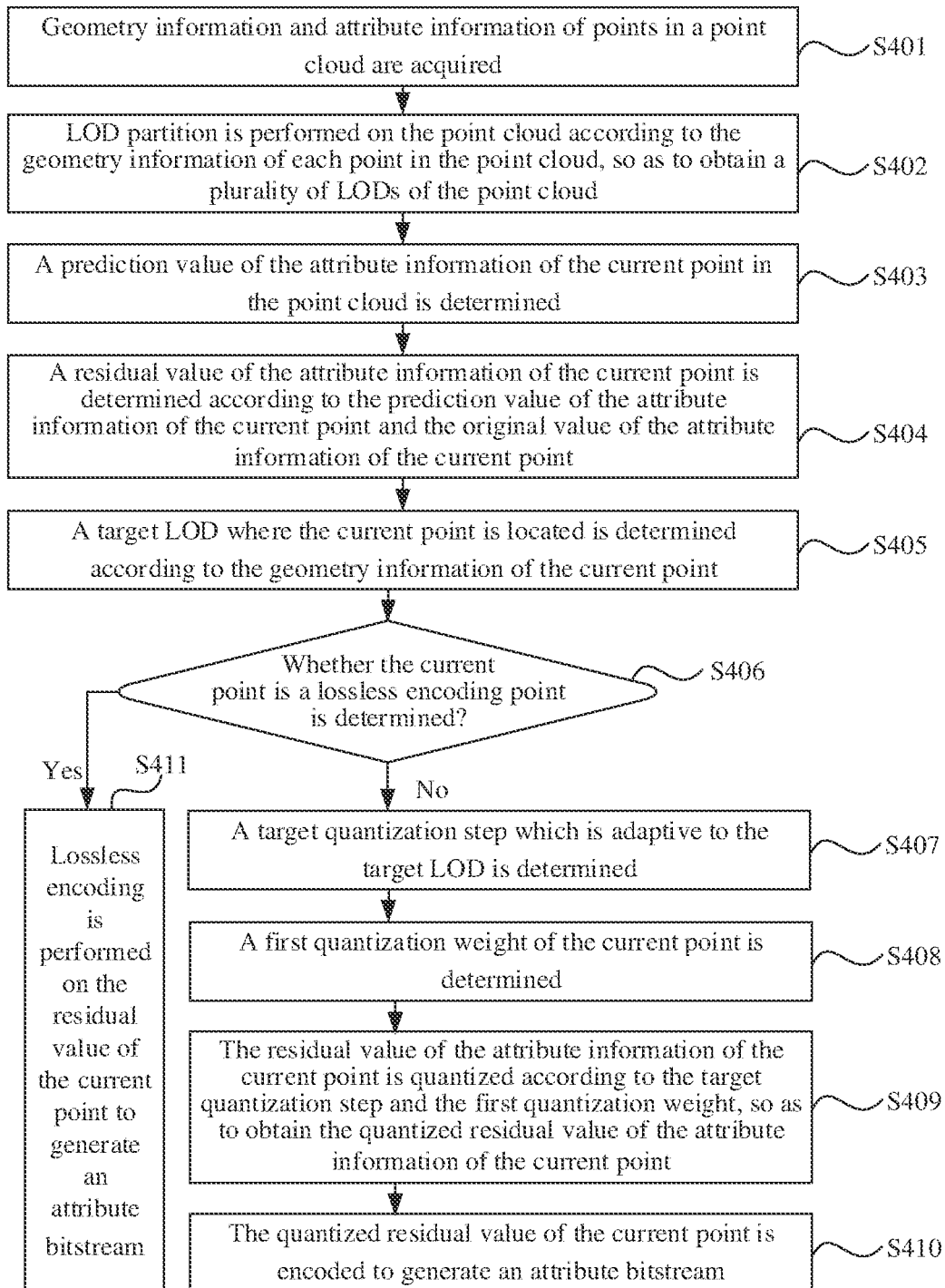
FIG. 13 is a schematic flowchart of a method for point cloud encoding provided by an embodiment of the present disclosure.

FIG. 13 is a schematic flowchart of a method for point cloud encoding provided by an embodiment of the present disclosure. As shown in FIG. 13, the method includes the following operations.

At S401, geometry information and attribute information of points in a point cloud are acquired.

At S402, LOD partition is performed on the point cloud according to the geometry information of each point in the point cloud, so as to obtain a plurality of LODs of the point cloud. Each LOD includes at least one detail expression level, and each detail expression level includes at least one point.

At S403, a prediction value of the attribute information of the current point in the point cloud is determined.

At S404, a residual value of the attribute information of the current point is determined according to the prediction value of the attribute information of the current point and the original value of the attribute information of the current point. For example, the difference between the original value and the prediction value of the attribute information of the current point is determined as a residual value of the attribute information of the current point.

An implementation process of the above S401 to S404 may refer to the description of the above S201 to S204, which will not be elaborated herein.

At S405, a target LOD where the current point is located is determined according to the geometry information of the current point.

At S406, whether the current point is a lossless encoding point is determined; if it is determined that the current point is a lossy encoding point, the following S407 to S410 are performed; and if it is determined that the current point is the lossless encoding point, S411 is performed.

A process of determining whether the current point is the lossless encoding point refers to the description of above S306, which will not be elaborated herein.

At S407, a target quantization step which is adaptive to the target LOD is determined. Specific reference is made to the description of above S206, which will not be elaborated herein.

At S408, a first quantization weight of the current point is determined.

Specific reference is made to the description of above S207, which will not be elaborated herein.

At S409, the residual value of the attribute information of the current point is quantized according to the target quantization step and the first quantization weight, so as to obtain the quantized residual value of the attribute information of the current point.

At S410, the quantized residual value of the attribute information of the current point is encoded to generate an attribute bitstream.

At S411, the lossless encoding is performed on the residual value of the attribute information of the current point to generate an attribute bitstream.

In a specific embodiment of the present disclosure, the quantization weights (that is, the first quantization weights) of all points in the point cloud are calculated in the first quantization mode. Whether the current point belongs to the first seven LODs is determined, and whether the point is an unquantized point is determined according to the second quantization mode.

If it is determined that the current point belongs to the first seven LODs, and the current point is not an unquantized point, then the QP value of the current coding parameter is read, a DeltaQP value of the LOD is added, and QP+DeltaQP is transformed into the corresponding Qstep, that is, the Qstep is the target quantization step; the quantization weight (that is, the second quantization weight) of the current point is w(Q)=min(w(Q), Qstep). Before quantization, weighting is performed by multiplying the second quantization weight w(Q) by the residual value of the current point to obtain a weighted residual value, and the weighted residual value is quantized according to the target quantization step.

If it is determined that the current point is the unquantized point, then Qstep=1 is performed on the current point (that is, the point does not need to be quantized).

If the current point does not belong to the firsts seven LODs, and the point is not an unquantified point, the QP value of the current coding parameter is read, the QP is transformed into the corresponding Qstep, and the quantization weight of the current point is that w(Q)=min (w(Q), Qstep). Before quantization, weighting is performed by multiplying the w(Q) by the residual value of the current point to obtain the weighted residual value. If the current point is the unquantized point, the Qstep=1 is performed on the point (that is, the point does not need to be quantized).

In an embodiment of the present embodiment, the first quantization mode, the second quantization mode, and the third quantization mode are combined. Specifically, the target LOD where the current point is located is determined according to the geometry information of the current point; if it is determined that the current point is a lossy encoding point, the target quantization step which is adaptive to the target LOD is determined, and the first quantization weight of the current point is determined; and the residual value of the attribute information of the current point is quantized according to the target quantization step and the first quantization weight, so as to obtain the quantized residual value of the attribute information of the current point. Lossless encoding is performed on the residual value of the attribute information of the current point if it is determined that the current point is the lossless encoding point. In the present embodiment, lossless encoding is performed on the residual value of the attribute information of at least one point in the point cloud (that is, quantization is not performed) to reduce the influence of the quantization on the reconstructed value of the attribute information, thereby improving the accuracy of attribute information prediction. In addition, the present embodiment introduces the first quantization weight for weighting the quantization step of the current point. The quantization weight of the current point is introduced, which is equivalent to modifying the target quantization step of the current point based on the first quantization weight of the current point, that is, the target quantization step of the current point may be adaptively adjusted according to the importance degree of the current point, and then the residual value of the current point is quantized based on the adjusted target quantization step. In a process of predicting the attribute information of the points in the point cloud, for the points that are in front positions of the encoding order, when the points are important in the prediction, the quantization step can be prevented from too large, thereby avoiding a large reconstruction error, which is equivalent to that the points with high quantization weights are quantized with small quantization steps to reduce their reconstruction errors. For the points that are in the back positions of the encoding order, the prediction accuracy can be improved, and the encoding effect can be improved.

After the technical solution of the present disclosure is realized on reference software TMC13 V11.0 of G-PCC, part point cloud test sequences (cat1-A) required by the MPEG is tested under the test condition of common test configuration CTC CY. Test results are as shown in the following Table 8.

The target inverse quantization mode includes at least two of the following inverse quantization modes: a first inverse quantization mode, a second inverse quantization mode, and a third inverse quantization mode. The first inverse quantization mode is to set an inverse quantization parameter increment for an inverse quantization parameter of at least one point in the point cloud, the second inverse quantization mode is to perform deweighting processing on the residual values of the points in the point cloud, and the third inverse quantization mode is to perform lossless decoding on the

TABLE 8

| CY_ai geometry lossless, and attribute proximately lossless | | End to end BD-AttrRate[%] | | |
| --- | --- | --- | --- | --- |
| Category | Sequence | Luma component | Chroma component Cb | Chroma component Cr | Reflectance |
| cat1-A | basketball_player_vox11_0000020 | −13.0% | −17.2% | −30.0% |
| | boxer_viewdep_dep_vox12 | −11.7% | −27.9% | −31.9% |
| | dancer_vox11_00000001 | −8.5% | −14.0% | −25.0% |
| | egy ptian_mask_vox12 | −3.8% | −21.0% | −8.3% |
| | façade_00009_vox 12 | −0.1% | −3.6% | −2.6% |
| | façade_00015_vox 14 | −0.7% | −3.8% | −3.8% |
| | façade_00064_vox11 | −2.6% | −7.0% | −11.2% |
| | frog_00067_vox12 | −3.0% | −6.9% | −8.2% |
| | head_00039_vox12 | −1.0% | −3.8% | −7.9% |
| | house_without_roof_00057 | −3.6% | −6.6% | −8.6% |
| | longdress_viewdep_vox12 | −1.1% | −6.5% | −4.4% |
| | longdress_vox10_1300 | −0.4% | −2.5% | −1.7% |
| | loot_viewdep_vox12 | −12.6% | −34.5% | −38.1% |
| | loot_vox10_1200 | −9.0% | −21.7% | −25.3% |
| | queen_0200 | −7.7% | −21.6% | −18.8% |
| | redandblack_viewdep_vox12 | −11.4% | −18.0% | −14.4% |
| | redandblack_vox10_1550 | −5.8% | −11.2% | −7.9% |
| | shiva_00035_vox12 | 0.3% | −0.4% | −0.4% |
| | soldier_viewdep_vox12 | −4.7% | −19.7% | −25.3% |
| | soldier_vox10_0690 | −2.5% | −12.6% | −16.2% |
| | thaidancer_viewdep_vox12 | −6.3% | −14.3% | −10.3% |
| | ulb_unicom_vox13 | −7.1% | −16.4% | −14.8% |
| | Cat1-A average | −5.3% | −13.2% | −14.3% |

Herein, the point in the point cloud sequence cat-A includes colour attribute information and other attribute information. As shown in Table 7, for the point cloud sequence cat1-A, compared with the conventional technology, by the technical solution of the present disclosure, the performances of the luma component, the chroma component Cb, and the chroma component Cr are improved.

Embodiment 5

The method for point cloud encoding involved in the embodiment of the present disclosure is described above. On this basis, the method for point cloud decoding involved in the embodiment of the present disclosure is described below for a decoding end.

Figure 14:
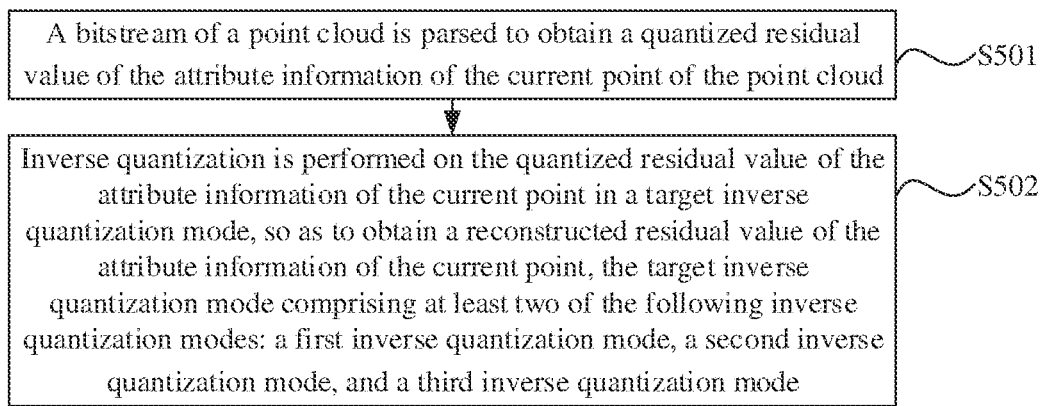
FIG. 14 is a schematic flowchart of a method for point cloud decoding provided by an embodiment of the present disclosure.

FIG. 14 is a schematic flowchart of a method for point cloud decoding provided by an embodiment of the present disclosure. As shown in FIG. 14, the method of the embodiment of the present disclosure includes the following operations.

At S501, a bitstream of a point cloud is parsed to obtain a quantized residual value of the attribute information of the current point of the point cloud.

At S502, inverse quantization is performed on the quantized residual value of the attribute information of the current point in a target inverse quantization mode, so as to obtain a reconstructed residual value of the attribute information of the current point.

residual value of the attribute information of at least one point in the point cloud.

The inverse quantization may also be referred to as reverse quantization or dequantization, which can be understood as Scaling. The prediction value may be a colour prediction value in attribute prediction value.

It is to be noted that the decoding of attribute information is performed after the decoding of the geometry information of the point in the point cloud is completed. After the decoding of a geometry bitstream is completed, geometry information of the point in the point cloud may be obtained.

An attribute bitstream of the point cloud is parsed to obtain a quantized residual value of the attribute information of the points in the point cloud. Inverse quantization is performed on the quantized residual values of the attribute information of the points in the point cloud in a target quantization mode, so as to obtain the reconstructed residual values of the attribute information of the points. The target inverse quantization mode includes at least two of the following inverse quantization modes: the first inverse quantization mode, the second inverse quantization mode, and the third inverse quantization mode.

The embodiment of the present disclosure further includes that the prediction values of the attribute information of the points in the point cloud is determined according to the geometry information of the points in the point cloud.

Specifically, the geometry information of the points in the point cloud is decoded to obtain the reconstruction values of the geometry information of the points in the point cloud, and the prediction values of the attribute information of the points in the point cloud are determined according to the reconstructed values of the geometry information of the points in the point cloud.

The reconstructed values of the attribute information of the points in the point cloud are obtained according to the prediction residual values and the reconstructed residual values of the attribute information of the points in the point cloud.

Embodiment 6

Figure 15:
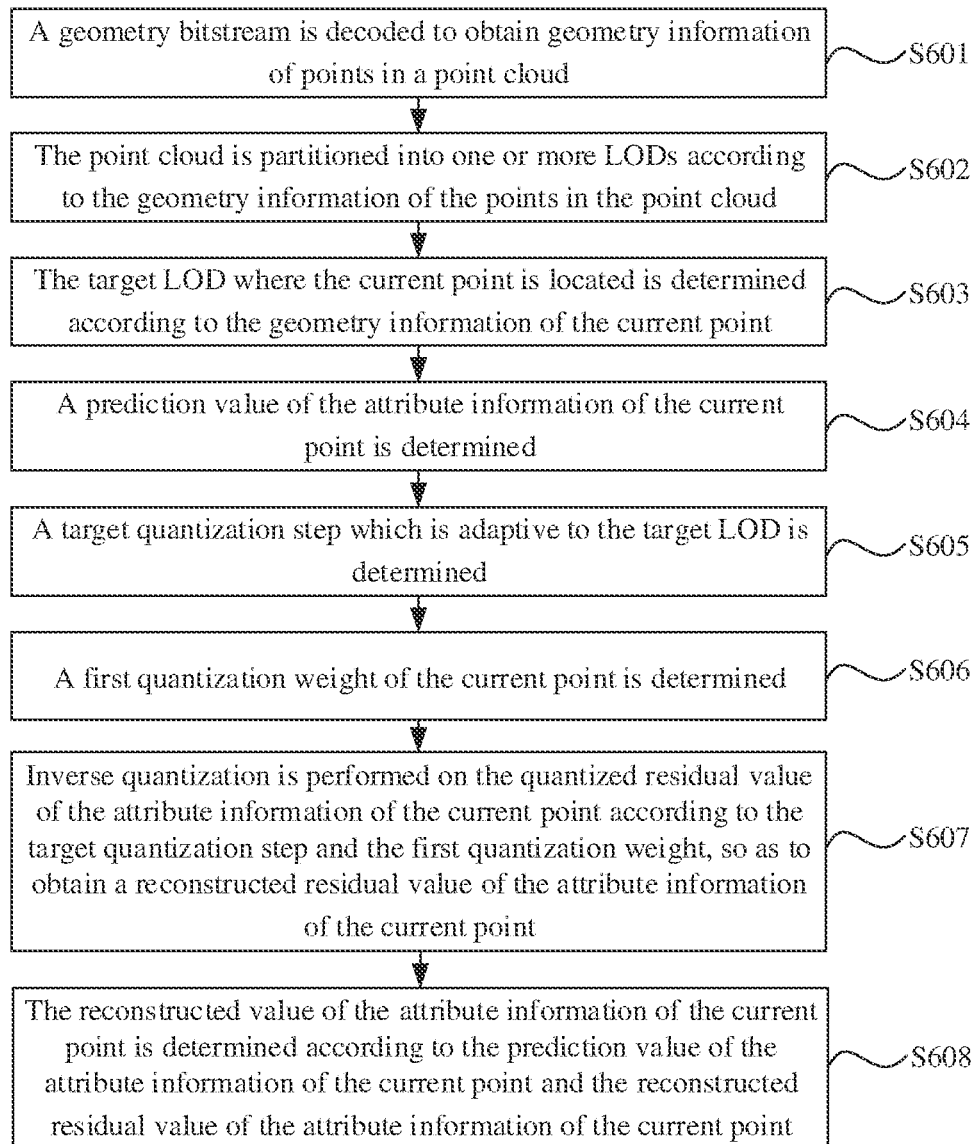
FIG. 15 is a schematic flowchart of a method for point cloud decoding provided by an embodiment of the present disclosure.

If the target reaction quantization mode includes the first inverse quantization mode and the second inverse quantization mode, then the decoding process is as shown in FIG. 15.

FIG. 15 is a schematic flowchart of a method for point cloud decoding provided by an embodiment of the present disclosure. As shown in FIG. 15, the method includes the following operations.

At S601, a geometry bitstream is decoded to obtain geometry information of points in a point cloud.

At S602, the point cloud is partitioned into one or more LODs according to the geometry information of the points in the point cloud. Each LOD includes at least one detail expression level, and each detail expression level includes at least one point.

At S603, a target LOD where the current point is located is determined according to the geometry information of the current point.

At S604, a prediction value of the attribute information of the current point is determined. For example, the points in the point cloud are sorted according to a plurality of detail expression levels, so as to obtain a LOD order. At least one decoded neighbouring point of a point to be decoded is acquired from the LOD order according to the geometry information of the point to be decoded. The prediction value of the attribute information of the point to be decoded is determined according to the reconstructed value of the attribute information of the at least one decoded neighbouring point.

At S605, the target quantization step which is adaptive to the target LOD is determined.

The modes for implementing S605 include, but are not limited to, the following modes.

Mode 1, a bitstream is decoded to obtain a quantization parameter in coding parameters of the current point; a hierarchical level index of the target LOD is acquired, and a quantitative parameter increment of the target LOD is determined according to the hierarchical level index of the target LOD; and the target quantization step corresponding to the target LOD is determined according to the quantization parameter and the quantization parameter increment of the target LOD.

In some embodiments, the operation that the quantization parameter increment of the target LOD is determined according to the hierarchical level index of the target LOD includes that: if the target LOD belongs to the first N LODs of the point cloud, then the quantization parameter increment of the target LOD is determined as j, herein N is a positive integer less than or equal to a first threshold value, and j is an integer greater than 0 and less than or equal to a second threshold value. If the target LOD does not belong to the first N LODs of the point cloud, then the quantization parameter increment of the target LOD is determined as 0.

Optionally, if the quantization parameter is greater than or equal to a third threshold value, then j is a first preset value. If the quantization parameter is less than the third threshold value, then j is a second preset value.

Mode 2, the hierarchical level index of the target LOD is obtained; and the target quantization step corresponding to the target LOD is queried in a quantization step look-up table according to the hierarchical level index of the target LOD. The quantization step look-up table includes a corresponding relationship between the LODs and the quantization steps.

The number of the LODs is set by the common coding parameter CTC of the point cloud. This part of parameters belongs to an attribute parameter set of the point cloud. In the embodiments of the present disclosure, the inverse quantization is performed on the plurality of partitioned LODs by using different quantization steps Qsteps. The partition of different LODs and variable values of the quantization steps may be preset.

In actual application, the quantization step which is adaptive to the LOD of the previous level may be smaller, the quantization step which is adaptive to the LOD of the subsequent level may be larger, the number of the points in the LOD of the previous level is small, the number of the points in the LOD of the subsequent layer is large, the LOD with a small number of points is adaptive to a small quantization step, the LOD with a large number of points is adaptive to a large quantization step, and the overall processing duration during decoding cannot be too long.

In the solution of the present disclosure, when inverse quantization is performed on the residual of the currently processed point $P_i$, the quantization step $Qstep_i$ is adaptive to the LOD where the point $P_i$ is located, and the inverse quantization is not performed by using a fixed quantization step, which is beneficial to improving the efficiency of decoding.

In a possible example, before the quantization step Qstep corresponding to the LOD is determined according to the hierarchical level index and quantization parameter offset parameter of the current coding block, the method further includes that: a value of a quantization parameter optimization enable identifier of the current coding block is determined; upon detecting that the value of the quantization parameter optimization enable identifier is a first value, the hierarchical level index and the quantization parameter offset parameter of the current coding block are determined; and a quantization step Qstep corresponding to the LOD is determined according to the hierarchical level index and the quantization parameter offset parameter.

In specific implementation, when the quantization step is determined, first, the value of the quantization parameter optimization enable identifier needs to be determined first, the value of the quantization parameter optimization enable identifier may be taken as 0 or 1. One value of them is recorded as the first value. The hierarchical level index and the quantization parameter offset parameter are determined only when the value of the quantization parameter optimization enable identifier is the first value, and the quantization step Qstep corresponding to the LOD is further determined.

It can be seen that, in the present example, the value of the quantization parameter optimization enable identifier of the current coding block is determined first; upon detecting that the value of the quantization parameter optimization enable identifier is the first value, the hierarchical level index and the quantization parameter offset parameter of the current coding block are determined; and the quantization step Qstep corresponding to the LOD is determined according to the hierarchical level index and the quantization parameter offset parameter, which is beneficial to improving the efficiency of decoding.

In a possible example, the operation that the value of the quantization parameter optimization enable identifier of the current coding block is determined includes that: the bitstream is parsed, and the value of the quantization parameter optimization enable identifier of the parameter set of the current coding block is acquired.

In specific implementation, the bitstream may include the parameter set. When the bitstream is parsed, the value of the quantization parameter optimization enable identifier in the parameter set of the current coding block may be acquired.

It can be seen that, in the present example, the value of the quantization parameter optimization enable identifier in the parameter set of the current coding block may be acquired by parsing the bitstream, which is beneficial to improving the efficiency of decoding.

In a possible example, the parameter set is an attribute parameter set of current coding block.

In specific implementation, when the bitstream is parsed, the value of the quantization parameter optimization enable identifier in the attribute parameter set of the current coding block may be acquired.

It can be seen that, in the present example, the value of the quantization parameter optimization enable identifier in the attribute parameter set of the current coding block may be acquired by parsing the bitstream, which is beneficial to improving the efficiency of decoding.

In a possible embodiment, the operation that the hierarchical level index and the quantization parameter offset parameter of the current coding block are determined includes that: the hierarchical level index and the quantization parameter offset parameter in the attribute parameter set are read.

In specific implementation, the hierarchical level index and the quantization parameter offset parameter in the attribute parameter set may be read directly.

It can be seen that, in the present example, the hierarchical level index and the quantization parameter offset parameter of the current coding block may be determined by reading the hierarchical level index and the quantization parameter offset parameter in the attribute parameter set, which is beneficial to improving the efficiency of decoding.

In a possible embodiment, the operation that the quantization step $Qstep_i$ which is adaptive to the $LOD_i$ is determined includes that: a quantization step look-up table is queried according to the hierarchical level index of the $LOD_i$, and the quantization step $Qstep_i$ corresponding to the $LOD_i$ is acquired. The quantization step look-up table includes a corresponding relationship between the LODs and the quantization steps Qsteps.

In specific implementation, the quantization step look-up table may be queried according to the hierarchical level index corresponding to each $LOD_i$. Since the quantization step look-up table includes a corresponding relationship between the LODs and the quantization steps Qsteps, the quantization step $Qstep_i$ which is adaptive to a certain $LOD_i$ may be determined in a mode of directly querying the table.

It can be seen that, in the present example, the quantization step look-up table is queried according to the hierarchical level index of the $LOD_i$, and the quantization step $Qstep_i$ corresponding to the LOD, is acquired. The quantization step look-up table includes a corresponding relationship between the LODs and the quantization steps Qsteps. The LODs of different levels correspond to different quantization steps, which is beneficial to improving the flexibility of determining the quantization step.

In a possible example, the operation that the quantization step Qstep, corresponding to the LOD is determined according to the hierarchical level index and the quantization parameter offset parameter includes that: a quantization parameter Qp in the coding parameters of the current coding block is determined; the quantization parameter offset of each LOD is determined according to the hierarchical level index and the quantization parameter offset parameter; and the quantization step Qstep corresponding to each LOD is determined according to the quantization parameter Qp and the quantization parameter offset of each LOD.

In specific implementation, the quantization parameter Qp may be determined according to a QP parameter provided by the attribute parameter set.

After the quantization parameter Qp in the coding parameters of the current coding block is determined, the quantization parameter offset of each LOD may be determined according to the hierarchical level index and the quantization parameter offset parameter, so that the quantization step Qstep corresponding to each LOD is determined according to the determined Qp and the quantization parameter offset of each LOD.

It can be seen that, in the present example, the quantization parameter Qp in the coding parameter of the current coding block is determined first; then, the quantization parameter offset of each LOD is determined according to the hierarchical level index and the quantization parameter offset parameter; and next, the quantization step Qstep corresponding to each LOD is determined according to the quantization parameter Qp and the quantization parameter offset of each LOD. The LODs of different levels correspond to different quantization steps, which is beneficial to improving the flexibility of determining the quantization step.

In a possible example, the operation that the quantization parameter offset of each LOD is determined according to the hierarchical level index and the quantization parameter offset parameter includes that: whether the currently processed LOD belongs to a level range restrained by the hierarchical level index is determined. The level range includes the first N levels of a plurality of LODs, and N is a positive integer less than or equal to a first threshold value. If yes, a value j of the quantization parameter offset of the currently processed LOD is determined according to the quantization parameter offset parameter, herein j is an integer greater than 0 and less than or equal to a second threshold value. If not, the value of the quantization parameter offset of the currently processed LOD is determined as 0.

In a specific implementation, the first threshold value may be 14, and the second threshold value may be 10. This considers that the total level number of the LODs is generally 11 to 14. The minimum Qp value of the five code rates set in a Common Test Environment (CTC) is set as 10, so j may be a positive integer greater than 0 and less or equal to 10, so as to ensure that there is no negative number after subtracting the value. Since the larger the quantization parameter is, the larger the corresponding quantization step is, and the larger the quantization step is. Herein, j is an integer greater than 0 and less than or equal to 10. The quantization parameter corresponding to the LODs of e the first N layers is smaller than that of the later levels and there is no negative number after subtracting the value.

The range of the hierarchical level index is the number of 0 to LOD (a positive integer). Assuming that the hierarchical level index is 6, then the quantization steps of $LOD_0$ to $LOD_5$ (that is, the quantization steps of the first 6 LODs) are transformed from QP-QpShiftValue (that is, a quantization parameter-quantization offset parameter).

In addition, if the LOD is further partitioned into a plurality of groups, for example, the hierarchical level index is a number group 4, 5, 6, correspondingly, the LOD may be partitioned into 4 groups according to these 3 partition positions, which are respectively $LOD_0$ to $LOD_3$, $LOD_4$, LODs including $LOD_5$ and $LOD_6$, and subsequent LODs. The values j of the quantization parameter offsets corresponding to different groups may be different.

Since the greater the value of j is, the smaller the quantization parameter-quantization parameter offset, i.e., the Qp-j, is, and the smaller the corresponding quantization step is. Considering that the quantization step is small, the decoding time is relatively long, and the decoding efficiency is affected. Therefore, the value of N may be 6, which is basically half of the total level number of the LODs. The numbers of the points in the previous layers are small, the decoding time cannot be increased too much when processing is performed by using a small quantization step.

When inverse quantization is performed on the residual of the point in the LODs of the first N levels, i.e., the lower levels, the value of j may be taken as 0, so as to obtain a small quantization step to perform the inverse quantization on the residual of the point in the LODs of the first N levels, which improves the efficiency of decoding.

N may be 8. The inverse quantization is performed on the points of the LODs of the first 8 levels by using the small quantization step. The numbers of the points of the LODs of the first 8 levels are small, which is beneficial to improving the efficiency of decoding.

It can be seen that, in the present example, whether the currently processed LOD belongs to a level range restrained by the hierarchical level index is determined first. If yes, a value j of the quantization parameter offset of the currently processed LOD is determined according to the quantization parameter offset parameter, and j is a positive integer greater than 0 and less than or equal to a second threshold value; and if not, the value of the quantization parameter offset of the currently processed LOD is determined as 0. The LOD of the previous level is adaptive to the quantization step corresponding to a small quantization parameter, that is, the LOD of the previous level corresponds to a small quantization step, and the quantization step corresponding to the LOD of a subsequent level is larger than that of the previous layer, which is beneficial to improving the efficiency of decoding.

In a possible example, if the quantization parameter Qp is greater than or equal to the third threshold value, then j is the first preset value. If the quantization parameter Qp is less than the third threshold value, then j is a second preset value.

The third threshold value may be 30. The first preset value may be 10. The second preset value may be 6.

That is to say, the value of j may be determined in a form of a piecewise function according to the quantization parameter Qp corresponding to the current coding block. For example, when the quantization parameter Qp is greater than or equal to 30, j is 10. When Qp is less than 30, j is 6.

It can be seen that, in the present example, if the quantization parameter Qp is greater than or equal to 30, then j is 10. If the quantization parameter Qp is less than 30, then j is 6. The value of j is determined according to the value of the quantization parameter Qp, which is beneficial to improving the flexibility of determining the value of j.

In a possible example, the operation that the quantization parameter offset of each LOD is determined according to the hierarchical level index and the quantization parameter offset parameter includes that: a level combination corresponding to the currently processed LOD is determined, the hierarchical level index is queried to determine the hierarchical level index of the currently processed LOD; and the quantization parameter offset parameter is queried according to the hierarchical level index of the currently processed LOD, and the corresponding quantization parameter offset is determined.

In specific implementation, for the case that there are a plurality of level groups, for example, four groups. The quantization parameter offset parameter may be a number group, for example 3, 5, 6. That is, the first to fourth groups of quantization parameter offsets are respectively −3, −5, and −6. If the determined quantization parameter is QP, then the quantization parameters of the first to fourth groups are actually QP−3, QP−5, QP−6, and QP respectively.

There may be a plurality of level combinations. Any one level combination may include at least two levels that are neighbouring to each other front and back. The plurality of level combinations include a first level combination and a second level combination. The levels in the first layer combination are previous to the levels in the second layer combination. The quantization parameter corresponding to the first level combination is smaller than the quantization parameter corresponding to the second level combination. Different level combinations corresponding to different quantization parameters, which is beneficial to further distinguishing the quantization step corresponding to the LODs of different level s, and improving the flexibility of determining the quantization step.

The first level combination may include the first two levels of the plurality of LODs. The quantization step corresponding to the first level combination is 1. Since the number of the points of the first two levels in the LODs are relatively small, the quantization step being 1 cannot affect to the efficiency of decoding greatly.

The plurality of level combinations may include a first level combination, a second level combination, a third level combination, and a fourth level combination which are sorted from front to back. Any one level combination includes at least two levels that are neighbouring to each other front and back. The first level combination takes the 1/sqrt(4) of the original quantization step as the quantization length of the current level. The original quantization step refers to the quantization step determined according to the quantization parameter. The second level combination takes the 1/sqrt(3) of the original quantization step as the quantization length of the current level. The third level combination takes the 1/sqrt(2) of the original quantization step as the quantization length of the current level. The fourth level combination takes the original quantization step as the quantization length of the current level.

For example, if the original quantization step, that is, the quantization step determined by the quantization parameter corresponding to the current coding block, is a (a is a positive integer), then the first level combination, the second level combination, the third level combination, and the fourth level combination respectively take a/sqrt(4), a/sqrt(3), a/sqrt(2), and a as the quantization step of the current level. The later the level combination is, the larger the corresponding quantization step is. Different levels in the same level combination adopt the same quantization step. The quantization steps corresponding to the LODs of different levels are further distinguished, which improves the flexibility of determining the quantization step.

It can be seen that, in the present example, when the quantization parameter offset is determined, the level combination corresponding to the LOD is determined first, and then the hierarchical level index corresponding to the LOD in the level combination is further determined, and then the quantization parameter offset parameter is queried according to the corresponding hierarchical level index, so as to determine the corresponding quantization parameter offset. Different level combinations correspond to different quantization parameter offsets, which is beneficial to further partitioning the quantization steps corresponding to the LODs of different levels, and improving the flexibility of determining the quantization step.

At S606, a first quantization weight of the current point is determined.

For example, an index of the current point is determined; and the quantization weight corresponding to the index of the current point is determined as the first quantization weight of the current point.

At S607, inverse quantization is performed on the quantized residual value of the attribute information of the current point according to the target quantization step and the first quantization weight, so as to obtain a reconstructed residual value of the attribute information of the current point.

In some embodiments, S607 includes S6071 and S6072.

At S6071, a second quantization weight of the current point is determined according to the first quantization weight of the current point.

At S6072, inverse quantization is performed on the quantized residual value of the attribute information of the current point according to the target quantization step and the second quantization weight, so as to obtain the reconstructed residual value.

In some examples, the second quantization weight is less than or equal to the target quantization step.

In some embodiments, the above S6071 includes that: the second quantization weight of the current point is determined by using the following Formula (10):

$$\text{effectiveQuantWeight} = \min(w(Q), \text{Qstep}) \tag{10}$$

Herein, effectiveQuantWeight represents the second quantization weight of the current point, w(Q) represents the first quantization weight of the current point, k represents the number of bits for a right shift operation on w(Q), and Qstep represents the target quantization step.

In some embodiments, the value of the second quantization weight is equal to the integer power of 2.

In some embodiments, the value of the first quantization weight is not equal to the integer power of 2. The integer power of 2 which is the closest to the first quantization weight of the current point is determined as the second quantization weight of the current point according to the value of the first quantization weight of the current point.

In some embodiments, the above S6072 includes that: inverse quantization is performed on the quantized residual value by using the target quantization step of the current point to obtain a weighted residual value; and the weighted residual value is divided by the second quantization weight to obtain the reconstructed residual value.

In some embodiments, the above S6072 includes that: inverse quantization is performed on the quantized residual value by using the following Formula (11):

$$\text{attrResidualQuant1} = (\text{attrResidualQuant2} \times \text{Qstep}) / \text{effectiveQuantWeight} \tag{11}$$

Herein, attrResidualQuant2 represents the quantized residual value, attrResidualQuant1 represents the reconstructed residual value, effectiveQuantWeight represents the second quantization weight of the current point, Qstep represents the quantization step of the current point, "×" represents a multiplication operation, and "/" represents a division operation.

In some embodiments of, the above S6072 includes that: the target quantization step is updated according to the second quantization weight of the current point; and the quantized residual value of the attribute information of the current point is quantized according to the updated quantization step.

In some embodiments, the operation that the target quantization step is updated according to the second quantization weight of the current point includes that: the target quantization step of the current point is updated by using the following Formula (12):

$$\text{newQstep} = \lceil \text{Qstep}/\text{effectiveQuantWeight} \rceil \tag{12}$$

Herein, the effectiveQuantWeight represents the second quantization step of the current point, newQstep represents the quantization step of the current point after being updated based on the second quantization step of the current point, Qstep represents the quantization step of the current point before being updated based on the second quantization step of the current point, $\lceil \ \rceil$ represents a round up operation, and "/" represents a division operation.

In some embodiments, the embodiment of the present disclosure further includes that: first quantization weights of N nearest points of the current point are updated based on the first quantization weight of the current point by traversing the points in the point cloud according to a reverse order of the encoding order of the point cloud, and N is an integer greater than 0.

In some embodiments, the initial value of the first quantization weight of each point in the point cloud is a preset value.

In some embodiments, the initial values of the first quantization weights of the points in the first M LODs in the LODs of point cloud are greater than the initial values of the first quantization weights of the points in the remaining LODs, and M is a positive integer.

In some embodiments, the operation that the first quantization weights of N nearest points of the current point are updated based on the first quantization weight of the current point includes that: an influence weight of the current point on each of the N nearest points is acquired, herein the influence weight is related to position information of the current point and the N nearest points; and the first quantization weights of the N nearest points are updated based on the quantization weight of the current point and the influence weight of the current point on each of the N nearest points.

In some embodiments, the attribute parameter set of the point cloud includes the influence weight of the current point on each of the N nearest points. The operation that the influence weight of the current point on each of the N nearest points is acquired includes that: the influence weight of the current point on each of the N nearest points is acquired by querying the attribute parameter set.

In some embodiments, the operation that the first quantization weights of the N nearest points are updated based on the quantization weight of the current point and the influence weight of the current point on each of the N nearest points includes the following operation.

The first quantization weights of the N nearest points are updated based on the following Formula (13):

$$w(P_i) \leftarrow w(P_i) + ((a(P_i, Q) \times w(Q)) \gg k) \tag{13}$$

Herein, Q represents the current point, $P_i$ represents the i th nearest neighbouring point of Q, i=1, 2, ..., N, w(Q) represents the first quantization weight of the current point, $a(P_i, Q)$ represents the magnitude of the influence weight of the current point on the neighbouring point, $w(P_i)$ represents the updated first quantization weight of the neighbouring point $P_i$, k represents the number of bits of a right shift operation, ">>" represents a right shift operation, "←" represents an assignment operation, for example, "A←B" represents that the value of B is assigned to A.

Optionally, the value of $a(P_i, Q)$ decreases with the increment of i.

Optionally, the quantization weight of the point cloud is saved as an array; and dimension of the array is the same as the number of points in the point cloud.

At S608, the reconstructed value of the attribute information of the current point is determined according to the prediction residual value and the reconstructed residual value of the attribute information of the current point.

On the basis of the above embodiment, in a specific embodiment of the present disclosure, a point cloud decoding process includes that: the decoding end calculates the quantization weights of all points in the point cloud in the second quantization mode. Whether the current point belongs to the first seven LODs is determined. If the current point belongs to the first seven LODs, the QP value of the current coding parameters in the bitstream is read, then a DeltaQP value of the target LOD where the current point is located is added, QP+DeltaQP is transformed into a corresponding target quantization step Qstep, and the inverse quantization is performed on the quantized residual obtained by decoding by using the Qstep. The quantization weight of the current point is w(Q)=min (w(Q), Qstep). After the inverse quantization, an inverse quantization residual is divided by w(Q) to remove a weighting influence.

If the current point does not belong to the first seven LODs, the QP value of the coding parameters in the bitstream is read, QP is transformed into a corresponding target quantization Qstep, and inverse quantization is performed on the quantized residual obtained by decoding by using the Qstep. The quantization weight of the current point is w(Q)=min (w(Q), Qstep). After the inverse quantization, an inverse quantization residual is divided by w(Q) to remove a weighting influence.

Embodiment 7

Figure 16:
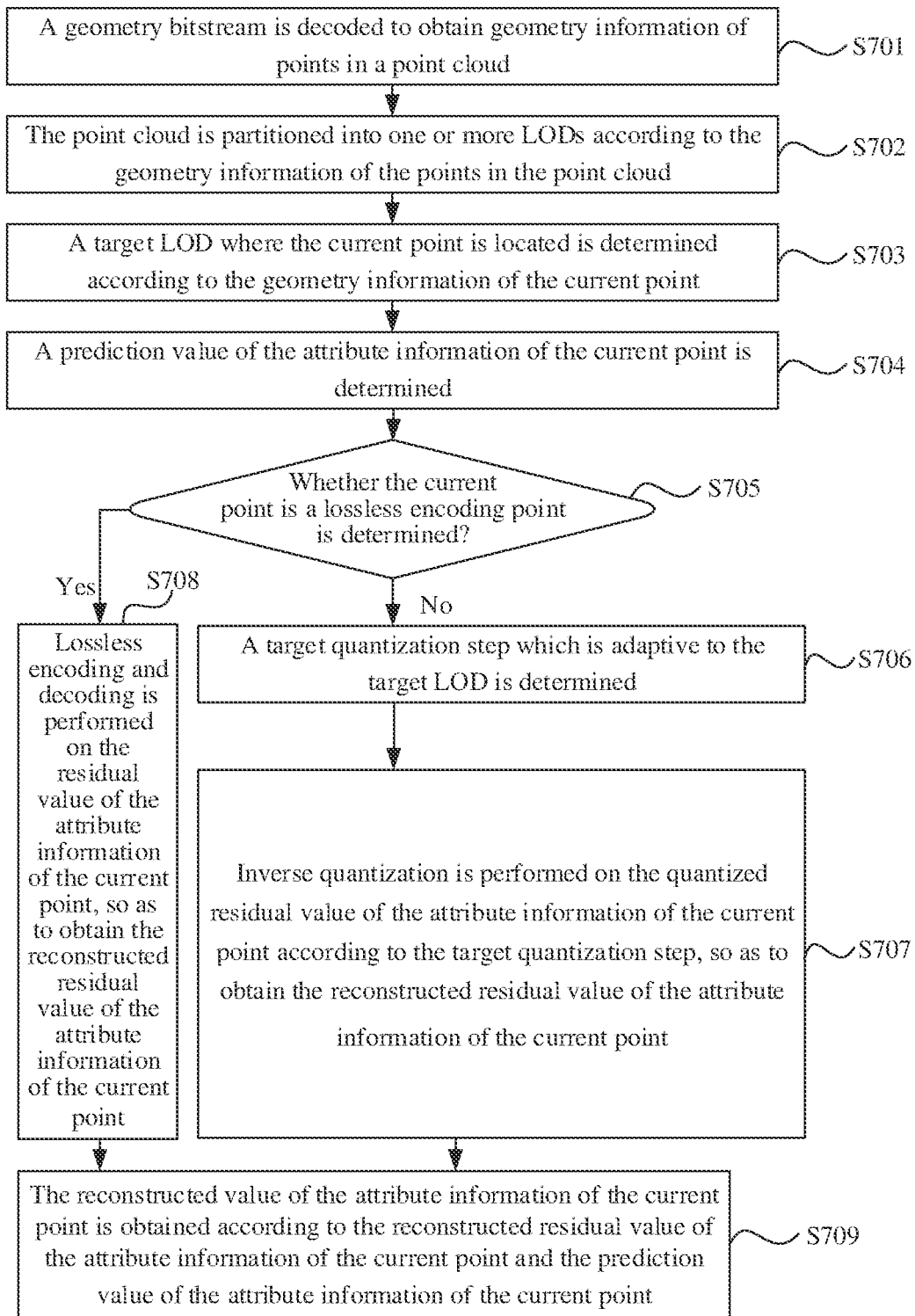
FIG. 16 is a schematic flowchart of a method for point cloud decoding provided by an embodiment of the present disclosure.

If the target reaction quantization mode includes the first inverse quantization mode and the third inverse quantization mode, then the decoding process is as shown in FIG. 16.

FIG. 16 is a schematic flowchart of a method for point cloud decoding provided by an embodiment of the present disclosure. As shown in FIG. 16, the method includes the following operations.

At S701, a geometry bitstream is decoded to obtain geometry information of points in a point cloud.

At S702, the point cloud is partitioned into one or more LODs according to the geometry information of the points in the point cloud. Each LOD includes at least one detail expression level, and each detail expression level includes at least one point.

At S703, a target LOD where the current point is located is determined according to the geometry information of the current point.

At S704, a prediction value of the attribute information of the current point is determined. For example, the points in the point cloud are sorted according to a plurality of detail expression levels, so as to obtain a LOD order. At least one decoded neighbouring point of a point to be decoded is acquired from the LOD order according to the geometry information of the point to be decoded. The prediction value of the attribute information of the point to be decoded is determined according to the reconstructed value of the attribute information of the at least one decoded neighbouring point.

At S705, whether the current point is a lossless encoding point is determined. If not, S706 and S707 are performed. If yes, S708 is performed.

At S706, a target quantization step which is adaptive to the target LOD is determined. A specific process refers to the above embodiments.

At S707, inverse quantization is performed on the quantized residual value of the attribute information of the current point according to the target quantization step, so as to obtain the reconstructed residual value of the attribute information of the current point.

At S708, lossless encoding and decoding is performed on the residual value of the attribute information of the current point, so as to obtain the reconstructed residual value of the attribute information of the current point.

At S709, the reconstructed value of the attribute information of the current point is obtained according to the reconstructed residual value and the prediction value of the attribute information of the current point.

A lossless encoding process involved in the embodiment of the present disclosure is introduced below.

In some embodiments, the lossless decoding performed on the residual value of the attribute information of the point may also be referred to as not quantizing the residual value of the attribute information of the point, or not performing a scaling operation on the residual value of the attribute information of the point. The quantization of the residual value of the attribute information of the point is also referred to as performing the scaling operation on the residual value of the attribute information of the point.

In some embodiments, the above operation that whether the current point is a lossless encoding point is determined in the above S705 includes S7051 and S7052.

At S7051, a bitstream of the point cloud is decoded to obtain first information. The first information is used for indicating a point of which the residual value of the attribute information is subjected to lossless encoding.

At S7052, whether the residual value of the attribute information of the current point is subjected to lossless encoding is determined according to the first information.

The attribute bitstream of the point cloud is decoded, so that residual information and the first information of the attribute information of the points in the point cloud may be obtained. The first information is used for indicating the points of which the residual values of the attribute information are subjected to lossless encoding (or unquantized).

In one example, the first information includes identifier information of the points of which the residual values of the attribute information are subjected to lossless encoding. For example, the encoding end selects, in different point selecting modes, the points of which the residual values of the attribute information are not quantized. The corresponding first information may include the numbers or indexes of the point selecting modes of the points of which the residual values of the attribute information are not quantized.

In another example, the first information includes the total number of the points of which the residual values of the attribute information are subjected to lossless encoding.

In some embodiments, in the above S7052, the implementation modes of determining whether the residual value of the attribute information of the current point is subjected to lossless encoding are different according to the different information carried by the first information. A specific implementation process includes, but is not limited to, the following cases.

Case 1, the first information includes N. N is the total number of the points of which the residual values of the attribute information are subjected to lossless encoding.

Optionally, N is an integer multiple of 2.

Optionally, the intervals between every two neighbouring points in N points of are equal.

At this moment, the above S7052 includes that: it is determined that the residual value of the attribute information of the current point is subjected to lossless encoding if it is determined that the current point is one of the N points. For example, the points in the point cloud are sorted according to the geometry information of the points in the point cloud, so as to obtain a sorted point cloud. For the sorted point cloud, the interval between the two neighbouring points of the N points is determined according to the total number of the points and the value of N, and whether the current point is one of the N points is determined according to the interval. For example, the above interval is 10. When the current point is the 21st point of the sorted point cloud, from the first point in the point cloud, the points with an interval of 10 points are the points with the residual values of the attribute information subjected to lossless encoding, which are the 1st point, the 11th point, the 21st point, . . . respectively, and then the current point is determined as the point with the residual value of the attribute information subjected to lossless encoding.

Case 2, if the first information includes a preset interval, the preset interval is an interval between two neighbouring lossless encoding points in the point cloud.

In some embodiments, the above S7052 includes that: it is determined that the residual value of the attribute information of the current point is subjected to lossless encoding if it is determined that the interval between the current point and the previous point with the residual value of the attribute information subjected to lossless encoding is equal to the preset interval according to the preset interval.

Case 3, if the first information includes a first preset value, the first preset value is used for instructing to set the detail expression levels including a total number of points less than or equal to the first preset value as the first category detail expression levels, and to set the detail expression levels including a total number of points greater than the first preset value as the second category detail expression levels.

In this case, S7052 includes that: at least one first category detail expression level including a total number of points less than or equal to a first preset value and at least one second category detail expression level including a total number of points greater than the first preset value in the plurality of detail expression levels of the point cloud are acquired according to the first preset value.

If the current point belongs to the first category detail expression level, it is determined that the residual value of the attribute information of the current point is subjected to lossless encoding.

Case 4, if the first information includes M. M is the number of points with the residual values of the attribute information subjected to lossless encoded in one second category detail expression level, and M is a positive integer multiple of 2. Optionally, the intervals between every two neighbouring points in M points are equal.

In this case, the above S7052 includes that: if the current point is one of the M points, then it is determined that the residual value of the attribute information of the current point is subjected to lossless encoding.

Case 5, at least one second category detail expression level includes L second category detail expression levels, and L is a positive integer greater than or equal to 2. If the first information includes a first number, a second number, and partition information of P second category detail expression levels and Q second category detail expression levels.

In one example, the first number is greater than the second number. For example, the first number is 24, and the second number is 8.

In one example, the first number is a positive integer multiple of the second number. For example, the first number is 2 multiples of the second number. For example, the first number is 24 and the second number is 12. Or, the first number is 3 multiples of the second number. For example, the first number is 24 and the second number is 8.

In one example, the intervals between two neighbouring points in the first number of points are equal.

In one example, the intervals between two neighbouring points in the second number of points are equal.

In this case, the above S7052 includes that: L second category detail expression levels are partitioned to obtain P second category detail expression levels and Q second category detail expression levels according to the partition information. If it is determined that the current point is one of the first number of points with the residual value of the attribute information subjected to lossless encoding in the P second category detail expression levels, it is determined that the residual value of the attribute information of the current point is subjected to lossless encoding; and if it is determined that the current point is one of the second number of points with the residual value of the attribute information subjected to lossless encoding in the Q second category detail expression levels, it is determined that the residual value of the attribute information of the current point is subjected to lossless encoding.

Herein, L is a positive integer greater than or equal to 2, P and Q are positive integers, and the sum of P and Q is less than or equal to L, P second category detail expression levels and Q second category detail expression levels do not overlap with each other, and the first number is different from the second number.

In one example, the P second category detail expression levels are the first P second category detail expression levels in L second category detail expression levels.

In one example, the Q second category detail expression levels are the last Q second category detail expression levels in L second category detail expression levels.

In one example, the last second category detail expression level in P second category detail expression levels is neighbouring to the first second category detail expression level in Q second category detail expression levels.

In this example, the above partition information may include the identifier information of the first second category detail expression level of Q second category detail expression levels, or the identifier information of the last second category detail expression level of P second category detail expression levels.

In one example, the first information further includes the identifier information of the first point with the residual value of the attribute information subjected to lossless encoding in the second category detail expression level.

In one example, the first information further includes that the identifier information of the point with the residual value of the attribute information subjected to lossless encoding.

In some embodiments, if it is determined that the residual value of the attribute information of the current point is subjected to lossless encoding, the inverse quantization is not performed on the residual of the attribute information of the current point in the following modes.

Mode 1, the current point is skipped in a process of performing inverse quantization on the residual of the attribute information of the points in the point cloud.

Mode 2, an inverse quantization step of the current point is set as 1.

Mode 3, a quantization parameter QP of the current point is set as a target value, and the target value is a corresponding QP value when the inverse quantization step is 1.

In some embodiments, if the current point is a lossless encoding point, the method further includes the following operations.

The reconstructed value of the attribute information of the current point is determined according to the following Formula (14):

$$reconstructedColour = attrResidual + attrPredValue \quad (14).$$

Herein, reconstructedColour is the reconstructed value of the attribute information of the current point, attrResidual is the residual value of the attribute information of the current point, and attrPredValue is the prediction value of the attribute information of the current point.

On the basis of the above embodiments, in a specific embodiment of the present disclosure, a point cloud decoding process includes that: a decoder determines whether the current point belongs to the first seven LODs, and determines whether the current point is an unquantized point.

If the current point belongs to the first seven LODs, and the current point is not an unquantized point, the QP value of the coding parameter in the bitstream is read, a DeltaQP value of the LOD is added, and the QP+DeltaQP is transformed into corresponding Qstep. If the current point is the unquantized point, Qstep=1 for this point (that is, the point does not need to be quantized), and inverse quantization is performed on the quantized residual obtained by decoding by using Qstep.

If the current point does not belong to the first seven LODs, and the current point is not the unquantized point, then Qstep=1 for the current point (that is, the point does not need to be quantized), and inverse quantization is performed on the quantized residual obtained by decoding by using Qstep.

Embodiment 8

Figure 17:
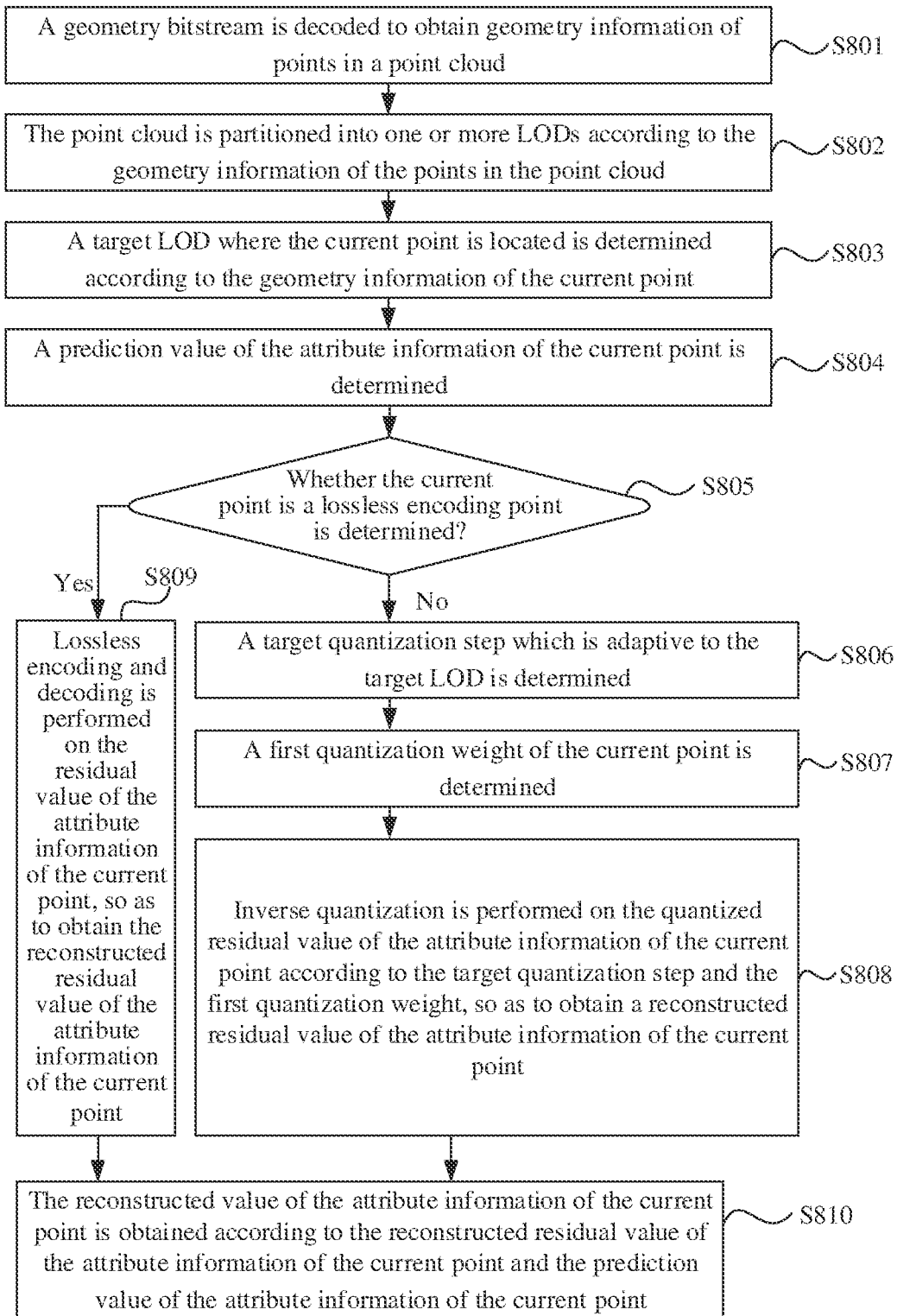
FIG. 17 is a schematic flowchart of a method for point cloud decoding provided by an embodiment of the present disclosure.

If the target reaction quantization mode includes the first inverse quantization mode, the second inverse quantization mode, and the third inverse quantization mode, then the decoding process is as shown in FIG. 17.

FIG. 17 is a schematic flowchart of a method for point cloud decoding provided by an embodiment of the present disclosure. As shown in FIG. 17, the method includes the following operations.

At S801, a geometry bitstream is decoded to obtain geometry information of a points in a point cloud.

At S802, the point cloud is partitioned into one or more LODs according to the geometry information of the points in the point cloud. Each LOD includes at least one detail expression level, and each detail expression level includes at least one point.

At S803, a target LOD where the current point is located is determined according to the geometry information of the current point.

At S804, a prediction value of the attribute information of the current point is determined. For example, the points in the point cloud are sorted according to a plurality of detail expression levels, so as to obtain a LOD order. At least one decoded neighbouring point of a point to be decoded is acquired from the LOD order according to the geometry information of the point to be decoded. The prediction value of the attribute information of the point to be decoded is determined according to the reconstructed value of the attribute information of the at least one decoded neighbouring point.

At S805, whether the current point is a lossless encoding point is determined. If not, S806 and S809 are performed. If yes, S708 is performed.

At S806, a target quantization step which is adaptive to the target LOD is determined, which refers to the description of the above S605.

At S807, a first quantization weight of the current point is determined, which refers to the description of the above S606.

At S808, inverse quantization is performed on the quantized residual value of the attribute information of the current point according to the target quantization step and the first quantization weight, so as to obtain a reconstructed residual value of the attribute information of the current point, which refers to the description of the above S607.

At S809, lossless encoding and decoding is performed on the residual value of the attribute information of the current point, so as to obtain the reconstructed residual value of the attribute information of the current point.

At S810, the reconstructed value of the attribute information of the current point is obtained according to the reconstructed residual value and the prediction value of the attribute information of the current point.

In a specific embodiment of the present disclosure, the point cloud decoding process includes that: a decoding end calculates the quantization weights of all points in the point cloud. Whether the current point belongs to the first seven LODs is determined, and whether the current point is an unquantized point is determined.

If the current point belongs to the first seven LODs, and the current point is not an unquantized point, the QP value of the coding parameter in the bitstream is read, a DeltaQP value of the layer LOD is added, and the QP+DeltaQP is transformed into corresponding Qstep. The inverse quantization is performed on the quantized value obtained by decoding by using Qstep. The quantization weight of the current point is $w(Q)=\min(w(Q), Qstep)$. After the inverse quantization, an inverse quantization residual is divided by $w(Q)$ to remove a weighting influence. If the current point is not the unquantized point, then Qstep=1 of the current point (that is, the point does not need to be quantized), and inverse quantization is performed on the quantized residual obtained by decoding by using Qstep.

If the current point does not belong to the first seven LODs, and the current point is not an unquantized point, the QP value of the coding parameter in the bitstream is read, the QP is transformed into corresponding Qstep, and inverse quantization is performed on the unquantized residual obtained by decoding by using Qstep. The quantization weight of the current point is $w(Q)=\min(w(Q), Qstep)$. After the inverse quantization, an inverse quantization residual is divided by $w(Q)$ to remove a weighting influence.

If the current point is an unquantized point, then Qstep=1 is performed on the current point (that is, the point does not need to be quantized).

It is to be understood that FIG. 6 to FIG. 17 are only examples of the present disclosure, and are not to be understood as a limitation to the present disclosure.

The preferred implementation modes of the present disclosure are described in detail above in combination with the drawings. However, the present disclosure is not limited to specific details in the above implementation modes. Within the scope of the technical concept of the present disclosure, a variety of simple variants of the technical solution of the present disclosure can be carried out, and these simple variants belong to the scope of protection of the present disclosure. For example, each specific technical feature described in the above specific implementation modes can be combined in any suitable way without contradiction. In order to avoid unnecessary repetition, the present disclosure will not describe various possible combination modes separately. For another example, various different implementation modes of the present disclosure can also be combined arbitrarily, which is also considered as the content disclosed in the present disclosure as long as not violating the idea of the present disclosure.

It is also to be understood that, in various method embodiments of the present disclosure, the sequence numbers of various processes above do not mean execution sequences. The execution sequences of various processes should be determined according to functions and internal logic of the processes, and should not be construed as any limitation on the implementation processes of the embodiments of the present disclosure. In addition, in the embodiments of the present disclosure, the term "and/or" only describes an association relationship for describing associated objects and represents that three relationships may exist. Specifically, A and/or B may represent three cases: only A exists, both A and B exist, and only B exists. In addition, the character "/" herein generally indicates that the contextual objects are in an "or" relationship.

Method embodiments of the present disclosure are described in detail above in combination with FIG. 6 to FIG. 17. Apparatus embodiments of the present embodiment will be described in detail below in combination with FIG. 18 to FIG. 20.

Figure 18:
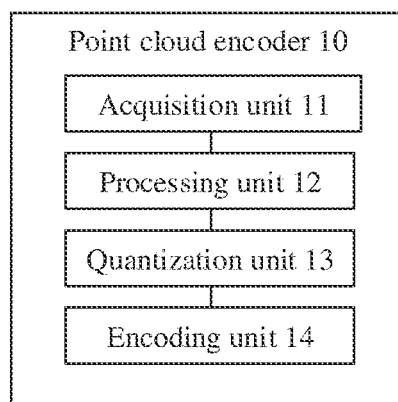
FIG. 18 is a schematic block diagram of a point cloud encoder provided by an embodiment of the present disclosure.

FIG. 18 is a schematic block diagram of a point cloud encoder 10 provided by an embodiment of the present disclosure.

As shown in FIG. 18, a point cloud encoder 10 includes an acquisition unit 11, a processing unit 12, and a quantization unit 13.

The acquisition unit 11 is configured to acquire attribute information of a current point in a point cloud.

The processing unit 12 is configured to process the attribute information of the current point to obtain a residual value of the attribute information of the current point.

The quantization unit 13 is configured to quantize the residual value of the attribute information of the current point in a target quantization mode, so as to obtain a quantized residual value of the attribute information of the current point.

The target quantization mode includes at least two of the following quantization modes: a first quantization mode, a second quantization mode, and a third quantization mode. The first quantization mode is to set a quantization parameter increment for a quantization parameter of at least one point in the point cloud, the second quantization mode is to weight the residual values of the points in the point cloud, and the third quantization mode is to perform lossless encoding on the residual value of the attribute information of at least one point in the point cloud.

In some embodiments, the acquisition unit 11 is further configured to acquire geometry information of the point in the point cloud. The processing unit 12 is configured to partition the point cloud is into one or more LODs according to the geometry information of the points in the point cloud.

In some embodiments, the target quantization mode includes the first quantization mode and the second quantization mode. The quantization unit 13 is configured to determine a target LOD where the current point is located according to the geometry information of the current point, determine a target quantization step which is adaptive to the target LOD, determine a first quantization weight of the current point, and quantize the residual value of the attribute information of the current point according to the target quantization step and the first quantization weight, so as to obtain the quantized residual value of the attribute information of the current point.

In some embodiments, the target quantization mode includes the first quantization mode and the second quantization mode. The quantization unit 13 is specifically configured to: determine the target LOD where the current point is located according to the geometry information of the current point; determine the target quantization step which is adaptive to the target LOD in response to determining that the current point is a lossy encoding point; and quantize the residual value of the attribute information of the current point according to the target quantization step, so as to obtain the quantized residual value of the attribute information of the current point.

In some embodiments, the target quantization mode includes the first quantization mode, the second quantization mode, and the third quantization mode. The quantization unit 13 is specifically configured to determine a target LOD where the current point is located according to the geometry information of the current point, determine a target quantization step which is adaptive to the target LOD and determine a first quantization weight of the current point in response to determining that the current point is a lossless encoding point, and quantize the residual value of the attribute information of the current point according to the target quantization step and the first quantization weight, so as to obtain the quantized residual value of the attribute information of the current point.

In some embodiments, the quantization unit 13 is further configured to perform lossless encoding on the residual value of the attribute information of the current point in response to determining that the current point is the lossless encoding point.

In some embodiments, the quantization unit 13 is specifically configured to acquire a hierarchical level index of the target LOD; and query the target quantization step corresponding to the target LOD in a quantization step look-up table according to the hierarchical level index of the target LOD. The quantization step look-up table includes a corresponding relationship between the LODs and the quantization steps.

In some embodiments, the quantization unit 13 is specifically configured to determine a quantization parameter of coding parameters of the current point, acquire a hierarchical level index of the target LOD, and determine a quantization parameter increment of the target LOD according to the hierarchical level index of the target LOD, and determine the target quantization step corresponding to the target LOD according to the quantization parameter and the quantization parameter increment of the target LOD.

In some embodiments, the quantization unit 13 is specifically configured to determine the quantization parameter increment of the target LOD as j if the target LOD belongs to the first N LODs of the point cloud, herein N is a positive integer less than or equal to a first threshold value, and j is an integer greater than 0 and less than or equal to a second threshold value; and determine the quantization parameter increment of the target LOD as 0 if the target LOD does not belong to the first N LODs of the point cloud.

Optionally, if the quantization parameter is greater than or equal to the third threshold value, j is a first preset value.

If the quantization parameter is less than the third threshold value, j is a second preset value.

In some embodiments, the quantization unit 13 is specifically configured to determine an index of the current point, and determine a quantization weight corresponding to the index of the current point as a first quantization weight of the current point.

In some embodiments, the quantization unit 13 is specifically configured to determine a second quantization weight of the current point according to the first quantization weight of the current point, and quantize the residual value of the attribute information of the current point according to the target quantization step and the first quantization weight, so as to obtain the quantized residual value.

Optionally, the second quantization weight is less than or equal to the target quantization step.

In some embodiments, the quantization unit 13 is specifically configured to determine the second quantization weight of the current point by using the following formula:

effectiveQuantWeight=min(w(Q)»k,Qstep).

Herein, effectiveQuantWeight represents the second quantization weight of the current point, w(Q) represents the first quantization weight of the current point, k represents the number of bits for a right shift operation performed on the w(Q), and Qstep represents the target quantization step.

Optionally, the value of the second quantization weight is equal to the integer power of 2.

Optionally, the value of the first quantization weight is not equal to the integer power of 2. The quantization unit 13 is specifically configured to determine the integer power of 2 which is the closest to the first quantization weight of the current point as the second quantization weight based on the value of the first quantization weight of the current point.

In some embodiments, the quantization unit 13 is specifically configured to multiply the second quantization weight by the residual value of the attribute information of the current point to obtain a weighted residual value, and quantize the weighted residual value by using the target quantization step to obtain the quantized residual value of the attribute information of the current point.

In some embodiments, the quantization unit 13 is specifically configured to quantize the residual value of the attribute information of the current point by using the following formula:

attrResidualQuant2=attrResidualQuant1×effectiveQuantWeight/Qstep.

Herein, attrResidualQuant2 represents the quantized residual value of the attribute information of the current point, attrResidualQuant1 represents the residual value of the attribute information of the current point, effectiveQuantWeight represents the second quantization weight of the current point, and Qstep represents the target quantization step.

In some embodiments, the quantization unit 13 is specifically configured to update the target quantization step according to the second quantization weight of the current point, and quantize the residual value of the attribute information of the current point according to the updated quantization step.

In some embodiments, the quantization unit 13 is specifically configured to update the target quantization step by using the following formula.

newQstep=[Qstep/effectiveQuantWeight].

Herein, effectiveQuantWeight represents the second quantization weight of the current point, newQstep represents the quantization step of the current point after being updated based on the target quantization step, and the Qstep represents the target quantization step.

In some embodiments, the quantization unit 13 is further configured to update first quantization weights of N nearest points of the current point based on the first quantization weight of the current point by traversing the points in the point cloud according to a reverse order of the encoding order of the point cloud. N is an integer greater than 0.

Optionally, the initial value of the first quantization weight of each point in the point cloud is a preset value.

Optionally, the initial values of the first quantization weights of the points in the first M LODs in the LODs of the point cloud are greater than the initial values of the first quantization weights of the points in the remaining LODs. M is a positive integer.

In some embodiments, the quantization unit 13 is specifically configured to acquire an influence weight of the current point on each of the N nearest points, the influence weight being related to position information of the current point and the N nearest points; and update the first quantization weights of the N nearest points based on the quantization weight of the current point and the influence weight of the current point on each of the N nearest points.

In some embodiments, the attribute parameter set of the point cloud includes the influence weight of the current point on each of the N nearest points. The quantization unit 13 is specifically configured to acquire the influence weight of the current point on each of the N nearest points by querying the attribute parameter set.

In some embodiments, the quantization unit 13 is specifically configured to update the first quantization weights of the N nearest points by using the following formula:

w($P_i$)←w($P_i$)+((a($P_i$,Q)×w(Q))»k).

Herein, Q represents the current point, $P_i$ represents the i th nearest neighbouring point of Q, i=1, 2, . . . , N, w(Q) represents the first quantization weight of the current point, a($P_i$, Q) represents the magnitude of the influence weight of the current point on the neighbouring point, w($P_i$) represents the updated first quantization weight of the neighbouring point $P_i$, and k represents the number of bits of a right shift operation.

Optionally, the value of a($P_i$, Q) decreases with the increment of i.

Optionally, the quantization weight of the point cloud is saved as an array; and the dimension of the array is the same as the number of points in the point cloud.

In some embodiments, the encoder further includes an encoding unit 14. The encoding unit 14 is configured to perform lossless encoding on the residual value of the attribute information of at least one point in the point cloud.

Optionally, the at least one point includes N points, and N is an integer multiple of 2.

Optionally, the at least one point includes N points, and the intervals between every two neighbouring points of the N points are equal.

In some embodiments, the encoding unit 14 is specifically configured to perform lossless encoding on the residual value of the attribute information of the at least one point in at least one detail expression level in a plurality of detail expression levels.

In some embodiments, the encoding unit 14 is specifically configured to: acquire at least one first category detail expression level including a total number of points less than or equal to a first preset value and at least one second category detail expression level including a total number of points greater than the first preset value in the plurality of detail expression levels of the point cloud; perform lossless encoding on the residual value of the attribute information of all points in the first category detail expression level; and perform lossless encoding on the residual value of the attribute information of at least one point in the second category detail expression level.

In some embodiments, the encoding unit 14 is specifically configured to perform lossless encoding on the residual values of the attribute information of M points in the second category detail expression level. M is an integer multiple of 2.

In some embodiments, the at least one second category detail expression level includes L second category detail expression levels, and L is a positive integer greater than or equal to 2. The encoding unit 14 is specifically configured to perform lossless encoding on the residual values of the attribute information of a first number of points in each of P second category detail expression levels, and perform lossless encoding on the residual values of the attribute information of a second number of points in each of Q second category detail expression levels.

Herein, P and Q are positive integers, and the sum of P and Q is less than or equal to L; the P second category detail expression levels do not overlap with the Q second category detail expression levels; and the first number is different from the second number.

Optionally, the P second category detail expression levels are the first P second category detail expression levels in the L second category detail expression levels.

Optionally, the Q second category detail expression levels are the last Q second category detail expression levels in the at L second category detail expression levels.

Optionally, the last second category detail expression level in the P second category detail expression levels is neighbour to the first second category detail expression level in the Q second category detail expression levels.

Optionally, the first number is greater than the second number.

Optionally, the first number is an integer multiple of the second number.

Optionally, the intervals between two neighbouring points in the first number of points are equal.

Optionally, the intervals between two neighbouring points in the second number of points are equal.

In some embodiments, the encoding unit 14 is further configured to determine a reconstructed value of the current point according to the residual value of the attribute information of the current point and a prediction value of the attribute information of the current point.

In some embodiments, the encoding unit 14 is specifically configured to determine a reconstructed value of the attribute information of the current point according to the following formula:

reconstructedColour=attrResidual+attrPredValue.

Herein, reconstructedColour is the reconstructed value of the attribute information of the current point, attrResidual is the residual value of the attribute information of the current point, and attrPredValue is the prediction value of the attribute information of the current point.

In some embodiments, the encoding unit 14 is further configured to generate a bitstream. The bitstream includes first information. The first information is used for indicating at least one point with the residual value of the attribute information subjected to lossless encoding.

Optionally, the first information includes identifier information of the at least one point of which the residual value of the attribute information is subjected to lossless encoding.

Optionally, the first information includes the number of the at least one point of which the residual value of the attribute information is subjected to lossless encoding.

Optionally, the first information includes a first number, a second number, and partition information of the P second category detail expression levels and the Q second category detail expression level.

Optionally, if the last second category detail expression level in the P second category detail expression levels is neighbour to the first second category detail expression level in the Q second category detail expression levels, then the partition information further includes identifier information of the first second category detail expression level in the Q second category detail expression levels, or identifier information of the last second category detail expression level in the P second category detail expression levels.

Optionally, the first information further includes identifier information of the first point, of which the residual value of the attribute information is subjected to lossless encoding, in the second category detail expression level.

In some embodiments, the encoding unit 14 is specifically configured to skip at least one point of which the residual value of the attribute information is subjected to lossless encoding during quantizing the residual value of the attribute information of the at least one point in the point cloud; or set a quantization step of at least one point of which the residual value of the attribute information is subjected to lossless encoding as 1; or set a quantization parameter QP of at least one point of which the residual value of the attribute information is subjected to lossless encoding as a target value, herein the target value is a QP value corresponding to the quantization step of 1.

It is to be understood that the apparatus embodiments correspond to the method embodiments. Similar description may refer to the method embodiments. To avoid repetition, details are not described in detail herein. Specifically, the point cloud encoder 10 shown in FIG. 18 can execute the method of the embodiment of the present application, and the foregoing and other operations and/or functions of each unit in the point cloud encoder 10 are not repeated here for the sake of brevity in order to implement the corresponding processes in each method such as methods 100 to 400.

Figure 19:
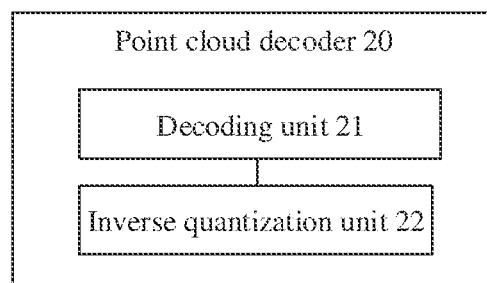
FIG. 19 is a schematic block diagram of a point cloud decoder provided by an embodiment of the present disclosure.

FIG. 19 is a schematic block diagram of a point cloud decoder 20 provided by an embodiment of the present disclosure.

As shown in FIG. 19, the apparatus 20 may include a decoding unit 21 and an inverse quantization unit 22.

The decoding unit 21 is configured to parse a bitstream of a point cloud to obtain a quantized residual value of the attribute information of the current point of the point cloud.

The inverse quantization unit 22 is configured to perform inverse quantization on the quantized residual value of the attribute information of the current point to obtain a reconstructed residual value of the attribute information of the current point.

The target inverse quantization mode includes at least two of the following inverse quantization modes: a first inverse quantization mode, a second inverse quantization mode, and a third inverse quantization mode. The first inverse quantization mode is to set an inverse quantization parameter increment for an inverse quantization parameter of at least one point in the point cloud, the second inverse quantization mode is to perform deweighting processing on the residual values of the points in the point cloud, and the third inverse quantization mode is to perform lossless decoding on the residual value of the attribute information of at least one point in the point cloud.

In some embodiments, the decoding unit 21 is configured to acquire geometry information of the points in the point cloud, and partition the point cloud is into one or more LODs according to the geometry information of the points in the point cloud.

In some embodiments, the target quantization mode includes the first quantization mode and the second quantization mode. The inverse quantization unit 22 is specifically configured to determine a target LOD where the current point is located according to the geometry information of the current point, determine a target quantization step which is adaptive to the target LOD, determine a first quantization weight of the current point, and perform inverse quantization of the quantized residual value of the attribute information of the current point according to the target quantization step and the first quantization weight.

In some embodiments, the target inverse quantization mode includes the first quantization mode and the third quantization mode. The inverse quantization unit 22 is specifically configured to determine a target LOD where the current point is located according to the geometry information of the current point, determine a target quantization step which is adaptive to the target LOD in response to determining that the current point is a lossless encoding point, and perform inverse quantization on the quantized residual value of the attribute information of the current point according to the target quantization step.

In some embodiments, the target inverse quantization mode includes the first quantization mode, the second quantization mode, and the third quantization mode. The inverse quantization unit 22 is specifically configured to determine a target LOD where the current point is located according to the geometry information of the current point, determine a target quantization step which is adaptive to the target LOD and determine a first quantization weight of the current point in response to determining that the current point is a lossless encoding point, and perform inverse quantization on the quantized residual value of the attribute information of the current point according to the target quantization step and the first quantization weight.

In some embodiments, the decoding unit 21 is further configured to perform lossless encoding on the residual value of the attribute information of the current point in response to determining that the current point is the lossless encoding point.

In some embodiments, the inverse quantization unit 22 is specifically configured to acquire a hierarchical level index of the target LOD, and query the target quantization step corresponding to the target LOD in a quantization step look-up table according to the hierarchical level index of the target LOD. The quantization step look-up table includes a corresponding relationship between the LODs and the quantization steps.

In some embodiments, the inverse quantization unit 22 is specifically configured to decode a bitstream to obtain a quantization parameter in the coding parameters of the current point, acquire the hierarchical level index of the target LOD, and determine a quantization parameter increment of the target LOD according to the hierarchical level index of the target LOD, and determine the target quantization step corresponding to the target LOD according to the quantization parameter and the quantization parameter increment of the target LOD.

In some embodiments, the inverse quantization unit 22 is specifically configured to: determine the quantization parameter increment of the target LOD as j if the target LOD belongs to the first N LODs of the point cloud, herein N is a positive integer less than or equal to a first threshold value, and j is an integer greater than 0 and less than or equal to a second threshold value; and determine the quantization parameter increment of the target LOD as 0 if the target LOD does not belong to the first N LODs of the point cloud.

Optionally, if the quantization parameter is greater than or equal to a third threshold value, then j is a first preset value. If the quantization parameter is less than the third threshold value, then j is a second preset value.

In some embodiments, the inverse quantization unit 22 is specifically configured to determine an index of the current point, and determine a quantization weight corresponding to the index of the current point as a first quantization weight of the current point.

In some embodiments, the inverse quantization unit 22 is specifically configured to: determine a second quantization weight of the current point according to the first quantization weight of the current point; and perform inverse quantization on the quantized residual value of the attribute information of the current point according to the target quantization step and the second quantization weight, so as to obtain the reconstructed residual value.

Optionally, the second quantization weight is less than or equal to the target quantization step.

In some embodiments, the inverse quantization unit 22 is specifically configured to determine the second quantization weight of the current point by using the following formula:

$$\text{effectiveQuantWeight} = \min(w(Q), \text{Qstep}).$$

Herein, effectiveQuantWeight represents the second quantization weight of the current point, w(Q) represents the first quantization weight of the current point, k represents the number of bits for a right shift operation performed on the w(Q), and Qstep represents the target quantization step.

Optionally, the value of the second quantization weight is equal to the integer power of 2.

Optionally, the number of the first quantization weight is not equal to the integer power of 2. In some embodiments, the inverse quantization unit 22 is specifically configured to determine the integer power of 2 which is the closest to the first quantization weight of the current point as the second quantization weight of the current point based on the value of the first quantization weight of the current point.

In some embodiments, the inverse quantization unit 22 is specifically configured to: perform inverse quantization on the quantized residual value by using the target quantization step of the current point, so as to obtain a weighted residual value; and divide the weighted residual value by the second quantization weight to obtain the reconstructed residual value.

In some embodiments, the inverse quantization unit 22 is specifically configured to perform inverse quantization on the quantized residual value by using the following formula:

$$\text{attrResidualQuant1}=(\text{attrResidualQuant}\times \text{Qstep})/\text{effectiveQuantWeight}.$$

Herein, attrResidualQuant2 represents the quantized residual value, attrResidualQuant1 represents the reconstructed residual value, effectiveQuantWeight represents the second quantization weight of current point, and Qstep represents the target quantization step of the current point.

In some embodiments, the inverse quantization unit 22 is specifically configured to update the target quantization step according to the second quantization weight of the current point, and perform inverse quantization on the quantized residual value of the attribute information of the current point according to the updated quantization step.

In some embodiments, the inverse quantization unit 22 is specifically configured to update the quantization step of the current point by using the following formula:

$$\text{newQstep}=\lceil \text{Qstep}/\text{effectiveQuantWeight}\rceil.$$

Herein, effectiveQuantWeight represents the second quantization weight of current point, newQstep represents the quantization step of the current point after being updated based on the second quantization step of the current point, and Qstep represents the quantization step of the current point before being updated based on the second quantization step of the current point.

In some embodiments, the decoding unit 21 is further configured to update first quantization weights of N nearest points of the current point based on the first quantization weight of the current point by traversing the points in the point cloud according to a reverse order of the encoding order of the point cloud. N is an integer greater than 0.

Optionally, the initial value of the first quantization weight of each point in the point cloud is a preset value.

Optionally, the initial values of the first quantization weights of the points in the first M LODs in the LODs of the point cloud are greater than the initial values of the first quantization weights of the points in the remaining LODs. M is a positive integer.

In some embodiments, the decoding unit 21 is specifically configured to: acquire an influence weight of the current point on each of the N nearest points, the influence weight being related to position information of the current point and the N nearest points; and update the first quantization weights of the N nearest points based on the quantization weight of the current point and the influence weight of the current point on each of the N nearest points.

In some embodiments, the attribute parameter set of the point cloud includes the influence weight of the current point on each of the N nearest points. The decoding unit 21 is further configured to acquire the influence weight of the current point on each of the N nearest points by querying the attribute parameter set.

In some embodiments, the decoding unit 21 is further configured to update the first quantization weights of the N nearest points by using the following formula:

$$w(P_i) \leftarrow w(P_i)+((a(P_i,Q)\times w(Q))\gg k).$$

Herein, Q represents the current point, $P\_i$ represents the ith nearest neighbouring point of Q, $i=1, 2, \ldots, N$, $w(Q)$ represents the first quantization weight of the current point, $a(P_i, Q)$ represents the magnitude of the influence weight of the current point on the neighbouring point, $w(P_i)$ represents the updated first quantization weight of the neighbouring point $P_i$, and k represents the number of bits of a right shift operation.

Optionally, the value of $a(P_i, Q)$ decreases with the increment of i.

Optionally, the quantization weight of the point cloud is saved as an array; and the dimension of the array is the same as the number of points in the point cloud.

In some embodiments, the decoding unit 22 is further configured to: decode a bitstream of the point cloud to obtain first information, the first information indicating a point of which the residual value of the attribute information is subjected to lossless encoding; and determine whether the residual value of the attribute information of the current point is subjected to lossless encoding according to the first information.

Optionally, the first information includes N; and N is the total number of the points of which the residual values of the attribute information in the point cloud are subjected to lossless encoding.

Optionally, N is an integer multiple of 2.

Optionally, the intervals between every two neighbouring points in N points of are equal.

In some embodiments, the decoding unit 21 is specifically configured to determine that the residual value of the attribute information of the current point is subjected to lossless encoding in response to determining that the current point is one point of the N points.

In some embodiments, if the first information includes a preset interval, the decoding unit 21 is specifically configured to: determine that the residual value of the attribute information of the current point is subjected to lossless encoding in response to determining that the interval between the current point and the previous point of which the residual value of the attribute information is subjected to lossless encoding is equal to the preset interval according to the preset interval.

In some embodiments, if the first information includes the first preset value, the decoding unit 21 is specifically configured to: acquire at least one first category detail expression level including a total number of points less than or equal to a first preset value and at least one second category detail expression level including a total number of points greater than the first preset value in the plurality of detail expression levels of the point cloud; and determine that the residual value of the attribute information of the current point is subjected to lossless encoding in response to determining the current point belongs to the first category detail expression level.

In some embodiments, if the first information includes M, M is the number of the points of which the residual values of the attribute information in one second category detail expression level is subjected to lossless encoding, and M is an integer multiple of 2, the decoding unit 21 is specifically configured to determine that the residual value of the attribute information of the current point is subjected to lossless encoding if the current point is one point of the M points.

In some embodiments, at least one second category detail expression level includes L second category detail expression levels, and L is a positive integer greater than or equal to 2. If the first information includes a first number, a second number, and partition information of P second category detail expression levels and Q second category detail expression levels, the decoding unit 21 is specifically configured to: partition the L second category detail expression levels according to the partition information to obtain P second category detail expression levels and Q second category detail expression levels; L second category detail expression levels; determine that the residual value of the attribute information of the current point is subjected to lossless encoding in response to determining that the current point is one point of the first number of points of which the residual values of the attribute information are subjected to lossless encoding in the P second category detail expression levels; determine that the residual value of the attribute information of the current point is subjected to lossless encoding in response to determining that the current point is one point of the second number of points of which the residual values of the attribute information are subjected to lossless encoding in the Q second category detail expression levels. P and Q are positive integers, and the sum of P and Q is less than or equal to L; the P second category detail expression levels do not overlap with the Q second category detail expression levels, and the first number is different from the second number.

Optionally, the P second category detail expression levels are the first P second category detail expression levels in the L second category detail expression levels.

Optionally, the Q second category detail expression levels are the last Q second category detail expression levels in the at L second category detail expression levels.

Optionally, the last second category detail expression level in the P second category detail expression levels is neighbour to the first second category detail expression level in the Q second category detail expression levels.

Optionally, if the last second category detail expression level in the P second category detail expression levels is neighbour to the first second category detail expression level in the Q second category detail expression levels, then the partition information further includes identifier information of the first second category detail expression level in the Q second category detail expression levels, or identifier information of the last second category detail expression level in the P second category detail expression levels.

Optionally, the first information further includes identifier information of the first point of which the residual value of the attribute information is subjected to lossless encoding in the second category detail expression level.

Optionally, the first information further includes identifier information of the at least one point of which the residual value of the attribute information is subjected to lossless encoding.

Optionally, the first number is greater than the second number.

Optionally, the first number is an integer multiple of the second number.

Optionally, the intervals between two neighbouring points in the first number of points are equal.

Optionally, the intervals between two neighbouring points in the second number of points are equal.

In some embodiments, the decoding unit 21 is specifically configured to determine the reconstructed value of the current point according to the following formula:

reconstructedColour=attrResidual+attrPredValue.

Herein, reconstructedColour is the reconstructed value of the attribute information of the current point, attrResidual is the residual value of the attribute information of the current point, and attrPredValue is the prediction value of the attribute information of the current point.

It is to be understood that the apparatus embodiments correspond to the method embodiments. Similar description may refer to the method embodiments. To avoid repetition, details are not described in detail herein. Specifically, the point cloud decoder 20 as shown in FIG. 19 may correspond to corresponding subjects for implementing the methods 500, 600 and/or 700 in the embodiments of the present disclosure, and the foregoing and other operations and/or functions of each unit in the point cloud decoder 20 are not repeated here for the sake of brevity in order to implement the corresponding processes in the methods 500, 600 and/or 700, respectively.

The apparatus and system of the embodiments of the present disclosure are described above from the perspective of functional units in combination with the drawings. It is to be understood that the functional units may be realized in the form of hardware, or may be realized through instructions in the form of software, or may be realized through a combination of hardware and software units. Specifically, each step of the method embodiment in the embodiment of the present disclosure may be completed by the integrated logic circuit of hardware in the processor and/or instructions in the form of software. Steps of the methods disclosed in combination with the embodiments of the present disclosure may be directly performed and completed by a hardware decoding processor, or may be performed and completed by a combination of hardware and software modules in the decoding processor. Optionally, the software unit may be located in a mature storage medium in the art, such as a random access memory, a flash memory, a read-only memory, a programmable read-only memory, an electrically erasable programmable memory, and a register. The storage medium is located in the memory, and the processor reads information in the memory and completes the steps in the above method embodiments in combination with hardware.

Figure 20:
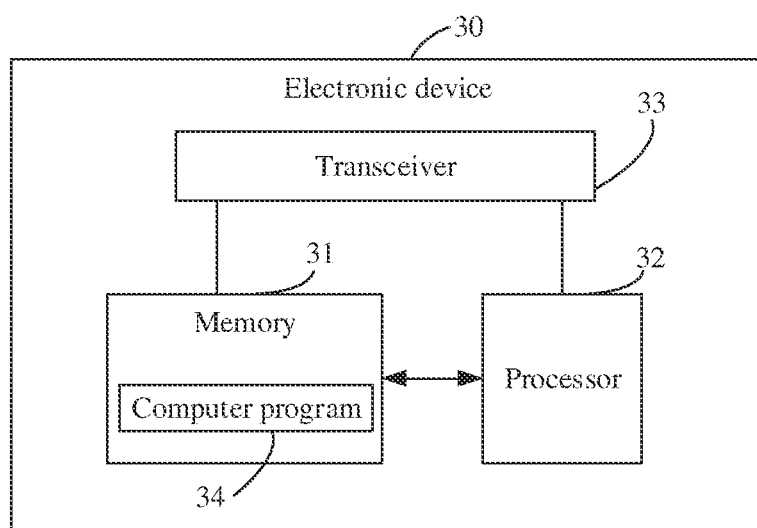
FIG. 20 is a schematic block diagram of an electronic device provided by an embodiment of the present disclosure.

FIG. 20 is a schematic block diagram of an electronic device 30 provided by an embodiment of the present disclosure.

As shown in FIG. 20, the electronic device 30 may be the point cloud encoder or the point cloud decoder as described in the embodiments of the present disclosure. The electronic device 30 may include a memory 33 and a processor 32.

The memory 33 is configured to store a computer program 34, and transmits the computer program 34 to the processor 32. In other words, the processor 32 may call and run the computer program 34 from the memory 33 to implement the method in the embodiment of the present disclosure.

For example, the processor 32 may be configured to execute the steps in the above method 200 according to the instruction in the computer program 34.

In some embodiments of the present disclosure, the processor 32 may include, but is not limited to, a universal processor, a Digital Signal Processor (DSP), an Application Specific Integrated Circuit (ASIC), a Field Programmable Gate Array (FPGA) or other programmable logic devices, discrete gates or transistor logic devices, discrete hardware components.

In some embodiments of the present disclosure, the memory 33 includes, but is not limited to, a volatile memory and/or a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a Random Access Memory (RAM), which is used as an external cache. By way of example but not restrictive description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM).

In some embodiments of the present disclosure, the computer program 34 may be partitioned into one or more units. The one or more units are stored in the memory 33 and are executed by the processor 32 to complete the method provided by the present disclosure. The one or more units may be a series of computer program instruction segments capable of completing particular functions, and the instruction segments are used to describe the execution of the computer program 34 in the electronic device 30.

As shown in FIG. 20, the electronics device 30 may further include a transceiver 33.

The transceiver 33 may be connected to the processor 32 or the memory 31.

The processor 32 may control the transceiver 33 to communicate with other devices. Specifically, information or data may be transmitted to other devices, or receive the information or data transmitted by other devices. The transceiver 33 may include a transmitter and a receiver. The transceiver 33 may further include an antenna. There may be one or more antennae.

It is to be understood that various components in the electronic device 30 are connected through a bus system. In addition to a data bus, the bus system further includes a power bus, a control bus, and a state signal bus.

Figure 21:
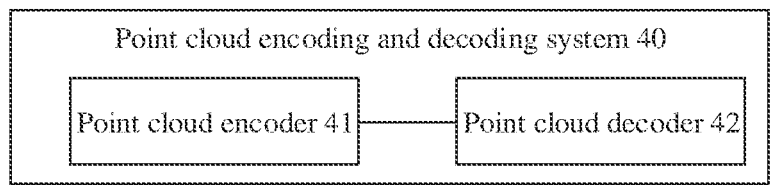
FIG. 21 is a schematic block diagram of a point cloud encoding and decoding system provided by an embodiment of the present disclosure.

FIG. 21 is a schematic block diagram of a point cloud encoding and decoding system 40 provided by an embodiment of the present disclosure.

As shown in FIG. 21, the point cloud encoding and decoding system 40 may include: a point cloud encoder 41 and a point cloud decoder 42. The point cloud encoder 41 is used for performing the method for point cloud encoding involved in the embodiment of the present disclosure. The point cloud decoder 42 is used for performing the method for point cloud decoding involved in the embodiment of the present disclosure.

The present disclosure further provides a computer storage medium, which stores a computer program. The computer program enables a computer to perform the method of the abovementioned method embodiment when being executed by the computer.

An embodiment of the present disclosure further provides a computer program product including an instruction. When the instruction is executed by a computer, the program product is run on a computer, and the computer performs the method in the abovementioned method embodiment.

An embodiment of the present disclosure further provides bitstream. The bitstream is obtained by the encoding method as shown in the above FIG. 6, FIG. 7, FIG. 10, and FIG. 13.

During implementation with the software, the encoding method may be implemented completely or partially in a form of a computer program product. The computer program product includes one or more computer instructions. When the computer program instructions are loaded and executed on a computer, all or some of the procedures or functions according to the embodiments of the present disclosure are generated. The computer may be a general-purpose computer, a dedicated computer, a computer network, or other programmable apparatuses. The computer instruction may be stored in a computer-readable storage medium, or transmitted from one computer-readable storage medium to another computer-readable storage medium. For example, the computer instruction may be transmitted from one website site, computer, server or data center to another website site, computer, server or data center through wired (such as a coaxial cable, an optical fiber, a Digital Subscriber Line (DSL)) or wireless (such as infrared, wireless, microwave, and the like). The computer-readable storage medium may be any available medium for the computer or a data storage device, such as a server and a data center, including one or more integrated available media. The available medium may be a magnetic medium (such as floppy disk, hard disk, and magnetic tape), an optical medium (such as a DVD), or a semiconductor medium (such as a solid state disk (SSD)).

Those of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. Those skilled in the art may implement the described functions in different ways for each specific application, but such implementation is not to be considered beyond the scope of the present disclosure.

In the several embodiments provided in the present disclosure, it is to be understood that the disclosed system, apparatus, and method may be implemented in other manners. For example, the described apparatus embodiment is merely schematic. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separated, and the parts displayed as units may or may not be physical units, may be located in one position, or may be distributed on a plurality of network units. Some or all of the units may be selected according to actual needs to achieve the purpose of the solution of the present embodiment. In for example, the functional units in the various embodiments of the present disclosure may be integrated into one processing unit, or each unit may exist alone physically, or two or more than two units may be integrated into one unit.

The above descriptions are merely specific implementation modes of the present disclosure, but are not intended to limit the scope of protection of the present disclosure. Any variation or replacement readily figured out by a person skilled in the art within the technical scope disclosed in the present disclosure shall fall within the scope of protection of the present disclosure. Therefore, the scope of protection of the present disclosure shall be subject to the scope of protection of the claims.

The invention claimed is:

1. A method for point cloud encoding, comprising:
 acquiring attribute information of a current point in a point cloud;
 processing the attribute information of the current point to obtain a residual value of the attribute information of the current point; and
 quantizing the residual value of the attribute information of the current point in a target quantization mode, to obtain a quantized residual value of the attribute information of the current point, wherein the target quantization mode comprises at least two of the following quantization modes: a first quantization mode, a second quantization mode, and a third quantization mode, the first quantization mode is to set a quantization parameter increment for a quantization parameter of at least one point in the point cloud, the second quantization mode is to weight residual values of points in the point cloud, and the third quantization mode is to perform lossless encoding on the residual value of the attribute information of at least one point in the point cloud, wherein the method further comprises:

acquiring geometry information of the points in the point cloud; and partitioning the point cloud into one or more Levels of Detail (LODs) according to the geometry information of the points in the point cloud, each LOD comprising at least one multi-level detail expression level, and each detail expression level comprising at least one point, wherein the target quantization mode comprises the first quantization mode and the second quantization mode, and the quantizing the residual value of the attribute information of the current point in a target quantization mode, to obtain a quantized residual value of the attribute information of the current point comprises:

determining a target LOD where the current point is located according to the geometry information of the current point;

determining a target quantization step which is adaptive to the target LOD;

determining a first quantization weight of the current point;

determining a second quantization weight of the current point according to the first quantization weight of the current point; and quantizing the residual value of the attribute information of the current point according to the target quantization step and the second quantization weight, to obtain the quantized residual value, wherein the second quantization weight is less than or equal to the target quantization step.

2. A method for point cloud decoding, comprising:

parsing a bitstream of a point cloud to obtain a quantized residual value of attribute information of a current point of the point cloud; and performing inverse quantization on the quantized residual value of the attribute information of the current point in a target inverse quantization mode, to obtain a reconstructed residual value of the attribute information of the current point, wherein the target inverse quantization mode comprises at least two of the following inverse quantization modes: a first inverse quantization mode, a second inverse quantization mode, and a third inverse quantization mode, the first inverse quantization mode is to set an inverse quantization parameter increment for an inverse quantization parameter of at least one point in the point cloud, the second inverse quantization mode is to perform deweighting processing on residual values of points in the point cloud, and the third inverse quantization mode is to perform lossless decoding on the residual value of the attribute information of at least one point in the point cloud, wherein the method further comprises:

acquiring geometry information of the points in the point cloud; and partitioning the point cloud into one or more Levels of Detail (LODs) according to the geometry information of the points in the point cloud, each LOD comprising at least one multi-level detail expression level, and each detail expression level comprising at least one point, wherein the target inverse quantization mode comprises the first inverse quantization mode and the second inverse quantization mode, and the performing inverse quantization on the quantized residual value of the attribute information of the current point in a target inverse quantization mode comprises:

determining a target LOD where the current point is located according to the geometry information of the current point;

determining a target quantization step which is adaptive to the target LOD;

determining a first quantization weight of the current point;

determining a second quantization weight of the current point according to the first quantization weight of the current point; and performing inverse quantization on the quantized residual value of the attribute information of the current point according to the target quantization step and the second quantization weight, to obtain the reconstructed residual value, wherein the second quantization weight is less than or equal to the target quantization step.

3. The method of claim 2, wherein the determining a target quantization step which is adaptive to the target LOD comprises:

acquiring a hierarchical level index of the target LOD; and querying the target quantization step corresponding to the target LOD in a quantization step look-up table according to the hierarchical level index of the target LOD, wherein the quantization step look-up table comprises a corresponding relationship between LODs and quantization steps.

4. The method of claim 2, wherein the determining a target quantization step which is adaptive to the target LOD comprises:

decoding a bitstream to obtain a quantization parameter of coding parameters of the current point;

acquiring the hierarchical level index of the target LOD, and determining a quantization parameter increment of the target LOD according to the hierarchical level index of the target LOD; and determining the target quantization step corresponding to the target LOD according to the quantization parameter and the quantization parameter increment of the target LOD.

5. The method of claim 4, wherein the determining the quantization parameter increment of the target LOD according to the hierarchical level index of the target LOD comprises:

when the target LOD belongs to the first N LODs of the point cloud, determining the quantization parameter increment of the target LOD as j, wherein N is a positive integer less than or equal to a first threshold value, and j is an integer greater than 0 and less than or equal to a second threshold value; and when the target LOD does not belong to the first N LODs of the point cloud, determining the quantization parameter increment of the target LOD as 0.

6. The method of claim 5, wherein when the quantization parameter is greater than or equal to a third threshold value, j is a first preset value; and when the quantization parameter is less than the third threshold value, j is a second preset value.

7. The method of claim 2, wherein the determining the first quantization weight of the current point comprises:
determining an index of the current point; and
determining a quantization weight corresponding to the index of the current point as a first quantization weight of the current point.

8. The method of claim 2, wherein the determining the second quantization weight of the current point according to the first quantization weight of the current point comprises:
determining the second quantization weight of the current point by using the following formula:

effectiveQuantWeight=min(w(Q),Qstep)

wherein, effectiveQuantWeight represents the second quantization weight of the current point, w(Q) represents the first quantization weight of the current point, k represents a number of bits for a right shift operation performed on the w(Q), and Qstep represents the target quantization step.

9. The method of claim 2, wherein the value of the second quantization weight is equal to an integer power of 2.

10. The method of claim 2, wherein the value of the first quantization weight is not equal to an integer power of 2; and the determining the second quantization weight of the current point according to the first quantization weight of the current point comprises:
determining an integer power of 2 which is closest to the first quantization weight of the current point as the second quantization weight of the current point based on the value of the first quantization weight of the current point.

11. The method of claim 2, wherein the performing inverse quantization on the quantized residual value of the attribute information of the current point according to the target quantization step and the second quantization weight comprises:
performing inverse quantization on the quantized residual value by using the target quantization step of the current point to obtain a weighted residual value; and
dividing the weighted residual value by the second quantization weight to obtain the reconstructed residual value.

12. The method of claim 2, wherein the performing inverse quantization on the quantized residual value of the attribute information of the current point according to the target quantization step and the second quantization weight comprises:
performing inverse quantization on the quantized residual value by using the following formula:

attrResidualQuant1=(attrResidualQuant2×Qstep)/effectiveQuantWeight wherein attrResidualQuant2 represents the quantized residual value, attrResidualQuant1 represents the reconstructed residual value, effectiveQuantWeight represents the second quantization weight of current point, and Qstep represents the target quantization step of the current point.

13. A point cloud decoder, comprising:
a processor, configured to execute a computer program; and
a computer-readable storage medium, wherein the computer-readable storage medium stores a computer program; and when the computer program is executed by the processor, the point cloud decoder performs:
parsing a bitstream of a point cloud to obtain a quantized residual value of attribute information of a current point of the point cloud; and
performing inverse quantization on the quantized residual value of the attribute information of the current point to obtain a reconstructed residual value of the attribute information of the current point,
wherein the target inverse quantization mode comprises at least two of the following inverse quantization modes: a first inverse quantization mode, a second inverse quantization mode, and a third inverse quantization mode, the first inverse quantization mode is to set an inverse quantization parameter increment for an inverse quantization parameter of at least one point in the point cloud, the second inverse quantization mode is to perform deweighting processing on residual values of points in the point cloud, and the third inverse quantization mode is to perform lossless decoding on the residual value of the attribute information of at least one point in the point cloud,
wherein when the computer program is executed by the processor, the point cloud decoder further performs:
acquiring geometry information of the points in the point cloud; and
partitioning the point cloud into one or more Levels of Detail (LODs) according to the geometry information of the points in the point cloud, each LOD comprising at least one multi-level detail expression level, and each detail expression level comprising at least one point,
wherein the target inverse quantization mode comprises the first inverse quantization mode and the second inverse quantization mode, and the performing inverse quantization on the quantized residual value of the attribute information of the current point in a target inverse quantization mode comprises:
determining a target LOD where the current point is located according to the geometry information of the current point;
determining a target quantization step which is adaptive to the target LOD;
determining a first quantization weight of the current point; and
determining a second quantization weight of the current point according to the first quantization weight of the current point; and
performing inverse quantization on the quantized residual value of the attribute information of the current point according to the target quantization step and the second quantization weight, to obtain the reconstructed residual value,
wherein the second quantization weight is less than or equal to the target quantization step.

* * * * *